(12) United States Patent  
Herbert

(10) Patent No.: US 12,026,546 B2  
(45) Date of Patent: Jul. 2, 2024

(54) PARALLELISM IN SERIAL PIPELINE PROCESSING

(71) Applicant: Tom Herbert, Santa Clara, CA (US)

(72) Inventor: Tom Herbert, Santa Clara, CA (US)

(*) Notice: Subject to any disclaimer, the term of this patent is extended or adjusted under 35 U.S.C. 154(b) by 515 days.

(21) Appl. No.: 17/233,149

(22) Filed: Apr. 16, 2021

(65) Prior Publication Data

US 2021/0326175 A1    Oct. 21, 2021

Related U.S. Application Data

(60) Provisional application No. 63/011,002, filed on Apr. 16, 2020.

(51) Int. Cl.
*G06F 9/48* (2006.01)
*G06F 9/52* (2006.01)
*G06F 9/54* (2006.01)

(52) U.S. Cl.
CPC .............. *G06F 9/4881* (2013.01); *G06F 9/52* (2013.01); *G06F 9/541* (2013.01); *G06F 9/544* (2013.01)

(58) Field of Classification Search
CPC .......... G06F 9/4881; G06F 9/52; G06F 9/541; G06F 9/544
See application file for complete search history.

(56) References Cited

U.S. PATENT DOCUMENTS

| | | | |
|---|---|---|---|
| 5,835,792 A | 11/1998 | Wise et al. | |
| 8,914,590 B2 | 12/2014 | Vorbach et al. | |
| 9,529,599 B2 | 12/2016 | Anderson | |
| 9,766,894 B2 | 9/2017 | Glossner et al. | |
| 11,416,294 B1* | 8/2022 | Davis | G06F 9/5005 |
| 2012/0260239 A1* | 10/2012 | Martinez Canedo | G06F 8/456 717/149 |
| 2014/0115560 A1* | 4/2014 | Hutchison | G06F 3/0608 717/160 |
| 2015/0293785 A1* | 10/2015 | Murphy | G06F 9/5027 718/102 |
| 2018/0146077 A1* | 5/2018 | Pang | H04L 69/22 |
| 2019/0196824 A1 | 6/2019 | Liu et al. | |
| 2019/0310856 A1* | 10/2019 | Ayzenfeld | G06F 9/384 |

* cited by examiner

*Primary Examiner* — Emerson C Puente
*Assistant Examiner* — Jonathan R Labud
(74) *Attorney, Agent, or Firm* — Bold IP, PLLC; Christopher Mayle

(57) ABSTRACT

A system and method that provides fine grained parallelization to serial pipelines and serial data processing with one or more threading and synchronization models whereby data object or packet processing is orchestrated by a parser identifying the various layers of the input data object and dispatching worker threads to perform the processing of the various layers of the data object, wherein the worker threads may execute in parallel.

17 Claims, 23 Drawing Sheets

External memory adress

| 0 | 0 | Adress |

CPU local memory

| 0 | 1 | CPU set | CPU | Thread | Adress in per thread memory |

Data object (for CPU shared set memory)

| 1 | 0 | 0 | Object ID | Adress (offset) in data object |

Metadata (for CPU shared set memory)

| 1 | 0 | 0 | Object ID | Adress (offset) in metadata |

Thread mapped memory

| 1 | 1 | Type | Adress or offset |

PARALLELISM IN SERIAL PIPELINE PROCESSING

CROSS REFERENCE TO RELATED APPLICATIONS

This application claims priority to U.S. Provisional Patent No. 63/011,002 filed Apr. 16, 2020 which is incorporated in its entirety.

FIELD OF THE DISCLOSURE

The overall field of this invention relates generally to employing architecture, programming models, and Application Programming Interface (API) for serial data processing, and in particular for serial processing pipelines. The disclosed embodiments relate to a system and method for an architecture that allows concurrent processing of multiple stages in a serial processing pipeline. In concert with other techniques, including hardware accelerations and alternative methods for accessing memory, parallelism improves performance in dimensions of latency, throughput, and CPU utilization.

BACKGROUND

This paper describes an architecture that allows concurrent processing of multiple stages in a serial processing pipeline. In concert with other techniques, including hardware accelerations and alternative methods for accessing memory, parallelism improves performance in dimensions of latency, throughput, and CPU utilization. Parallelism has long been exploited as a means to improve processing performance in different areas of computing. For instance, in networking, techniques such as Receive Side Scaling (RSS) parallelize packet processing across different CPUs. Those mechanisms employ horizontal parallelism to process packets concurrently, however processing for each packet remains serialized. For instance, a QUIC/IPv4 packet consists of a stack of Ethernet, IPv4, UDP, and QUIC headers— the corresponding protocol layers are processed serially for each packet. Vertical parallelism allows concurrent processing of different layers of a packet thereby reducing latency and increasing throughput. The benefits of vertical parallelism become more pronounced with increased use of encapsulation, extension headers, Type Length Value lists (TLVs), and Deep Packet Inspection (DPI). Network protocol processing is an instance of a serial processing pipeline. A serial processing pipeline is characterized by a pipeline composed of some number of stages that are expected to be processed serially where one stage must complete its processing before moving to the next one. A serial processing pipeline is parallelized by running its stages in parallel. A threading and dependency model is required to facilitate this. This paper describes such a model for parallelizing serial pipeline processing. The fundamental elements of the model are data objects, metadata, external data, threads, and dependencies. Data objects are units of data processed by a serial processing pipeline. Metadata is data about an object that is accumulated as an object is processed. External data provides configuration and state that is shared amongst processing elements. Threads are units of execution created for each stage in a pipeline. Dependencies define dependencies between threads. Given a threading and dependency model, a design for parallelizing a serial processing pipeline of a network stack can be articulated. Packet processing begins with one of the threads such as the initial thread to process the first protocol layer. Each protocol layer thread parses the corresponding protocol headers and starts a thread to process the next layer. Wait points and resolve points are set in the code paths to handle dependencies between stages. Once processing for all protocol layers has been started, the initial thread waits for all the threads to complete and then performs any necessary serial completion processing.

SUMMARY

The embodiments in the present invention are directed to a system including one or more computers and one or more storage devices on which are stored instructions that are operable, the system including one or more memory and address formats, one or more hardware schedulers, external memory, CPU set shared memory shared amongst a cooperative set of CPUs, and CPU local memory, and one or more accelerators, when executed by the one or more computers, to cause the one or more computers to perform operations including utilizing a software programming model and API to program serial data processing including primitives for parallelism and synchronization for serial processing pipelines whereby the software programming model and the API employ lightweight micro threading and synchronization mechanisms to construct horizontal pipelines and vertical pipelines with concurrent processing whereby the API is targeted to a domain specific space of serial pipeline processing and serial data processing for hardware acceleration, executing an operation for horizontal parallelization, vertical parallelization, or hybrid parallelization of a serial processing pipeline to produce materialized data objects, the operation including, executing the operation as a vertical parallel operation whereby stages of the same serial processing pipeline processing a single data object execute concurrently, executing the operation as a hybrid parallel operation, the hybrid parallel operation utilizing vertical and horizontal parallelism which work in concert whereby within each horizontal pipeline, vertical parallelism is applied to processing of the data objects, analyzing programming language instructions associated with the serial processing pipeline to determine a type or types of parallel operations to be applied, whereby the materialized data objects are accessed during execution of a program corresponding to the programming language instructions associated with the serial processing pipeline, augmenting compilers to analyze the program being compiled to optimize and instantiate a compiled executable based on the serial processing pipeline defined in program source code, utilizing a threading model including processing elements and procedures of the vertical pipelines and the horizontal pipelines, utilizing programmable threads as a unit of execution that implements one stage in a processing pipeline, utilizing a programming language and model to program the threads, utilizing thread sets that are groups of threads that define instances of the vertical pipelines, utilizing datapaths, each of which comprises a group of thread sets, whereby each thread set defines an instance of a horizontal pipeline in a datapath and processes one data object at a time, utilizing the datapaths and the thread sets to provide hybrid parallelism whereby the horizontal parallelism is provided by different thread sets of the datapath, and the vertical parallelism is provided by the threads within a thread set, creating a number of threads in a thread set, whereby the number of threads implement vertical parallelism within the thread set, assigning one or more worker threads to the thread set, whereby the one or more worker threads are available and not currently processing a pipeline stage, or are busy and processing a pipeline stage, whereby worker threads for a thread set are created at initialization, attaching non-worker threads to a thread set, where in response to the attachment the threads take on characteristics of the busy worker threads in that the threads are configured to participate in processing stages of the serial processing pipeline and in dependency resolution including waiting on and resolving dependencies, whereby detaching an attached thread removes the thread from an ordered list whereby the thread is reattachable, maintaining the set of busy threads in the ordered list for each thread set, whereby the ordered list of threads within a thread set establishes upstream and downstream relationships between busy threads in a thread set, whereby when a thread starts processing a pipeline stage and becomes busy, it is inserted at a tail of the ordered list, closing of a thread set whereby no additional worker threads are scheduled for the thread set and no additional non-worker threads are attached until all the threads in the thread set complete processing and the thread set is reset, creating a number of thread sets in a datapath, whereby the number of thread sets implement horizontal parallelism, and threads within a thread set implement vertical parallelism, assigning the one or more thread sets to the datapath, whereby the one or more thread sets are available and not currently processing a data object, or are busy and processing a data object, whereby thread sets for a datapath are created at initialization, maintaining the set of busy thread sets in an ordered list for each datapath, whereby the ordered list of thread sets within a datapath establishes upstream and downstream relationships between busy thread sets in a datapath, whereby when a thread set starts processing a data object and becomes busy, it is inserted at a tail of the ordered list, THE system further including dependency synchronization, the system causing the one or more computers to perform further operations including, utilizing dependencies that are processing dependencies manifested between threads, utilizing dependency synchronization, the dependency synchronization including providing a resolve point and wait point whereby a resolve point is a point in a code path of a processing stage at which processing has been done to satisfy a dependency of a later stage, and a wait point is a point in the code path of a processing stage at which execution cannot proceed until a dependency in an earlier stage has been resolved, whereby wait and resolve primitives are implemented in the API to synchronize between wait and resolve points, the system further including dependency synchronization among threads within a thread set, the system causing the one or more computers to perform further operations including utilizing intra thread set dependency resolution operations for dependencies that are of interest within a single thread set processing pipeline, maintaining running state for a thread set to track dependencies between dependency watcher, waiter, and blocker threads, whereby watcher threads are threads that may wait on a dependency, waiter threads are watcher threads that are actively waiting on a dependency, and blocker threads are threads that block a dependency and must resolve the dependency before downstream waiter threads can proceed, whereby the ordered list of the thread set determines downstream and upstream relationships between the watcher, blocker, and waiter threads which are needed for the dependency resolution operations, utilizing a dependency resolution signaling procedure, whereby when a thread resolves a dependency or has a dependency resolved for which it does not block, the dependency is resolved for a next thread in the ordered list of the thread set, whereby if the next thread is not a blocker of the dependency then the dependency is resolved for its next thread in the thread list, adding a thread to the ordered list whereby an initial set of resolved dependencies for the thread is determined as the set of resolved dependencies for a previous thread in the thread set and for which the previous thread is not a blocker, removing a thread when completed whereby the thread is removed from the ordered list, whereby when a thread is terminated, any unresolved dependencies that the thread blocks are implicitly resolved and the thread reset to its initial state, the system further including dependency synchronization between thread sets, the system causing the one or more computers to perform further operations including, utilizing inter thread set dependency resolution operations for dependencies that are propagated between the threads of different thread sets to synchronize processing between horizontal processing pipelines, utilizing configuration of propagated dependencies, non-propagated dependencies, early propagated dependencies, and non-blocked early propagated dependencies for a datapath, whereby propagated dependencies indicate dependencies for which their resolution is propagated between thread sets, non-propagated dependencies indicate dependencies for which their resolution is not propagated between thread sets, early propagated dependencies indicate dependencies for which their resolutions are propagated between thread sets before an origin thread set is closed but after at least one thread has resolved the dependency, and non-blocked early propagated dependencies indicate dependencies for which their resolution is propagated between threads sets when the dependency is resolved for a first thread in a thread set, utilizing methods to propagate a dependency resolution for a propagated dependency between thread sets whereby when a terminating thread of a thread set that has been closed resolves a dependency or has a dependency resolved and is not a blocker for the dependency, the dependency is then resolved for the first thread in a next thread set in the ordered list of the thread sets for a datapath, utilizing methods to propagate a dependency resolution for an early propagated dependency between thread sets whereby when at least one thread of a thread set resolves a dependency, the dependency is then resolved for the first thread in the next thread set in the ordered list of thread sets for a datapath, utilizing methods to propagate a dependency resolution for a non-blocked early propagated dependency between thread sets whereby when a dependency is resolved for the first thread in a thread set, the dependency is then resolved for the first thread in the next thread set in the ordered list of thread sets for a datapath, the system further including dependency channels, the system causing the one or more computers to perform further operations including utilizing dependency channels that is a method to group together data objects that belong to a same logical flow and in order processing of objects is maintained within the group maintaining an order list of thread sets for each dependency channel, maintaining ordered processing semantics and synchronization among the thread sets of a channel by one or more channel dependencies whereby the channel dependencies are declared in datapath configuration and are propagated dependencies, whereby the datapath is comprised of multiple sets of dependency channels where each has its own logically independent instance of the channel dependencies, joining, by a thread set to a dependency channel by an operation, whereby an argument specifies which channel to join, whereby when a thread set is joined to a dependency channel it is inserted at a tail of the ordered list of thread sets for the dependency channel and is joined for a remaining lifetime of the thread set for processing a data object, whereby a thread set is joinable to more than one dependency channel if multiple dependency channel sets are supported by the datapath, the system further including procedures for thread scheduling that schedules running of threads in a pipeline, whereby each thread includes a work queue, whereby a work item is configured to be placed on the work queue that indicates a function to be performed by the thread and a reference to the data object and a reference to a specific layer to be processed, an available thread dequeuing a first item in the work queue when there is a work item in the work queue, and in response to the dequeuing, performing requested processing by calling an appropriate function, waiting on upstream threads to complete whereby a thread invokes a primitive to wait for all upstream threads in the pipeline to complete and will block until all the upstream threads are complete, killing all downstream threads in a pipeline whereby a thread invokes a primitive to force all threads downstream in the pipeline to terminate and reset to their initial state and become available, the system further including a thread scheduler for a thread set that performs top function scheduling including, utilizing top function scheduling whereby an input thread, the top function thread, for a thread set runs in an event loop for processing a work queue that contains work items describing objects for the thread set to process, the top function thread dequeuing a first item in the work queue when there is a work item in the work queue, in response to the dequeuing, scheduling one or more worker threads to perform processing of various layers of the data object indicated in the dequeued work item, determining a thread is not available for scheduling, in response to determining that no threads are available for scheduling the thread scheduler blocking until a thread is available, the system further including cascade scheduling, the system causing the one or more computers to perform further operations including, processing, by a last thread in an ordered list of a thread set, the data object to determine a next layer that is to be processed and starting a next worker thread in the thread set to process the next layer, the system further including procedures for thread set scheduling that schedules thread sets in a datapath to process data objects, the system causing the one or more computers to perform further operations including utilizing one or more input scheduler functions that serve as the schedulers of thread sets of the datapath, whereby an input scheduler function maintains a queue of data objects to process inputting a data object into the datapath, whereby an input scheduler function of the input scheduler functions attempts to select a thread set among a set of available thread sets, whereby if a thread set is available it is reserved as busy and it is inserted at a tail of a ordered list of the busy thread sets for the datapath and a top function for the thread set is run, whereby if no thread sets are available, the scheduler queues a work item for the data object in a datapath data object work queue, whereby when a thread set completes its processing and becomes available and there is an item on the work queue, the input scheduler dequeuing a work item from the datapath's work queue and proceeding to start the available thread set to process the object described in the work item, the system causing the one or more computers to perform further operations including utilizing block level parallelism as a specialized form of vertical parallelism for fine grained parallelization of independent blocks of code within a code path, implementing a fork operation to create one or more ephemeral threads such that one parallel code block runs in an original thread, and other parallel code blocks run in the ephemeral threads, implementing a join operation whereby the ephemeral threads execute their code blocks and then exit, and the original thread executes its code block and then performs the join operation to wait for the ephemeral threads to exit, utilizing chained transform hardware accelerators whereby a chain of accelerators is dynamically programmed to operate in sequence on a data object, whereby the data object and output from transforms are comprised of blocks of data that are operated on such the output data block of one transform accelerator is the input data block of a next transform accelerator in the chain, whereby different blocks of the same data object are processed in parallel by the different transform accelerators in the sequence, and whereby the transform accelerators may concurrently process data blocks from different data objects as long as properly in order processing of the data in each data object is maintained, transform processing in-line with streaming datapath input functions, or a deserialization function in networking, with one or more transforms being processed in a loop that is employed to perform incremental transform processing on blocks of bytes of a data object as they become available. In each iteration of the loop, a function is called to check if a block of data of some size is available, the function returns true if a block is available and returns false if an end of the data object is reached, the function will block if a data block is not available and an end of the data object is not yet reached. A loop proceeds and processes blocks of data as they become available, where for each block one or more transforms operate it, whereby when the end of the data object is reached, as indicated by the check function returning false, the loop terminates and any residual bytes of the data object are operated on by the transforms, the system further including a programmable parser having protocol nodes, parse nodes, and protocol tables, the protocol node providing properties and functions needed to parse one protocol in a parse graph to proceed to a next protocol in the parse graph, the protocol node having functions that are implemented per a specific protocol to return a length of a protocol layer or header of a current protocol layer and return a protocol type of the next layer, the protocol table returning the next parse node in the protocol graph based on input of the protocol type of the next layer, whereby the parse node is an instantiation of one node in the parse graph of a parser, the parse node allowing functions to extract metadata from a protocol header and save it in a metadata memory, and to perform protocol processing, the system further including a parser engine that drives parsing, and a parser compiler for creating a dependency graph and populating wait points and resolve points, the system causing the one or more computers to perform further operations including accelerating by implementing a programmable parser in hardware, the programmable parser identifying a protocol layer in a packet, and in response to an identification, parsing the protocol layer and scheduling threads to perform per layer processing, the system further including computation of an Internet checksum, or one's complement checksum with respect to a serial processing pipeline, the system causing the one or more computers to perform further operations including, utilizing a method to provide to a thread the one's complement checksum of all words of the data corresponding to a protocol layer, utilizing a method to provide to a thread the one's complement checksum of all words of data corresponding to all words preceding a protocol layer, utilizing a method in a thread processing of a protocol layer to set or validate a protocol checksum, without additional checksum computation, using the provided one's complement sum of all words in the data object, the one's complement sum of all words of the data corresponding to a protocol layer, and the one's complement sum of all words corresponding to all words preceding a layer, whereby some embodiments the system is for network processing, whereby data objects are packets or protocol data units and processing layers in a data object are protocol layers of networking packets.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

DETAILED DESCRIPTION

Figure 1:
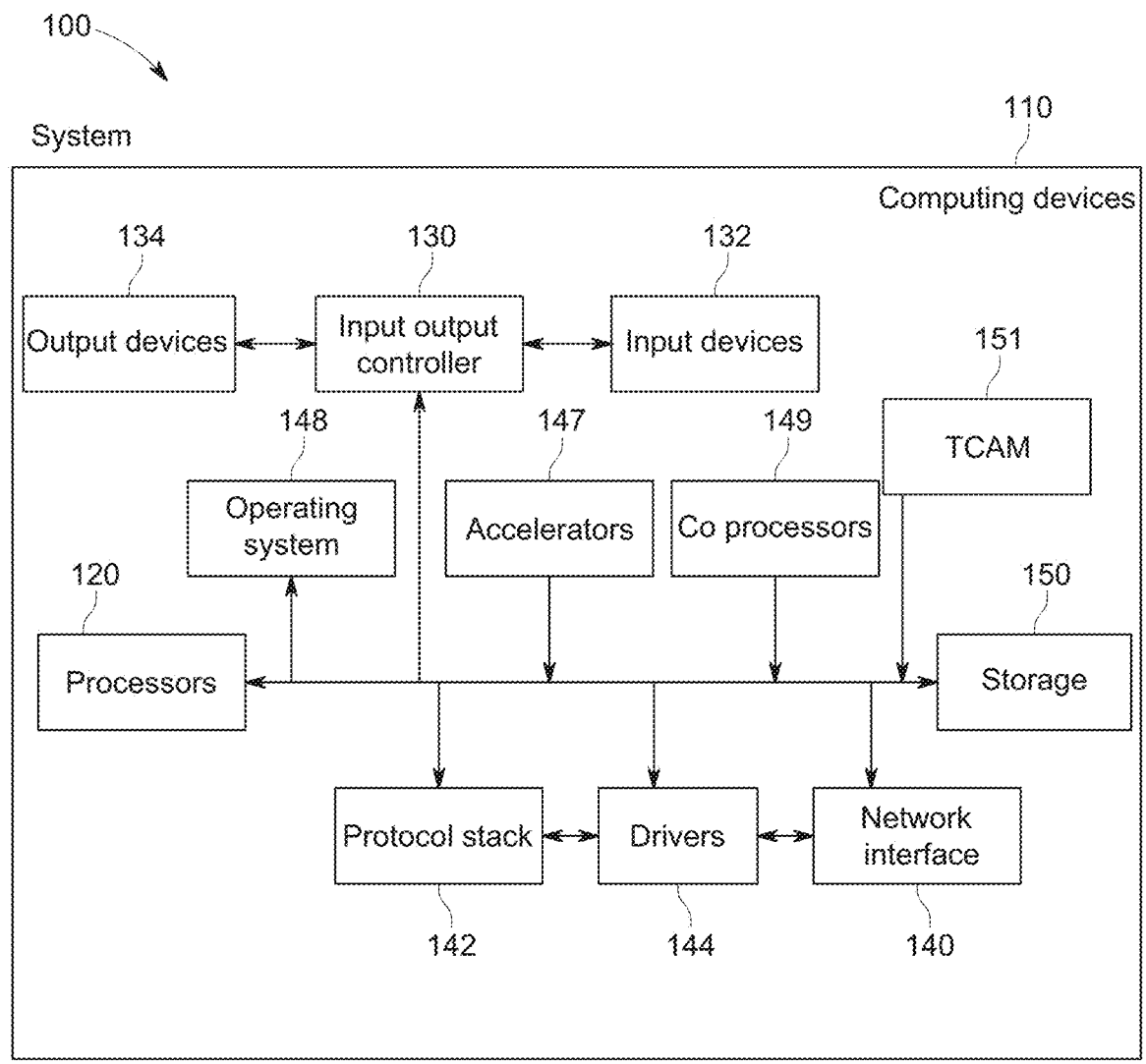
FIG. 1 illustrates an embodiment of a Parallel Pipeline Processing System of the present invention.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure recognizes the unsolved need for a system and method that provides parallelization to serial pipeline processing with one or more threading and synchronization models. A serial processing pipeline is a set of processing elements connected in series, where the output of one element is the input of another. The salient characteristic of serial processing pipelines is that the externally visible effect of processing a data object is that all of the elements of the pipeline processed the element in serial order. Data object or packet processing starts with a dispatcher creating an initial thread to process the first processing layer. Each processing layer thread parses the corresponding headers to identify the next processing layer and then starts a thread to process the next layer. The threads may execute in parallel. Wait points and resolve points are set in the code paths to handle dependencies between threads. Once processing for all processing layers has been dispatched, the dispatcher waits for all the threads to complete. An action may be returned from the processing pipeline and processed accordingly to complete data object processing. The data object processing may be adapted to a wide variety of systems and applications that employ processing layers.

In networking, the system and method for the parallelization of serial pipeline processing may be applied to parallelize the protocol processing done for a data object, the data object defined as unit of data or packet that is routed between an origin and a destination on the Internet or any other data object or packet-switched network. One or more channels may be utilized by the system that are established between two computing devices via a network. In some embodiments, the computing devices may have one or more network interface devices and one or more network ports which share the same processing pipeline. Additionally or alternatively, the resources of the computing device may be shared by multiple hosts as well as by multiple operating systems (e.g., a main operating system and one or more virtual operating systems) on a single given host. In this embodiment, the network interface device may be configured so that each port appears to the host as though it was a separate computing device with its own processing hardware so that each operating system on each host may interact with the computing device independently.

The network may have a plurality of protocol stacks comprised of a plurality of protocol layers, such as a link layer as the first layer, a network layer as the second layer above the link layer, a transport layer above the network, layers that are encapsulated at the transport layer (which in various examples may be a QUIC transport layer) and in some embodiments an application layer above the transport layer.

The transport layer may provide end-to-end communication between different hosts, including use by the processes of the system. Each transport layer channel may be established via network layer channels between one of computing devices and a router, or between pairs of routers, which are established via link layer channels within the individual networks. Channels may be unidirectional channels or bidirectional channels.

The network layer may serve as a connectionless service that is typically used to route data and information between network devices. The network layer may provide routing, such as communication between different individual portions of the network via routers or other devices.

The protocol layers in one example are provided in accordance with a UDP/IP suite utilizing the QUIC transport layer protocol utilizing QUIC/IPv4 over an Ethernet data object or frame. In this embodiment, data structures generally include an Ethernet header, an IPv4 header, a UDP header, and a body defined by a QUIC header and payload.

However, this is non limiting and in some embodiments the system may be adapted for use with other networking protocols, such as but not limited to TCP, SCTP, UDP, and DCCP, and other applications to improve networking performance. In other embodiments, aspects of the present invention may be applied in any system that implements a serial pipeline processing or serialized processing of data.

Figure 21:
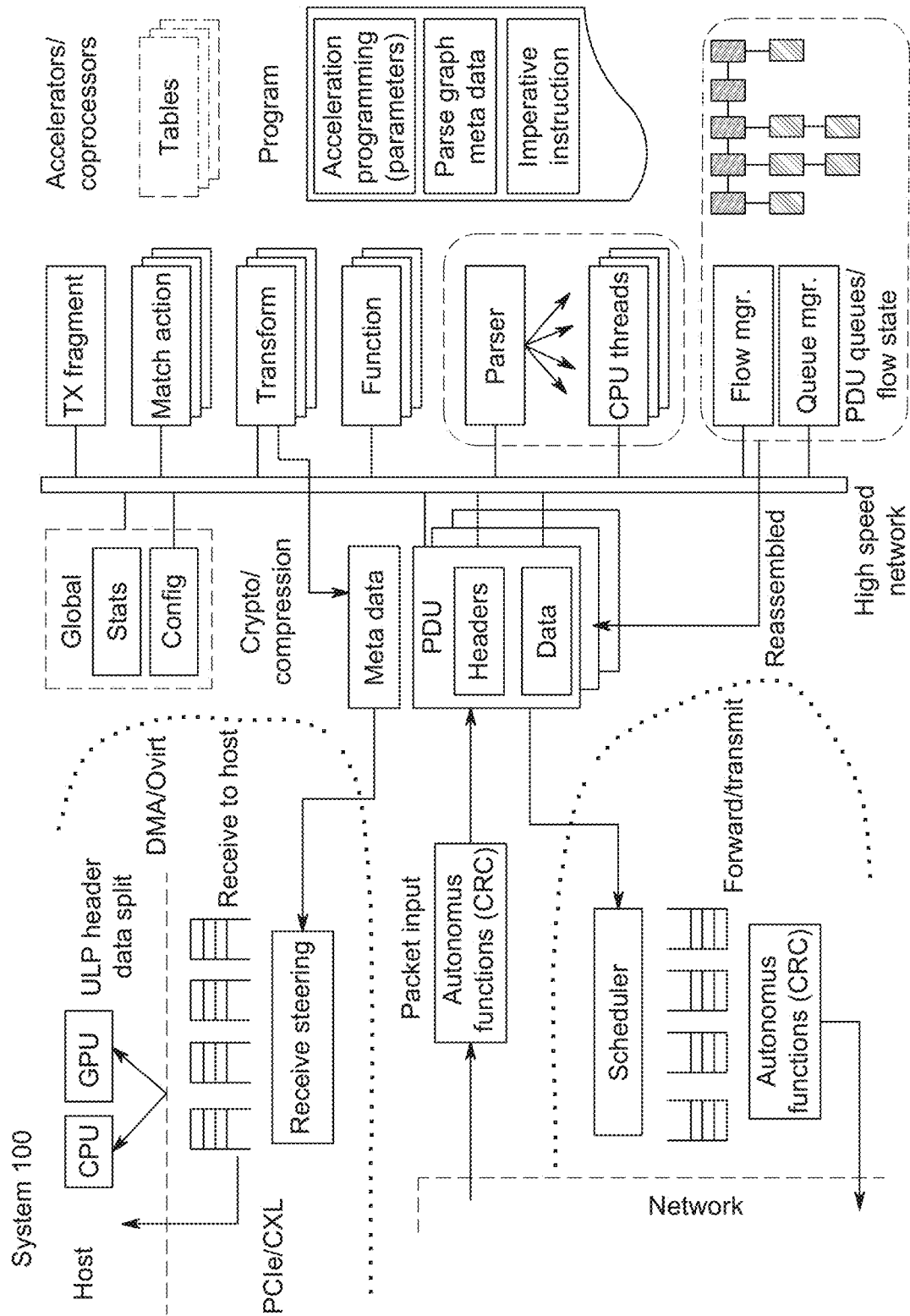
FIG. 21 illustrates a domain specific architecture for parallelism in serial pipeline processing for networking.

FIG. 1 illustrates an embodiment of a Parallel Pipeline Processing System 100 having a computing device 110. Computing device 110 may be a personal computer; however this is non-limiting and may be any computing device such as a phone tablet, television, laptop computer, gaming system, wearable device electronic glasses, server device, or any other multifunctional device known by those of ordinary skill in the art. Computing device 110 may have any number of hardware components configured to perform operations from software. FIG. 21 further illustrates a domain specific architecture for parallelism in serial pipeline processing for networking and will be described later in the description.

Computing device 110 may have one or more processors 120 (e.g., one of a plurality of central processing units, CPUs, or other processors connected to hardware of computing device 110), input output controller 130, network interface 140, and a storage 150 communicatively connected between one another. Input/output controller 130 receives inputs from a user of computing device 110 via one or more input devices 132 and displays outputs to the user via one or more output devices 134.

Network interface 140 is a wired or wireless communication interface for transmitting and receiving information to/from other network capable devices over wired or wireless communication links. Network interface 140 may be, for example, but not limited to a wired ethernet interface, cellular network interface, Wi-Fi, or Wi-Fi Max. Network interface 140 may have one or more hardware components such as a network interface card (NIC) configured to send and receive packets over a physical network link. The network interface card may be a modular unit implemented on a printed circuit board that is coupled to computing device 110.

Processors 120 may execute software operations supported by computing device 110. Processors may be a single processing unit or multiple processing units in computing device 110 or distributed across multiple devices. Processors 120 may be communicatively coupled to other components by the use of a bus, such as a PCI bus or SCSI bus, and may communicate with a hardware controller for devices, such as an output device 134. Processors 120 may have access to a storage 150. Processors 120 may be coupled or otherwise connected to one or more hardware accelerators 147, co-processors 149, and TCAMs (Ternary Content Addressable Memory) 151.

Storage 150 may include one or more of various hardware devices for volatile and non-volatile storage and may include both read-only and writable memory. For example, storage 150 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth.

The software elements of computing device 110 that are executable by processors 120 may include a protocol stack 142, network device drivers 144, instructions to invoke functions in accelerators, co-processors, and TCAMs; and an Application Programming Interface (API) such as a dependency synchronization and threading facility that may be stored in storage 150. Network device driver 144 is software that interfaces between protocol stack 142 and network interface 140 and enables computing device 110 to communicate with remote computing devices via conventional network protocols. Network device driver 144 transfers one or more packets from the network interface 140 and stores the one or more packets in a location in storage 150 at which processors 120, accelerators 147, and co-processors 149 may have access to the packets.

PAND is a lightweight micro threading and synchronization mechanism and API based on the concept of dependencies. PANDA may include instructions stored on storage 150 of computing device 110 or in some other embodiments another connected storage medium whereby PANDA may be executed by processors 120 of computing device 110. PANDA may comprise a number of operations that provide various functions related to implementing parallelization, synchronization, and dependencies for serial processing pipelines. Storage 150 may include program memory capable of storing programs and software, such as an operating system 148, other APIs, and other computerized programs or applications.

The principal components of system 100 may be subdivided into: header processing, protocol processing, accelerations, and parallel data object processing. Parallel data object processing is designed as a threading and synchronization model whereby the model utilizes various types of parallelization to process data objects concurrently. For example in networking, this would be using horizontal parallelization, vertical parallelization, and hybrid parallelization to process packets (data objects in networking) through different protocol layers.

Header processing includes parsing of packet headers at various protocol layers, creating headers for outgoing packets, extracting relevant information from headers, including identifying information of the protocol and the length of the header, updating information as needed, and performing tasks implied by the contents of the headers. Protocol processing may include generating messages as specified by the protocol and maintaining/updating the protocol state at each agent (e.g. initiator/target) involved. Accelerations include ancillary functions that are implemented in hardware to speed up common processing functions and transforms such as encryption, data copy, checksum calculation, and hash value computation.

Figure 2:
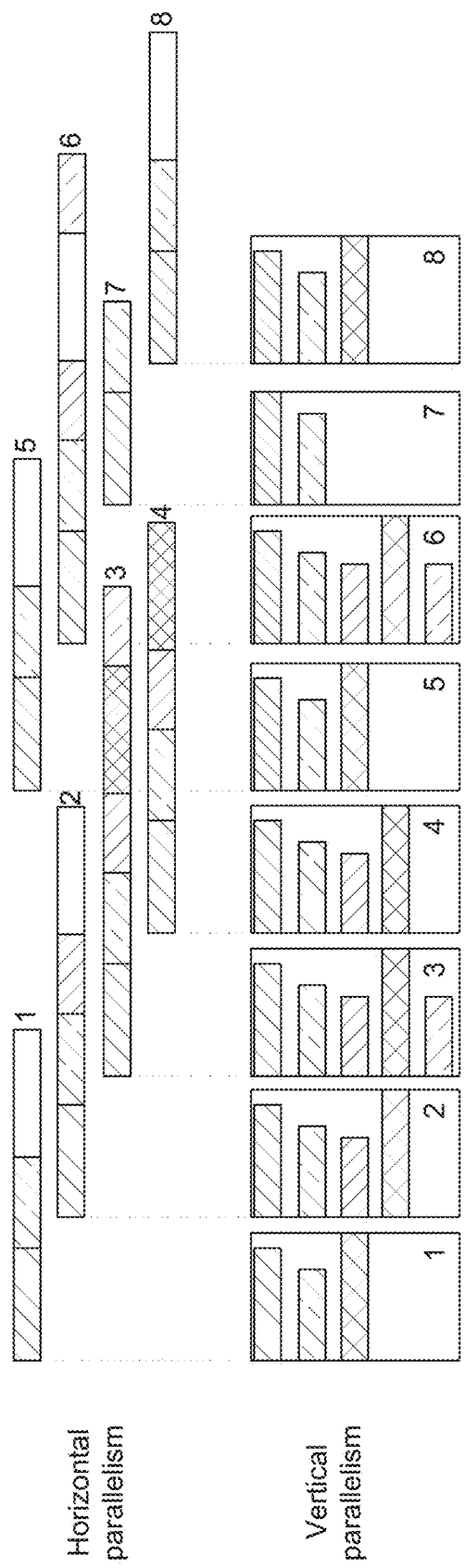
FIG. 2 illustrates an embodiment of the processing flow for processing eight data objects using horizontal parallelism and vertical parallelism.

There are two fundamental types of parallelism that may be applied for parallelizing a serial processing pipeline: horizontal parallelism and vertical parallelism. These are illustrated in FIG. 2. In horizontal parallelism, multiple pipelines execute concurrently for processing different data objects, but the stages in each pipeline are processed serially. In vertical parallelism, stages of the same pipeline processing a single data object execute concurrently. Horizontal parallelism and vertical parallelism may be combined into a hybrid approach, termed hybrid parallelism, where multiple pipelines provide horizontal parallelism, and within each horizontal pipeline, vertical parallelism may be used to execute different stages in parallel.

In horizontal parallelism, different data objects are processed in parallel in different threads of execution. Each thread serially processes one data object at a time through the pipeline. The minimal number of parallel threads required to handle data object processing at maximum input rate is given by the equation:

$$\#threads = \text{Ceiling}(t_{object}/t_{input})$$

where $t_{input}$ is the minimum time between consecutive data objects being input, and $t_{object}$ is the maximum time it takes to process a data object in the pipeline. Note that if $t_{object}$ is less than $t_{input}$ then one thread is sufficient to handle the workload which may be a desirable design characteristic in some cases.

In networking processing pipelines, and other pipelines as well, the number and types of stages for processing different data objects can vary widely. Different processing threads may execute the same processing for a layer concurrently, and the time to process a stage may be variable for different data objects. A synchronization method is needed between threads that are concurrently executing the same stage and may modify common state.

In horizontal parallelism, $t_{object}$ is given by the equation:

$$t_{object} = \Sigma_{all\ layers}\ t(i)_{stage}$$

where $t(i)_{stage}$ is the maximum time to process the i'th stage of a pipeline. The total time to process a data object in a horizontal pipeline thus equals the sum of times to process each of the constituent stages.

Data objects are expected to be processed in order through a serial processing pipeline. In the case of horizontal parallelism, data objects may be processed in a round robin fashion as they are input—the first object is processed by the first thread, the second object by the second thread, etc. If there are enough threads to satisfy:

$$\#threads = \text{Ceiling}(t_{object}/t_{input}),$$ then on input of the Nth+1 data object, where N is the number of threads, processing of the first object should be complete so that the first thread can commence processing the Nth+1 data object.

Figure 3:
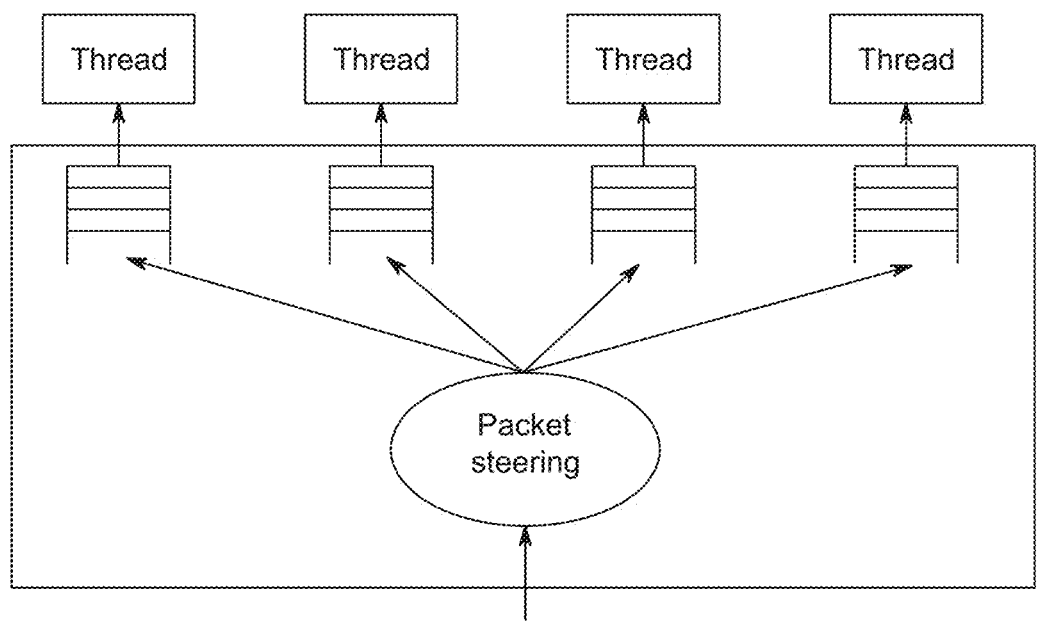
FIG. 3 illustrates the concept of multi-queue parallelism.

Multi-queue is a specialized form of horizontal parallelism that is commonly supported in host networking implementations. The concept of multi-queue is illustrated in FIG. 3. Receive Side Scaling (RSS) is a multi-queue technique implemented by NICs (Network Interface Cards) to perform parallel packet processing, and Receive Packet Steering (RPS) emulates RSS in software. These techniques employ multiple receive queues to facilitate parallelism.

When packets are received on a network interface they are steered to input queues. Multi-queue relaxes the requirement that packets are processed in order such that packets for the same flow must be processed in order. To achieve in-order processing for flows, packets for the same flow are steered to the same queue based on a classification algorithm that identifies the flow associated with a packet. An input queue is a FIFO queue containing received packets. Packets are dequeued and processed by a thread that handles an input queue. Usually, each queue is processed by only one thread to avoid the need to synchronize queue accesses amongst threads. The thread that handles a queue can be interrupt driven or do busy polling. In the interrupt driven model, when a packet arrives at an empty queue an interrupt is raised to wake up the handling thread for the queue. In the busy polling model, the processing thread continuously checks for queued packets in a tight loop. The interrupt model generally provides lower CPU utilization, but has higher latency than the busy polling model.

In a real system, the number of queues needed is determined by a number of factors. A typical RSS configuration would be to have one receive queue for each CPU if the device supports enough queues, or otherwise at least one for each memory domain, where a memory domain is a set of CPUs that share a particular memory level (L1 cache, L2 cache, NUMA node, etc.). In some specialized use cases, queues might be dedicated for packets of different priorities or for packets of specific applications.

While the concept of multi-queue was originally applied to packet processing in the networking receive path, it has since been applied in other use cases, such as parallelizing disk I/O, so it can be considered a general mechanism.

In vertical parallelism, different stages of the same serial pipeline processing a single data object are processed in parallel. The salient properties of a serial processing pipeline are that each stage is run to completion before starting the next stage, and every stage is implicitly dependent on all previous stages. So, in order to parallelize a serial processing pipeline, a synchronization mechanism is needed to handle dependencies between stages. Dependencies are unidirectional, a later stage can have a dependency on an earlier stage, but not the other way around. A model for dependency synchronization is described below.

For vertical parallelism, $t_{object}$ is given by the equation:

$$t_{object} = \text{Max}_{all\ layers}\ t(i)_{stage}$$

Where $t(i)_{stage}$ is the maximum time to process the i'th stage of a pipeline. The total time to process a data object in a vertical pipeline thus equals the maximum time to process any of the constituent stages. Note that per the equation of:

threads=Ceiling($t_{object}/t_{input}$), if $t_{object}$ is less than $t_{input}$ then a single vertical pipeline would be sufficient for processing the maximum input rate workload. Vertical parallelism scales well as the depth of serialized pipelines increases. If all the stages execute with some bounded latency, then adding stages to the pipeline should not appreciably increase latency.

Figure 4:
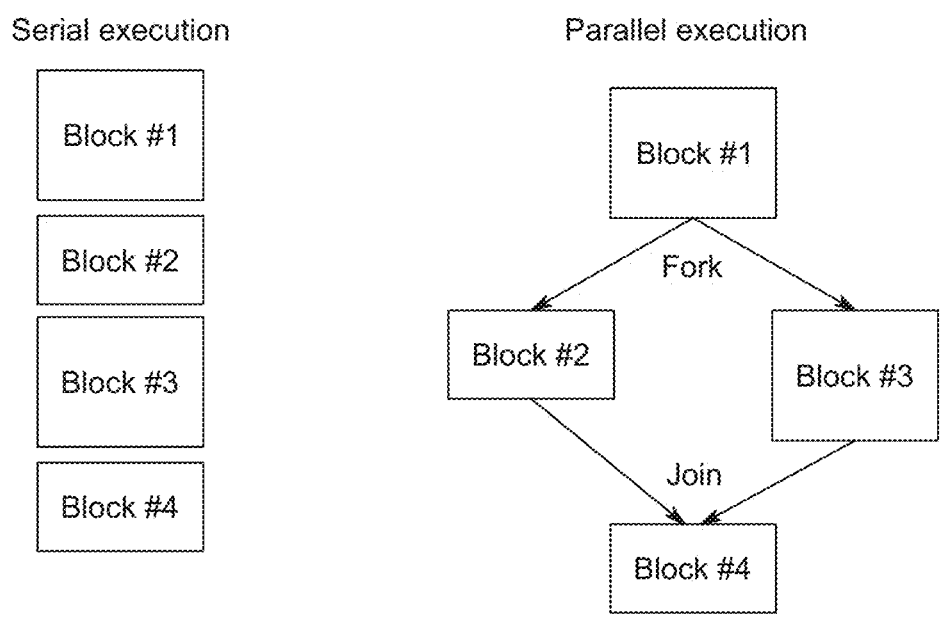
FIG. 4 illustrates an embodiment of the processing flow for block level parallelism.

Block level parallelism is a specialized form of vertical parallelism that allows fine grained parallelization of independent blocks of code within a code path. FIG. 4 illustrates this concept. Block level parallelism may be implemented using a fork and join model. A fork operation is done to create a new ephemeral thread. One of the parallel code blocks runs in the original thread, and the other runs in the ephemeral thread. The ephemeral thread executes its code block and then exits. The original thread executes its code block and then performs a join operation to wait for the ephemeral thread to exit. The model can be extended to allow creation of multiple ephemeral threads.

Block level parallelism is at the level of code blocks and should be amenable as a compiler optimization that would identify parallelizable code paths to output an executable that does parallel execution. For purposes of discussion, we may assume that an explicit interface can be defined that informs the compiler about code blocks that can be parallelized.

An example of a macro that informs the compiler that some blocks of code are independent and can execute in parallel, may be:

PARALLELIZABLE(block1, block2, . . . )

As an example of block level parallelism, consider the code as follows whereby checksum verification and connection lookup are performed while processing a TCP packet.

if (checksum_verify(packet, iphdr, tcphdr))
        goto drop_packet
    if (!(cnx=tcp_cnx_lookup (iphdr, tcphdr)))
        goto drop_packet checksum_verify and tcp_cnx_lookup are independent operations so they can be run in parallel. The following is example of a non-limiting code of how the operations might be parallelized:

```
PARALLELIZABLE(
    { cres = checksum_verify(packet, tcphdr) },
    { cnx = tcp_cnx_lookup(iphdr, tcphdr) }
)
if (cres || !cnx)
    goto drop_packet
```

The equations $t_{object}=\Sigma_{all\ layers}\ t(i)_{stage}$ and $t_{object}=\max_{all\ layers}\ t(i)_{stage}$ may be used to determine the effect on execution time when using block level parallelism.

To achieve highest throughput, a combination of vertical parallelism and horizontal parallelism, termed hybrid parallelism, may be employed.

Figure 5:
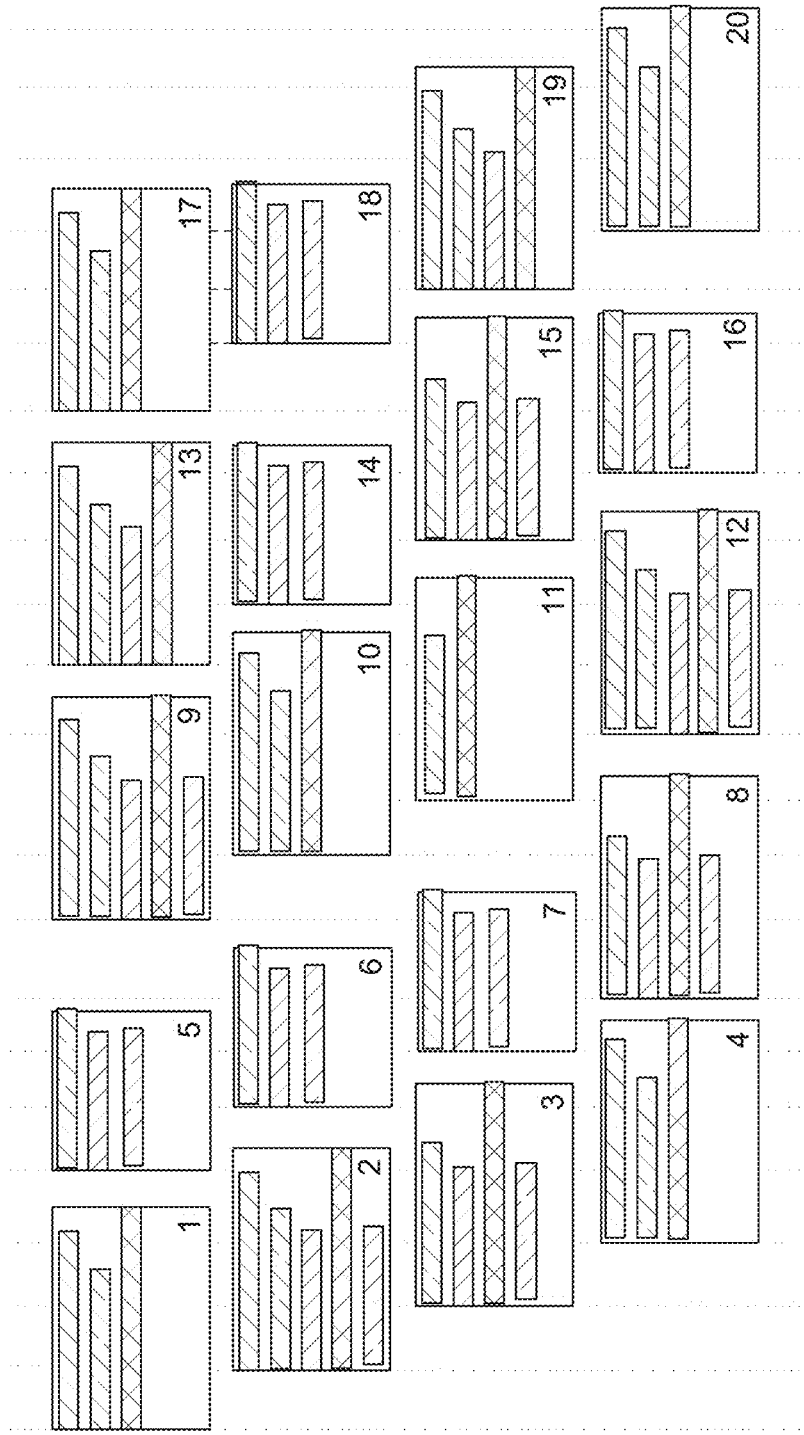
FIG. 5 illustrates an embodiment of the processing flow for processing twenty data objects using hybrid parallelism.

FIG. 5 demonstrates an example processing flow for processing twenty data objects using hybrid parallelism. In this example, there are four horizontal serial processing pipelines. Within each horizontal pipeline, vertical parallelism is applied to data object processing with at most five layers being processed concurrently.

Per the equation #threads=Ceiling($t_{object}/t_{input}$), hybrid parallelism is effective when $t_{object}>t_{input}$. For high throughput applications, such as a high-speed network switch, it is likely $t_{object}>>t_{input}$ even when vertical parallelism is in use.

In hybrid parallelism, vertical and horizontal parallelism work in concert to achieve high throughput. Vertical parallelism bounds the latency to process a single data object regardless of the pipeline depth, so that latency in data object processing has relatively low variance. This minimizes $t_{object}$, and, per the equation #threads=Ceiling($t_{object}/t_{input}$) the number of required horizontal pipelines is thus minimized. The benefit of this is that hybrid parallelism allows scaling to high throughput, minimizes per data object latency, and is more efficient use of resources (i.e. better "bin packing") than either vertical or horizontal parallelism alone.

In some cases, the number of threads available to a vertical pipeline may be limited to be less than the depth of the pipeline for data objects being processed. This scenario may be known as constrained vertical parallelism. Conversely, if the number of available threads is greater than or equal to any possible pipeline depth then that is called unconstrained vertical parallelism.

In constrained vertical parallelism, when a thread is not available, the dispatcher will block until one is available. A thread becomes available when a running thread finishes. In this architecture, processing pipelines are work conserving so that at least one thread for some stage is running and guaranteed to finish without blocking.

For constrained vertical parallelism, $t_{object}$ is given by the equation:

$$t_{object}=\text{Ceiling}(\#stages/\#threads)*\text{Max}_{all\ layers}\ t(i)_{stage}$$

threads indicates the number of threads available to the vertical pipeline, and #stages indicates the number of stages in the vertical pipeline. Note that if #threads>#stages then the equation is equivalent to $t_{object}=\text{Max}_{all\ layers}\ t(i)_{stage}$. If #threads is one, then the equation degenerates to $t_{object}=\Sigma_{all\ layers}\ t(i)_{stage}$ with no vertical parallelism.

Figure 6:
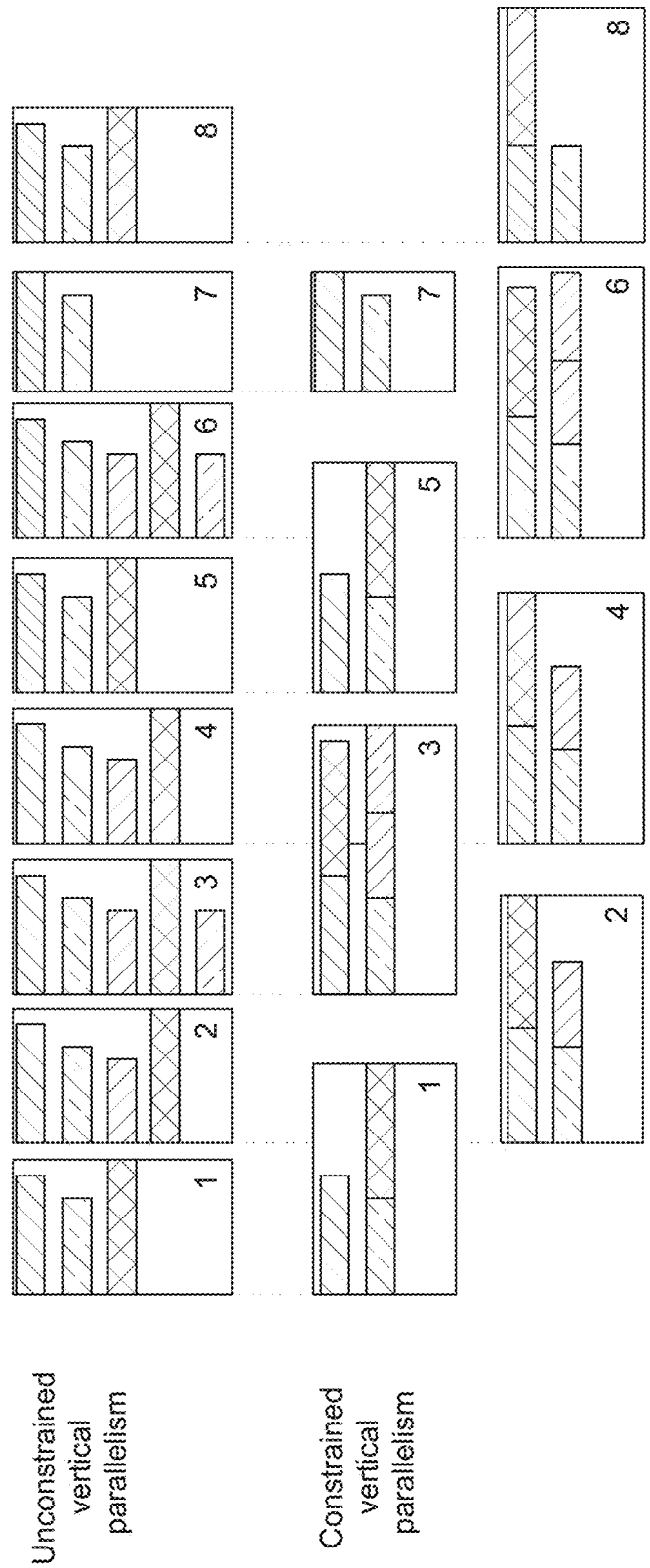
FIG. 6 illustrates an embodiment of the processing flow of unconstrained constrained vertical parallelism.

FIG. 6 illustrates the processing flow of constrained vertical parallelism. The diagram shows processing of eight packets in constrained and unconstrained parallelism. In this example of unconstrained vertical parallelism, vertical parallelism is limited to two threads per vertical pipeline. To handle the input rate, hybrid parallelism is used with two horizontal pipelines.

The fundamental elements for parallelism in a serial processing pipeline are data objects, external data, threads, and dependencies. A data object is one instance of data that a pipeline processes. In the case of networking, a data object is a packet or a Protocol Data Unit (PDU). Data objects have fundamental characteristics including the set of bytes that comprise the data of the object (e.g. packet data) and the length of the object in bytes (e.g. packet length). The length is counted from the first byte of the object through the last byte. As described below, processing of an object may commence before all the bytes are available, in which case the object length is dynamic and at any given time refers to the monotonically increasing number of object bytes currently available to be processed. Data objects may include an indication that the full object has been received (e.g. Ethernet frame has been received). When indicated, the whole object has been received and the reported object length is the final length of the object.

Metadata constitutes any data about a data object that is collected and recorded by one pipeline stage and can be consumed by another stage in processing. For instance, in networking processing, one stage may extract fields from the protocol layer it is processing so that later stages can consume the information. For example, IP layer processing may record the IP addresses in metadata so that the downstream TCP processing can use the addresses in connection lookup. Dependencies are used to synchronize between metadata producers and consumers.

External data constitutes any configuration or state information that is used by some stage in a pipeline and is global across all the pipeline stages and instances. External data may be read or written by the pipeline stages. Access to the data is synchronized by a dependency. For instance, the dependency "access control data" may be defined. A layer that writes control data would block the dependency and resolve it once the data is written. A layer that reads the data would wait on the "access control data" dependency.

A thread is one unit of execution in processing. In this architecture different threads are used to process each stage of a vertical pipeline. For example in networking, one thread may be employed to process the IP layer header of a packet, and another may process the TCP layer header in the packet. Threads are supported by the underlying operating system to allow concurrent execution (for instance in Linux, pthreads provides this functionality). The threads for vertical parallelism can be described as micro-threads or fibers that execute and run to completion, without preemption, in the context of processing a single data object.

Some number of OS level threads are created to perform serial processing. Each thread runs an event loop that polls a work queue for new work to be performed. A queue contains work items, each of which describe a unit of work being requested. A work queue may be per thread or shared amongst several threads, and a single entry work queue per thread may be used to allow precise scheduling of one work item to a thread. A work item includes all the necessary information for processing some work including the data object to process, the specific function that the thread should perform, as well as other contextual information needed for processing in the specific use cases.

When work becomes available to a thread, that is there is an item in the work queue, it dequeues the first item in the queue and performs the requested processing by calling an appropriate function. Note that the event loop may block on a conditional variable while waiting for new work in the queue and would be woken up by another thread that added work to the queue (a scheduler thread for example). When the processing function returns, the thread is considered to be in done state and the event loop reinitializes to process the next item in the work queue.

A thread will block while it is waiting on a dependency to be resolved or waiting for a long acceleration function to return. While a thread is waiting, another thread can be scheduled to run on its CPU. All dependencies are handled within the context of the vertical and horizontal pipelines, there are no external dependencies. The unidirectional properties of dependencies prevent deadlock. Threads may be terminated due to an exception. For instance, if when processing a layer an error condition is discovered that renders the work of subsequent stages irrelevant, a thread may terminate all downstream threads of a vertical pipeline. When a thread is terminated, any unresolved dependencies that the thread blocks are implicitly resolved and the thread is reset to its initial state.

Threads may be grouped together into the thread sets. A thread set defines an instance of a vertical pipeline for processing a data object in a horizontal pipeline and is composed of some number of worker threads that may be created and allocated to the thread set at initialization. At any given time, a worker thread is either "available", that is not currently running, or "busy", meaning it is running and processing data. Each thread set may run a top thread that implements an event loop which calls an input function for the thread set. The input function ran in the top thread is called the top function. The top function runs when the thread set is started to process a data object and it schedules the worker threads to perform the processing of a data object. Additionally, other non-worker threads may be dynamically created and scheduled to participate in processing of a data object.

The set of threads actively running and processing data is maintained by a thread set in an ordered list of threads for the thread set. The ordered list determines the downstream and upstream relationships between threads which are needed for dependency resolution. When a thread completes (becomes "done") it is removed from the ordered list. When worker threads are started they are automatically added to the ordered list. Both the top thread and other non-worker threads created in the context of a thread set may attach to the ordered list of threads processing a data object. Once attached, these threads take on the characteristics of worker threads in that they can participate in processing stages of the pipeline and in dependency resolution, including being able to wait on and resolve dependencies. An attached thread can be functionally detached which removes the thread from the ordered list (however it does not reset or kill the OS thread); the thread may later be reattached to the thread set. Worker threads of a thread set can be scheduled to run in two ways: top function scheduling or cascade scheduling.

Figure 7:
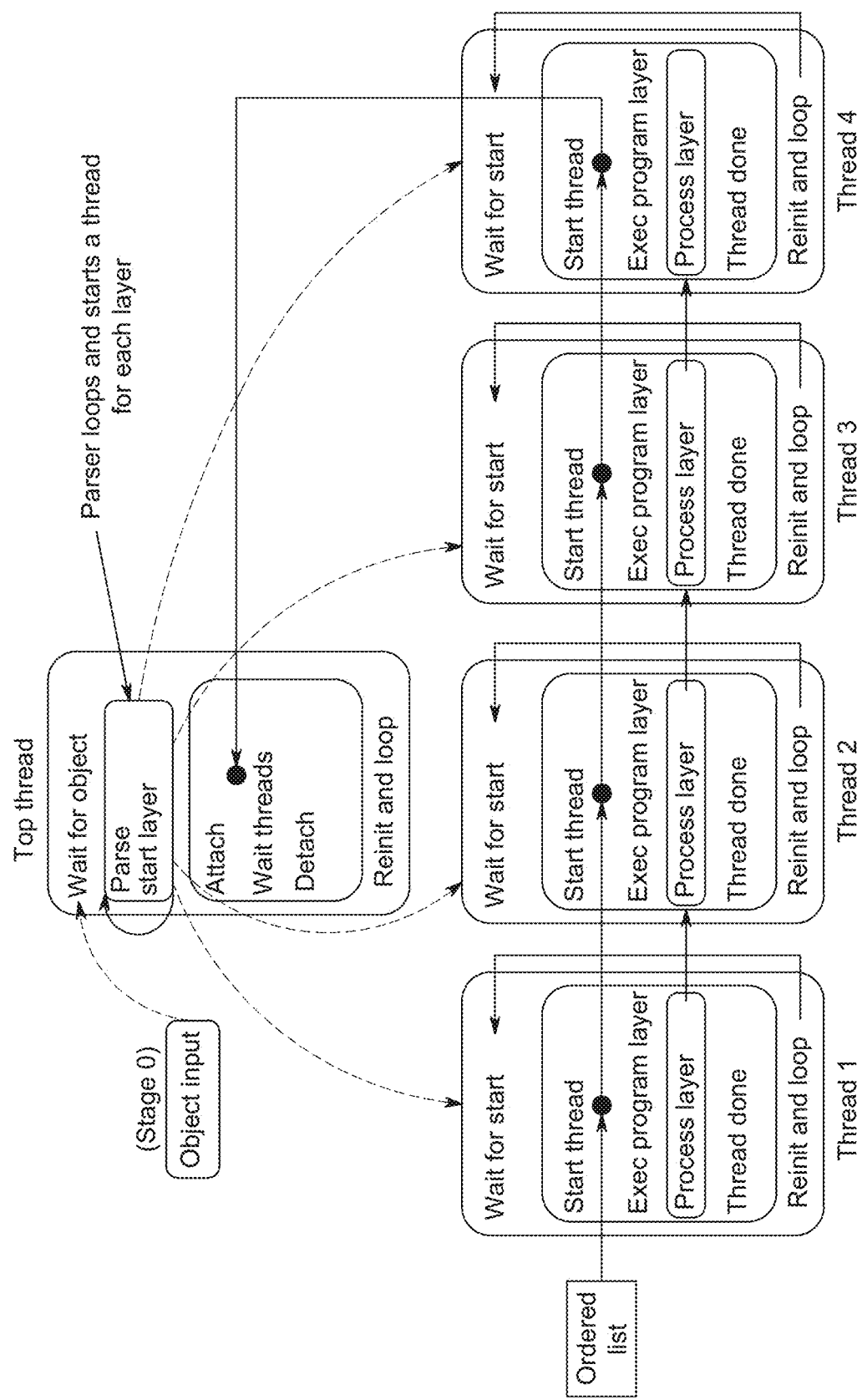
FIG. 7 illustrates an embodiment of top function scheduling.
Figure 8:
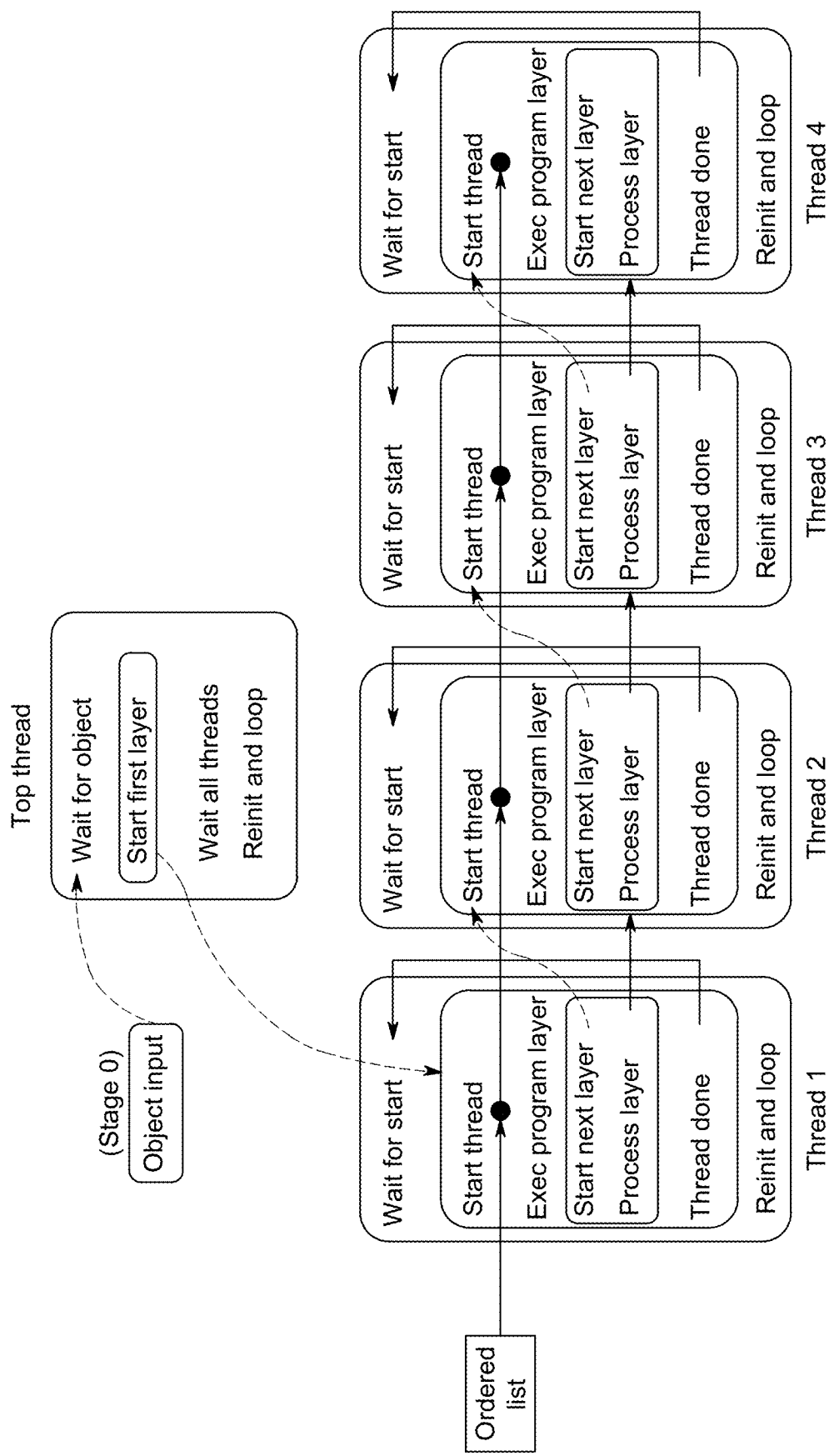
FIG. 8 illustrates an embodiment of cascade scheduling.

FIGS. 7 and 8 illustrates top function scheduling and cascade thread scheduling and parallelism in a serial processing pipeline. In both examples, four worker threads, labeled Thread 1 to Thread 4 in the figures, are needed to process a data object. Processing commences when a data object is input and work for the object is placed on the thread set's work queue. The event loop for the thread set dequeues the work item and invokes the top function.

In top function scheduling (FIG. 7), the top function schedules all the worker threads needed to process a data object. The top function performs the necessary processing to determine the constituent layers in the object to be processed (in networking this might be the protocol headers of a packet). For each layer, a worker thread is started by queueing a work item in the work queue of an available worker thread (indicated by the dashed arrows from the top thread to the worker threads). After all of the worker threads are started, the top function may attach to the ordered list as shown in the example. Once attached, the top function can call "wait threads" to wait for all preceding threads to compete (in the example of FIG. 7 the preceding threads are Thread 1 to Thread 4).

In cascade scheduling (FIG. 8), the top function performs minimal processing of the data object and starts the first worker thread to process the object by placing a work item in an available thread's work queue (this is indicated by the dashed line from the top thread to the first worker thread). After starting the first worker, the top thread calls "wait all threads". The first thread, Thread 1, wakes up and dequeues the work in its work queue. Thread 1 processes the data object to determine the next layer that is to be processed, and starts the next worker, Thread 2 in the diagram, to process the next layer in the pipeline. Similarly, Thread 2 starts Thread 3, and Thread 3 starts Thread 4. The cascade stops at Thread 4 which does not schedule a next worker. After starting the next layer, each worker thread processes its own layer in the data object.

When processing completes for a worker thread, the thread is "done" and is reinitialized to process the next work item. Once all the worker threads are done, "wait all threads" returns in the top function for cascade scheduling, or "wait threads" returns in top function scheduling. In either case, the top function can perform any necessary tail processing for the data object and when such processing is complete the top thread is "done" and is reinitialized to process the next work item in the thread set queue.

Top function scheduling and cascade scheduling may be used in tandem where the top function initially starts some number of threads for processing a data object, and the last thread started may create more threads in the pipeline via cascade scheduling.

There are two limits that may be hit when attempting to schedule a worker thread: 1) the maximum number of worker threads in the thread set 2) the maximum number of threads that may be in the thread set's ordered list. The second of these limits is also applicable to attaching a thread to a thread set. When either of these limits are hit, a work item describing the work to be done may be added to a work queue in the thread set. The contents of the queued work item depend on whether a worker thread is being scheduled or a non-worker thread, including the top thread, is being attached. In the case of a worker thread being scheduled, a queued work item contains a reference to a function to run as well as a pointer to the data in the data object that the function will process. When a worker thread is available and there is availability in the ordered list and there is a queued work item for scheduling a worker thread at the head of the queue, the work item is dequeued and a worker thread is started to execute the function listed in the work item following the procedures described above.

In the case that the limit on the ordered list is hit when attaching a thread, a work item containing a reference to the thread being attached is added to the work queue. Subsequently, when there is availability in the ordered list and a queued work item for attaching a thread is at the head of the work queue, the work item is dequeued and the thread described in the work item can be formally attached to the thread set's ordered list. When a work item for attaching a thread is queued, the thread being attached may block until the work item is dequeued and the attach completes; or the attach function may return with a code that indicates that completion of the attach operation is pending and an asynchronous mechanism may be used to determine when the attachment has completed.

Threads can be killed so that they stop processing, become "done", and are reinitialized to process the next work item. Note that this is a "soft kill" in that the underlying OS thread continues to run. There are two operations to kill threads: "kill threads" and "kill all threads". "Kill threads" is called by a worker thread or an attached thread of a thread set to kill all the threads that are downstream of the currently running thread in the order list of a thread set; this includes killing threads that are actively running and are in the ordered list, as well as flushing the work queue for the thread set. "Kill all threads" is called externally, from a non-worker or unattached thread, and kills all the threads in a thread set and flushes the work queue.

When all the necessary threads to process a thread set have been started, a thread set can be closed by invoking a "thread set close" function. When a thread set is in closed state, no additional worker threads can be started and no non-worker threads can be attached to the thread set. Closing a thread set initiates propagation of resolved dependencies between threads sets as described below.

A datapath defines an instance of a full serial data processing pipeline and is composed of some number of thread sets where each thread set can process one data object at a time. Thread sets of the datapath can execute concurrently, subject to inter thread set dependencies being correctly handled, to achieve horizontal parallelism. The thread sets are well ordered based on the order of input objects into the serial data pipeline.

A number of thread sets may be created and assigned to a datapath at initialization. A thread set is either "available", that is not currently processing a data object, or "busy" meaning it is processing a data object. The busy threads sets that are kept in an ordered list for the datapath that provides the relative ordering amongst busy thread sets in the datapath (the ordered list is used for inter thread set dependency resolution as discussed below). Each datapath has a serialized input scheduler function that serves as the scheduler of the thread sets of the datapath. When an object is input into the datapath, the scheduler tries to select a thread set among the set of available thread sets. If a thread set is available it is reserved as busy and it is inserted at the tail of the ordered list of busy thread sets for the datapath, and the top function for the thread set is run. If no available thread sets are available, that is all the allocated thread sets in the datapath are busy processing data objects, the scheduler may queue a work item for the data object in a datapath work queue. Subsequently, when a thread set completes its processing for an object and is "done", the thread set becomes available; the scheduler can dequeue a work item from the datapath's work queue and proceed to start a thread set to process the object described in the work item. A datapath work queue may have a limit on the number of objects that can be queued. If the scheduler encounters a datapath work queue that has reached the limit then it may wait until there is availability in the queue or return an error code to the caller.

Dependencies are a synchronization mechanism used when one pipeline stage is dependent on processing in another, and correspondingly a dependency is one instance of the mechanism. A stage that has a dependency on another stage cannot proceed to execute in the critical region corresponding to the dependency until the stage it depends on has executed the necessary code to satisfy and resolve the dependency. In this architecture, dependencies are strictly unidirectional so that a later stage can have a dependency on an earlier stage, but not the other way around. To parallelize a serial processing pipeline, an explicit synchronization mechanism for dependencies between stages is needed. Dependency synchronization can be expressed as resolve points and wait points. A resolve point is a point in the code path of a stage at which processing has been done to satisfy a dependency of a later stage. A wait point is a point in the code path of a stage at which execution cannot proceed until a dependency in an earlier stage has been resolved. Wait and resolve primitives are implemented in the API to synchronize between wait and resolve points.

As an example, consider a dependency between the pipeline stage for TCP processing and the stage for IP. TCP layer processing can perform basic validation on a TCP header and can even perform connection lookup in parallel with IP layer processing. However, the TCP layer cannot commit to accepting the packet and cannot change the state of a corresponding Protocol Control Block (PCB) state until the IP layer has completed its validation and has itself accepted the packet. A wait point is defined in the TCP code path before accepting the packet and committing changes; a resolve point is defined in the IP layer code after all validation checks and the packet is accepted. Note that the IP layer processing has no dependency on TCP and can run to completion without being blocked by TCP or any later stage.

Dependencies may be defined and enumerated. For instance, in the above example, a dependency for "IP layer accepted packet" can be defined. The set of enumerated dependencies amongst all possible protocol layers constitutes the set of dependencies in a pipeline. It is expected that the maximum number of dependencies for a pipeline is a relatively small number (e.g. thirty-two) to facilitate efficient implementation. The set of dependencies that a code path resolves may be declared at thread initialization. Multiple threads may resolve the same dependency, and each such instance effectively creates a new dependency. This property is exploited with network encapsulation. For example, in IP-in-IP encapsulation, the IP protocol layer appears twice in the pipeline so an "IP layer accepted packet" dependency would be resolved by threads in two different vertical pipeline stages. A wait point in transport layer code for an encapsulated IP packet has a dependency on the inner IP header for "IP layer accepted packet".

Figure 9:
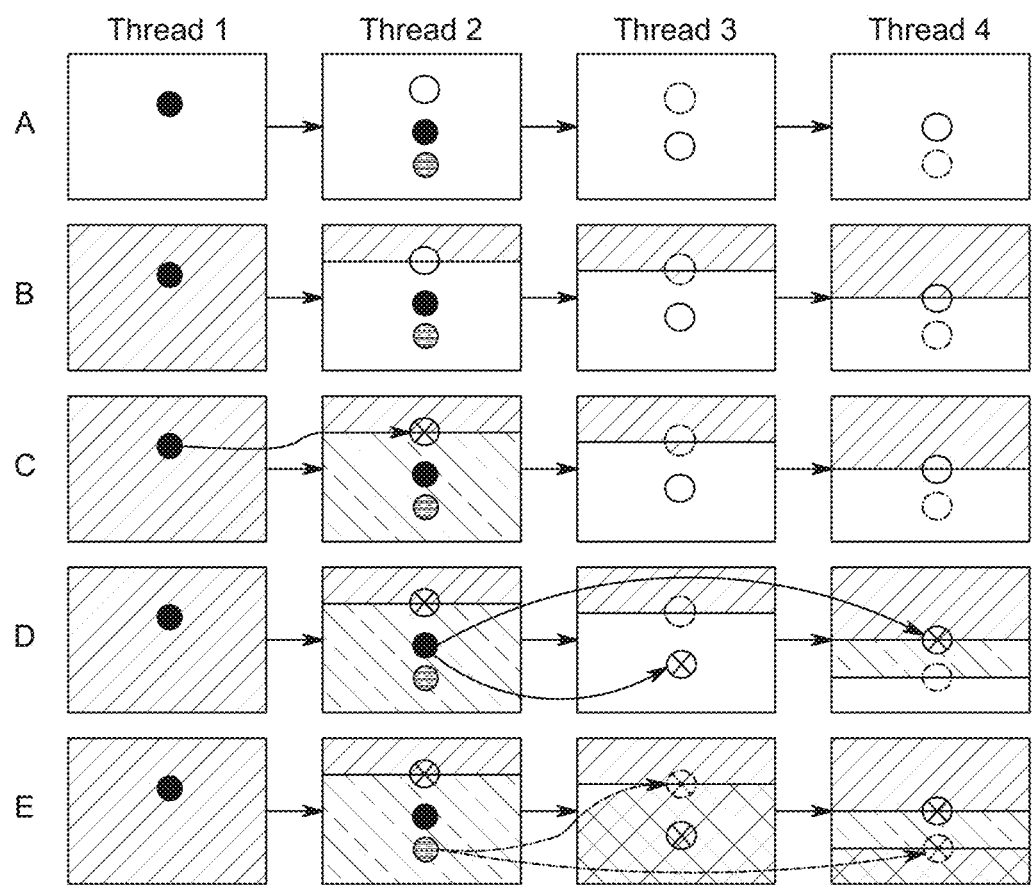
FIG. 9 is an example of parallelized processing for an object in a four-stage pipeline and how dependencies are resolved to advance processing.

When a thread resolves a dependency, downstream threads are informed of the resolution and execution can proceed through wait points for the dependency. To do this, a resolution signal is propagated to downstream threads. The signal is propagated within the thread set until one of these conditions are met: 1) the end of the thread list for the pipeline is reached, 2) a thread is encountered that blocks the same dependency, 3) a thread is encountered for which the same dependency has already been resolved. FIG. 9 provides an example of parallelized processing for an object in a four-stage pipeline and how dependencies are resolved to advance processing.

The columns in the diagram of FIG. 9 refer to the threads for the four pipeline stages labeled Thread 1 to Thread 4. The rows of the diagram, labeled A to E, provide points in the timeline of the pipeline for discussion. There are two dependencies represented by black and shaded circles. Solid circles indicate resolve points for dependencies. Hollow circles indicate wait points for dependencies that are not yet resolved, and crossed circles indicate wait points for dependencies that have been resolved by an earlier stage.

Line A in the diagram shows the state of dependencies before execution commences. Line B shows the initial execution allowed in the four stages. The upward slanting areas represent portions of stages that have no dependencies and can run in parallel from the start. In Line C, Thread 1 resolves the black dependency, at this point the downward slanting right patterned section in Thread 2 can now run. In Line D, Thread 2 resolves the second instance of the black dependency—at this point the downward slanting right patterned section in Thread 4 can run. Although the black dependency is now resolved for Thread 3, it cannot proceed any further since it is still waiting on the shaded dependency. Finally, Line E shows that Thread 2 resolves the shaded dependency so that the cross patterned portions of Thread 3 and Thread 4 can now run.

The threads in a processing pipeline are reinitialized once their work on a data object is complete. The only time that a thread will block is when it is waiting on a dependency. All dependencies are handled within the context of the pipeline, there are no external dependencies. The unidirectional properties of dependencies ensure there is no possibility of deadlock.

If synchronization is required with an external event or data, a special pseudo data object can be inserted into the pipeline. For instance, if the pipeline processing accesses external configuration data that is written by an external agent, then the data access can be synchronized by an "external data" dependency. An object could then be created so that its processing blocks the "external data" dependency, writes the external data, and then resolves the "external data" dependency once writing the data is complete.

When hybrid parallelism is in use, each horizontal pipeline contains its own dispatcher that initiates scheduling threads for vertical parallelism when a new object is input to the pipeline. Dependencies may be propagated from one horizontal pipeline to the next. Resolution signal propagation happens between the pipelines only after the last thread in the earlier pipeline is created. The propagation happens similarly as described above. When a dependency is resolved for the last thread of one horizontal pipeline, the resolution signal propagates to the first thread of the next horizontal pipeline (which may be the first thread processing the next in-order data object).

Note that there are effectively two classes of dependencies with respect to hybrid parallelism. One class contains dependencies that are only of interest in the context of a single vertical pipeline processing an individual object. For instance, the "IP layer accepted" dependency is only of interest to later stages processing a network packet. The other class refers to dependencies that are of interest between horizontal pipelines. For instance, the "external data" dependency could be used to synchronize reading and writing external data between processing in two horizontal pipelines. The dependency model does not need to distinguish between these classes. A resolution signal for a dependency that is only of interest within a vertical pipeline of one horizontal pipeline may logically propagate to another horizontal pipeline, however in the receiving pipeline a blocker of the dependency that is not a watcher (see below) would be placed before any watchers so that the resolution signal is disregarded.

Dependencies define dependencies between stages of the processing pipeline. These may be represented by an ordinal number of 0, 1, 2 and so on up to a maximum number of dependencies (e.g. thirty-two). However, this is non limiting and may be represented by any type of number or indicator reference. Dependencies may be grouped together in one or more dependency sets. Having a small number of maximum dependencies affords the possibility of using a bit mask to represent a dependency set.

Threads are units of execution where a thread is created for each stage in a pipeline. Each thread implements a continuous event loop. Threads are created in an initial "object wait" state and are started by invoking a thread function that describes the data object processing to execute. Once a thread is started it is "running", and when the thread completes its processing it is "done" and re-initializes to "object wait" state. The thread function structure indicates the dependency waiters and blockers contained in its processing. A thread may run a different thread function each time it is started. A thread set is created for a pipeline and contains all the threads in a pipeline and the set of thread functions that may be invoked. A thread set also contains the run state for a pipeline, for instance to track dependencies that threads are waiting on. Threads are ordered by when they were created, and this ordering is used in the dependency synchronization model to describe earlier and later stages. The maximum number of threads in a thread set might be bounded so that sets of threads could be represented by bitmaps. A thread may be a dependency watcher, blocker, or waiter. A dependency watcher is a thread interested in monitoring a dependency and may wait on it. When a thread is created, the set of dependencies that the thread watches may be declared. The thread set maintains a list of watchers for each dependency. A dependency waiter is a dependency watcher actively waiting on a dependency.

A dependency blocker is a thread that blocks a dependency. The thread must resolve the dependency before the dependency resolution signal is propagated to later threads. A dependency blocker may also be a dependency watcher. When a thread is created, the set of dependencies that the thread blocks is declared and the thread set maintains a list of blockers for each dependency. Once a dependency blocker has resolved a dependency, it may be removed from the list of blockers for the dependency.

Figure 10:
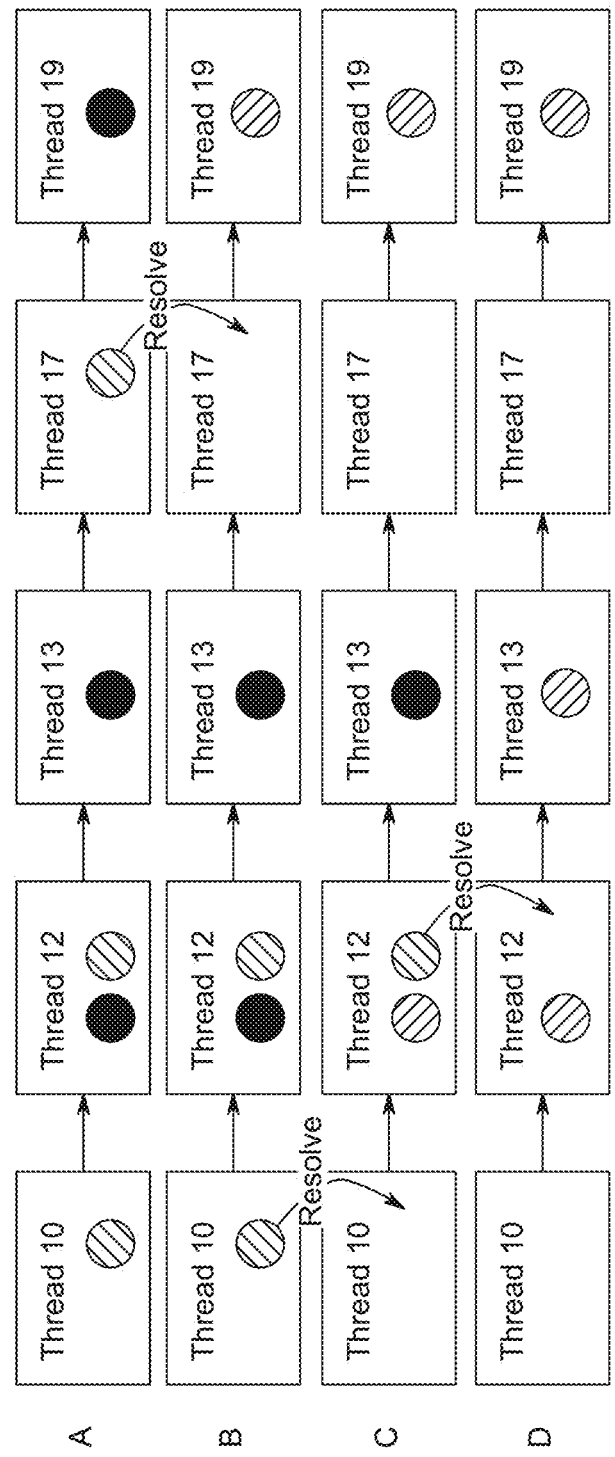
FIG. 10 illustrates an embodiment of the operation of dependency processing.

FIG. 10 illustrates the operation of dependency processing. The diagram shows the list of blocker and watcher threads for a dependency. Blockers are indicated with a solid black circle, watchers of an unresolved dependency are indicated by an upward angled striped circle, and watchers of a resolved dependency are indicated by a downward angled striped circle. Once a blocker has resolved a dependency, it is removed from the list of blockers for the dependency.

The rows marked A, B, C, and D show the list in four states. In the initial state, line A, there are three blockers and three watchers. Thread 10 and Thread 17 are blockers but not watchers, Thread 13 and Thread 19 are watchers but not blockers, Thread 12 is both a watcher and a blocker. In line B, Thread 17 resolves the dependency. The resolution signal is propagated to Thread 19 and then stops because the end of the list is reached. Note that Thread 17 is not a watcher of the dependency so that it is effectively creating a new independent instance of the dependency from that in earlier threads. In line C, Thread 10 resolves the dependency. The resolution signal is propagated to Thread 12, but goes no further as Thread 12 is a blocker of the dependency. The dependency is now resolved for Thread 12. Subsequently in line D, Thread 12 resolves the dependency. The resolution signal is propagated to Thread 13 but stops at Thread 19 because the dependency is already resolved for Thread 19.

Dependency resolution may be propagated from one thread set to another in the ordered list of thread sets in the datapath. Dependencies that may be propagated between thread sets are called propagated dependencies and are declared in the configuration of a datapath. The propagated dependencies must be a subset of all the dependencies defined for a datapath, and each dependency is either propagated or non-propagated. With regards to dependency resolution amongst threads in a thread set, propagated dependencies are indistinguishable from non-propagated dependencies. Propagated dependencies that have been resolved and are not blocked by the last thread of a closed thread set may be resolved in the next thread set in the datapath's ordered list.

The terminating thread of a thread set is the last thread in the ordered list when there are no items on the thread set's work queue and the thread set is closed. Resolving a dependency in the next thread set is done by propagating a dependency resolution signal starting from the first thread in the following thread set in the datapath ordered list of thread sets. There are three events that can initiate dependency resolution propagation between threads sets: When a thread set is closed by calling the "thread set close" function; When a dependency is resolved for the terminating thread in a closed thread set; When a thread set is added the datapath and the preceding thread set in the datapath ordered list is closed.

If a dependency resolution is propagated between thread sets and the resolution signal reaches the terminating thread in the following thread set which is also closed, then the dependency resolution may be further propagated to the next next thread set. Hence, a single dependency resolution may resolve a dependency in multiple thread sets.

Early propagated dependencies are propagated dependencies for which dependency resolution can be propagated to the next thread set before the origin thread set is closed. Early propagated dependencies must be a subset of the propagated dependencies for a datapath. A propagated dependency is either "early propagated" or "not early propagated". If a thread set is closed and the terminating thread is running then early propagated dependencies have the same semantics as not early propagated dependencies. An early propagated dependency can only be blocked by at most one thread in a thread set (the system may enforce this rule). The resolution signal of an early propagated dependency can be propagated from a thread set that is not yet closed if the following conditions are met: The dependency has been resolved for the last running thread in the ordered list (the work queue may be non-empty in this case); Either, exactly one thread in the thread set has blocked and then resolved the dependency, or the dependency is a non-blocked early propagated dependency for the thread set (see below).

A thread set may declare a set of non-blocked early propagated dependencies, these are early propagated dependencies for which it is known a priori that they will not be blocked by any threads in the thread set. Non-blocked early propagated dependencies "pass through" a thread set, that is once a dependency is resolved for the first thread in the thread set its resolution can be propagated to the next thread set in the datapath. The non-blocked early propagated dependencies must be a subset of the early propagated dependencies for the datapath. The system may enforce the rule that a non-blocked early propagated dependency must not be blocked by any thread in the thread set.

If a new thread set is added to the ordered list for a datapath which was previously empty, that is this is the first thread set in the ordered list, then all the propagated dependencies are automatically resolved. If a thread set is being added to the list after an existing thread set, then the initial set of resolved propagated dependencies of the thread set is determined based on the dependency resolutions propagated from the previous thread set (per above rules).

As described in the discussion of RSS, in order processing semantics may be relaxed such that only packets within a flow are processed in order. This concept can be generalized to serial data processing as data objects that belong to the same logical flow can be grouped together and in order processing of objects is maintained within that group. A dependency channel contains an ordered list of threads sets that are processing objects within a logical data flow. A datapath maintains a number of dependency channels, where each channel contains an ordered list of thread sets that are processing objects of the same logical flow.

A set of channel dependencies are used to maintain the order processing semantics and synchronization among the thread sets of a channel. Channel dependencies are declared in datapath configuration and are propagated dependencies and so must be a subset of the propagated dependencies for a datapath. A propagated dependency is either a "channel dependency" or a "non-channel dependency". Channel dependencies can be early propagated dependencies or not, and if they are early propagated dependencies they can also be non-blocked early propagated dependencies for a thread. A datapath may contain multiple sets of dependency channels where each has its own logically independent instance of the channel dependencies.

A thread set joins a dependency channel via a "join channel" operation. An argument specifies which channel to join, for example as a channel identifier. A thread set is joined to the channel by adding it to the ordered list of thread sets for the channel. Once a thread set has joined a dependency channel it is joined for the remaining lifetime of the thread set for processing a data object. A thread set could join more than one dependency channel if multiple dependency channel sets are supported by the datapath; in this case the arguments to a join operation would specify both the dependency channel set to join and the identifier of the channel within the set. To avoid dependency deadlock, the relative ordering of thread sets in a dependency channel must be the same as that in the ordered list of a datapath. For example, if thread A is in the datapath ordered list before thread B, then thread A must join a dependency channel before thread B does.

Initially, when a thread set starts, the thread set is not joined to a channel. Typically, some processing would be required on a data object to determine the logical flow that the object belongs to and hence which channel to join. A thread set is not required to join a channel as might be the case of an object that is processed independently with respect to all other objects. As propagated dependencies, channel dependencies that have been resolved and are not blocked by the terminating thread in a closed thread set (or are early propagated dependencies), are resolved in the next thread set of the dependency channel by propagating a resolution signal at the first thread of the next thread set.

In the case of channel dependencies, the next thread set is determined by the ordered list for the dependency channel to which the thread set joined. In this manner, channel dependencies are propagated amongst the thread sets of a channel. Note that the set of channel dependencies are the same for all channels of a datapath, however since they are only propagated amongst thread sets of the same channel they are effectively independent sets of dependencies between channels. If a thread set has joined a channel then channel dependencies are propagated between thread sets of the channel following the same rules as how non-channel dependencies are propagated between thread sets of a datapath. If a thread set has not joined a channel, then propagation of any candidate channel dependencies is deferred until the thread set joins a channel. If a thread set never joins a channel, then dependency resolutions for channel dependencies are never propagated from the thread set processing a data object.

A common implementation of dependency channels will be to employ a hash table that contains an array where each entry defines a channel and contains the ordered list of thread sets joined to a channel. A channel identifier would be an index into the array. To determine a channel to join, a thread might hash over fields of a data object that identify a flow (e.g. in networking a hash over the 5-tuple of protocol, IP addresses, and transport port numbers might be done). The hash value can then be converted to an index in the channel table by performing a modulo of the value with the size of the table. Note that this technique does not necessarily yield a one to one mapping between logical flows and channels (in the same way that RSS does not do that).

There are three types of memory related to thread processing in this architecture: Local memory; Data object memory; and Metadata memory. Local memory is memory that is primarily associated with one CPU or thread. Local memory contains data that is written by the CPU or may contain shadow copies of external data that itself is stored in a backend external memory. Local memory can be used as an argument buffer to pass data between a CPU and external elements such as an accelerator in an FPGA; data synchronization and consistency between the running thread and external accelerator is handled by the accelerator interface and its API. Local memory is local to a thread and is not directly shared between threads so no cross-thread dependencies are needed for memory accesses. Local memory may contain data from external memory where accesses to external memory, including any necessary synchronization, are mediated by an external memory manager. For instance, a thread may perform a flow lookup where the flow state structure is returned in local memory. If the structure is modifiable, the thread can write elements in the structure in its local memory and invoke the memory manager, through an API function, to commit changes to the backend external memory. The memory manager provides synchronization of accesses to external memory, for instance reader/writer locks might be used to synchronize readers and writers of flow state. The synchronization primitives are transparent to the processing thread and are hidden in the API functions called to request data or write it back. If synchronization is required with an external event or data, a special pseudo data object can be inserted into the pipeline. For instance, if the pipeline processing accesses external configuration data that is written by an external agent, then the data access can be synchronized by an "external data" dependency. An object could then be created so that its processing blocks the "external data" dependency, writes the external data, and then resolves the "external data" dependency once writing the data is complete.

Data object memory contains the byte data of an object being processed. This memory is shared amongst the threads of a thread set processing an object. One pipeline layer may perform an operation that writes or changes data for downstream layers in an object or may change the size of the layer in the data that subsequently changes the data offsets for all the following layers. In the case that processing of one layer changes data or data offsets for following layers, a dependency can be used to indicate that such changes have been performed. After waiting on the dependency, a thread can reload the data offset for the layer that it processes (since the upstream thread may have changed the offset in the object).

Alternatively, a data object might be addressed by a virtual address that maps to a real memory address in the data object. If the real data offset changes, for example because a thread changes the size of the data layer it is processing, then the virtual address mapping for downstream layers changes but the virtual addresses used to access their layer data does not change. In this manner a change in size for an upstream layer would be transparent to downstream threads.

A thread directly operates only on specific portions of a data object. For instance in networking, a thread processing the IPv4 protocol layer would have read and write access to IPv4 header in a packet, however the thread would not need access to other protocol headers, such as the TCP header, that are processed by other threads. A thread may assume mutual exclusion in reading and writing the portion of data object that it is delegated to operate on. Any modifications to the data object that are outside of the data a thread has direct access to, such as decrypting payload, are done via functions that enforce proper dependencies for later stages in the pipeline. If a thread might modify its portion of the data object it can block an "object modify" dependency. When the thread runs, it can modify the data object in its local memory. Subsequently, the thread resolves the "object modify" dependency which commits the changes to the data object (for instance, the updated protocol headers in networking might be written to backend memory that contains the full packet).

Metadata memory contains the metadata for processing an object and is shared amongst threads in a thread set as it is commonly written by one stage and consumed by later stages. Dependencies are used to synchronize between readers and writers of metadata. Metadata memory is composed of two sections: common metadata and metadata frames. Common metadata contains metadata that is common to all the threads in a thread set, and may be written or read by any of the threads. A metadata frame contains the metadata corresponding to a set of layers for a logical group within processing. The canonical example of this is encapsulation in networking, where a packet may have several layers of encapsulation and for each encapsulation an associated set of metadata might include IP address, protocols, and transport port numbers. Each metadata frame is an instance of the set of metadata for a group of layers (for example, a frame could contain metadata for one encapsulation layer in networking).

Metadata frames can be implemented as an array. A frame index indicates the metadata frame for which a layer will read and write metadata and can simply be an index into the array of metadata frames. Each thread has its own frame index value. When the first thread of a thread set starts, its frame index is initially set to zero; when a non-first thread is started it inherits the frame index from the previous thread. An operation "increment frame index" is used to increment the frame index for a thread. This operation is invoked when a thread identifies a boundary is being crossed between groups of layers; for instance, in network protocol processing "increment frame index" would be called when a thread is processing an encapsulation protocol such as GRE. The specific contents of the metadata structure are defined at compile time per the use case of metadata and may be specific to a datapath.

The base metadata structure defines the maximum number of metadata frames. When the maximum number of metadata frames is reached, the "increment frame index" operation has no effect and the frame index for a thread retains its current value. In this manner, metadata may be overwritten by downstream threads (dependencies are used as necessary to ensure consistency). When the maximum number of metadata frames is one, this is equivalent to the metadata frame being common metadata. When the number of metadata frames is two, the effect is that metadata from the outermost group and the innermost group of layers are set in the final output of metadata extraction. This is commonly useful with respect to networking encapsulation where only the metadata from the outermost header (the "outer headers") and metadata from the inner most encapsulation (the "inner headers") are needed.

Protocol And Network Datapath Acceleration (PANDA) is a software programming model and API that is used to program serial data processing including primitives for parallelism and dependencies for serial processing pipelines. In networking, PANDA will be applied to parallelize the protocol processing done for packets. PANDA employs a lightweight micro threading and synchronization mechanism based on the concepts of dependencies that can be used to construct horizontal and vertical pipelines with concurrent processing. PANDA is not intended to be a general API, but is targeted to the domain specific space of serial pipeline processing; a corollary is that PANDA facilitates hardware acceleration.

This section specifies an API for the PANDA programming model. The canonical language representation of PANDA is in C and the specific C API for PANDA is referred to as PANDA-C. PANDA-C is essentially a library and extensions may be added to the C language as needed. Supporting PANDA in other languages, Python for instance, is feasible. The basic structures of this API are: objects, work items, dependencies, threads, thread sets, and datapaths. These map the corresponding elements of the architecture.

An example for a type for a data structure that contains a set of dependencies, which may commonly be implemented as a bitmap may be:
  panda_dep_set_t An example for a macro to clear a set of dependencies indicated by deps whereby deps is a structure of type panda_dep_set_t, may be:
  PANDA_DEP_CLEAR(deps)

An example for a macro to set dependencies (or'ed into deps) whereby deps is a structure of type panda_dep_set_t, and "dep1, dep2, . . . " indicates the dependencies by their number, may be:
  PANDA_DEP_SET(deps, dep1, dep2, . . . )

An example for a macro to set one dependency in a set of dependencies (by or'ing the bit corresponding to the dependency with the bitmap in deps) whereby deps is a structure of type panda_dep_set_t, and dep indicates the dependency by its number, may be:
  PANDA_DEP_SET_ONE(deps, dep)

An example for a macro to initialize a set of dependencies whereby the effect is PANDA_DEP_CLEAR(deps) followed by PANDA_SET_DEP_SET(deps, dep1, dep2, . . . ), may be:
  PANDA_DEP_INIT(deps, dep1, dep2, . . . )

An example for a macro to unset dependencies whereby deps is a structure of type panda_dep_set_t, and "dep1, dep2, . . . " indicates the dependencies by their number, may be:
  PANDA_SET_DEP_UNSET(deps, dep1, dep2, . . . )

An example for a macro to unset one dependency in a set of dependencies (by and'ing the "not" of the bit corresponding to the dependency with the bitmap in deps) whereby deps is a structure of type panda_dep_set_t, and dep indicates the dependency by its number, may be:
  PANDA_SET_DEP_UNSET_ONE(deps, dep)

An example of an internal data structure that describes a data object containing a pointer to the object's data, length, and other characteristics, may be:
  struct panda_object An example of a prototype for thread processing functions in PANDA where each thread set maintains a set of functions that can be invoked to process the various layers of a data object, the argument passed to the function, indicated by data, is a function work item, the argument may be cast to a customized super structure (where the work item is the first element) that includes additional parameters for the specific use case, may be:
  typedef void (*panda_thread_func_t)
    (struct_panda_work_item*data)

An example of a prototype for a prototype for a thread set top function may be the following. The argument passed to the function, indicated by data, is a thread set work item, the argument may be cast to a customized super structure (where the work item is the first element) that includes additional parameters for the specific use case, a top function is specified as a configuration element in struct panda_datapath_conf, may be:

typedef void (*panda_thread_set_func_t)(struct panda_thread_set *thread_set, struct panda_work_item *data)

An example of a base structure for work items may be the following. This is included as the root sub-structure in the structures for various work item structures.

struct panda_work_item

An example of a structure for a work item describing a function to run in a worker thread, may be:

struct panda_work_item_func

An example for setting up a work item for starting work by a worker thread may be the following. fwork is the function work item structure, func_id indicates the function to run, no_kill indicates that the worker thread should ignore the kill request, and do_free indicates that the memory of fwork should be freed when the system is done with the work item.

void panda_work_item_set_func(struct panda_work_item_func *fwork, unsigned int func_id, bool no_kill, boot do_free)

An example of a structure for a work item that specifies a thread to attach to a thread set, may be:

struct panda_work_item_thread

An example for setting up a work item for attaching a non-worker thread to a thread set may be the following. This function is normally only called internally when attaching a thread. twork is the thread work item structure, thread indicates the thread, deps indicates that dependencies that the thread blocks, do_kill indicates that the worker thread should ignore the kill request, and do_free indicates that the memory of twork should be freed when the system is done with the work item.

void panda_work_item_set_thread(struct panda_work_item_thread *twork, struct panda_thread *thread, panda_dep_set_t blocker_deps, bool no_kill, boot do_free)

An example of a structure for a work item that describes work for a thread set to perform, may be:

struct_panda_work_item_thread_set

An example for setting up a work item for starting work by a thread set may be the following. tswork is the thread set work item structure, non_blocked_early_deps indicates the early propagated dependencies that no threads in the thread set block, and do_free indicates that the memory of fwork should be freed when the system is done with the work item.

void panda_work_item_set_thread_set(structpanda_work_item_thread_set *tswork, panda_dep_set_t non_blocked_early_deps, bool do_free)

The following described in this section must be called only in the context of a PANDA thread. A PANDA thread is taken to be an implicit argument taken from the current thread property in the running execution context of a PANDA thread. In an implementation, the current thread might be determined from the local OS thread state that maps to a PANDA thread structure.

An example of a data structure for a PANDA thread may be the following. In this API the specific contents of the structure are opaque.

struct panda_thread

An example for returning the PANDA thread for the running OS thread may be the following. If the OS thread is not associated with a PANDA thread then NULL is returned.

struct panda_thread *panda_thread_get_local(void)

An example for returning the thread set for the PANDA thread of running OS thread may be the following. If an OS thread is not associated with a PANDA thread then NULL is returned.

struct panda_thread_set *panda_thread_get_local_thread_ set(void)

An example for closing the thread set for the currently running thread may be the following. When a thread set is closed no new worker threads may be started and no more threads may be attached.

void panda_thread_close_thread_set(void)

An example for attaching a PANDA thread to the ordered list of the thread set containing the thread may be the following. blocker_deps is the initial blocker dependencies for the thread, no_kill indicates the thread ignores a kill threads request.

int panda_thread_attach(panda_dep_set_t blocker_deps, bool no_kill)

An example for attaching the running PANDA thread to the ordered list of the thread set containing the thread and then closing the thread set for the thread may be the following. blocker_deps is the initial blocker dependencies for the thread, no_kill indicates the thread ignores a kill threads request. Returns zero on success, or a non-zero error code on failure. The thread set will only be closed when zero is returned.

int panda_thread_attach_close(panda_dep_set_t blocker_deps, bool no_kill)

An example for detaching a previously attached thread from a thread set, may be:

void panda_thread_detach(void)

An example for killing all the threads following the currently running one in the ordered list of the current thread set may be the following. Killed threads are reinitialized. If a downstream thread is marked as no_kill then that one and none of the threads following that one are killed.

void panda_thread_kill_threads(void)

An example for resolving a single dependency in the context of the currently running thread and current thread set may be the following. dependency indicates the dependency by its ordinal number.

void panda_thread_resolve(unsigned int dependency)

An example for resolving a set of dependencies in the context of the currently running thread and current thread set may be the following. dependencies indicates the set of dependencies being resolved. The resolution signal is propagated independently for each dependency.

void panda_thread_resolve_set (panda_dep_set_t dependencies)

An example for waiting for a single dependency in the context of the current thread set to be resolved may be the following. dependency indicates the dependency by its ordinal number.

void panda_thread_wait (unsigned int dependency)

An example for waiting for all the dependencies in a set of dependencies to be resolved may be the following. dependencies indicates the set of dependencies to wait on.

void panda_thread_wait_set (panda_dep_set_t dependencies)

An example for joining the thread set for the current thread to a dependency channel may be the following. channel is the identifier of a dependency channel for the datapath. While this function is called in the context of a thread, it's effect is that the thread set containing the thread is joined to the dependency channel for the thread set's datapath.

void panda_thread_join_channel(unsigned int channel)

An example for checking the length of the object being processed may be the following. "True" is returned if the received length of the object is greater than or equal to length. "False" is returned if the full length of the object is known and it is less than length. If the length of the object is less than length and the full length is not yet known then the function blocks until the object length is greater than or equal to length, or the full length is known. The data object is an implicit argument of type struct panda_object that is inferred from the data object being processed by the thread set of the running PANDA thread.

boolean panda_object_check_length(unsigned int length)

An example for a data structure for a PANDA thread set may be the following. In this API the specific contents of the structure are opaque. Each PANDA thread belongs to a thread set.

struct panda_thread_set

An example for allocating and initializing a thread set may be the following. num_threads indicates the number of threads for the thread set. This function cannot be called from a PANDA thread. The returned value is either a pointer to the newly created thread set or NULL to indicate failure.

struct panda_thread_set *panda_thread_set_create(unsigned int num_threads)

An example for destroying a thread set may be the following. thread set indicates the thread set to be destroyed. This kills any running threads and frees the thread set structure. This function cannot be called by a PANDA thread.

void panda_thread_set_destroy(struct panda_thread_set *thread_set)

An example for setting a thread function for a thread set may be the following. thread_set indicates the thread set, func_id indicates the function identifier, func indicates the routine to run, blocker_deps indicates the dependencies that the function blocks.

int panda_thread_set_set_func(struct panda_thread_set *thread_set, unsigned int func_id, panda_thread_func_t func, panda_dep_set_t blocker_deps)

An example for clearing a thread function for a thread set may be the following. thread_set indicates the thread set, func_id indicates the function identifier.

void panda_thread_set_clear_func(struct panda_thread_set * thread_set, unsigned int func_id)

An example for closing the thread set indicated by thread set may be the following. When a thread set is closed no new worker threads may be started and no more threads may be attached.

void panda_thread_set_close(struct panda_thread_set *thread_set)

An example for starting new work in a worker thread of a thread set may be the following. thread_set indicates the thread set, fwork describes the work. The effect of the function is to commence processing of the next layer in the pipeline. Returns zero on success, or a non-zero error code on failure.

int panda_thread_set_start_func(struct panda_thread_set *thread_set, struct panda_work_item_func *fwork)

An example for starting new work in a worker thread of a thread set and then closing the thread set may be the following. thread_set indicates the thread set, fwork describes the work. The effect of the function is to commence processing of the next layer in the pipeline. Returns zero on success, or a non-zero error code on failure. The thread set will only be closed when zero is returned.

int panda_thread_set_start_func_close(struct panda_thread_set *thread_set, struct_panda_work_item_func *fwork)

An example for creating a new PANDA thread and running the provided start routine may be the following. The thread set to contain the new thread is indicated by thread_set, start_routine indicates the function to run, and arg is an argument passed to the start routine. Returns zero on success, or a non-zero error code on failure.

int panda_thread_set_run_thread(struct panda_thread_set *thread_set, void (*start_routine) (void *), void *arg)

An example for creating a new PANDA thread, running the provided start routine, and closing the thread set may be the following. The thread set to contain the new thread is indicated by thread_set, start_routine indicates the function to run, and arg is an argument passed to the start routine. Returns zero on success, or a non-zero error code on failure. The thread set will only be closed when zero is returned.

int panda_thread_set_run_thread_close (struct panda_thread_set *thread_set, void (*start_routine)(void *), void *arg)

An example for killing all the worker threads and attached threads in a thread set (those that are not marked as no_kill) may be the following. When a thread is killed it is reinitialized.

void panda_thread_set_kill_all_threads(struct panda_thread_set *thread_set)

An example for waiting for all worker threads and attached threads of a thread set to complete, may be:

void panda_thread_set_wait_all_threads(struct panda_thread_set *thread_set)

An example of a data structure for a PANDA datapath may be the following. A PANDA thread set may belong to a datapath, or a thread set may be used as a standalone structure.

struct panda_datapath

An example of a data structure that contains the configuration for a datapath may be the following. The structure contains the configuration values for a datapath including the number of thread sets, number of threads per set, the top function to run in the datapath event loop (function with type panda_thread_set_func_t), common functions for the threads, propagate dependencies, early propagated dependencies, number of dependency channels, and maximum number of work items in the datapath work queue.

struct panda_datapath_conf

An example for allocating and initializing a datapath whereby conf contains the configuration for the datapath, may be following.

struct panda_datapath *panda_datapath_create(struct panda_datapath_conf *conf)

An example for destroying a datapath whereby datapath indicates the datapath to be destroyed, may be as follows. This function destroys all thread sets in the datapath (by calling panda_thread_set_destroy) and frees associated memory.

void panda_datapath_destroy(struct panda_datapath * datapath)

An example for setting a thread function for all the thread sets of a datapath may be the following. datapath indicates the datapath, func_id indicates the function identifier, func indicates the routine to run, blocker_deps indicates the dependencies that the function blocks.

int panda_datapath_set_func(struct panda_datapath *datapath, unsigned int func_id, panda_thread_func_t func, panda_dep_set_t blocker_deps)

An example for clearing a thread function for all the thread sets of a datapath whereby datapath indicates the datapath, func_id indicates the function identifier, may be:

void panda_datapath_clear_func(struct panda_datapath *datapath, unsigned int func_id)

An example for starting work, that is processing a data object, in a datapath may be the following. datapath indicates the datapath and work is a thread set work item describing the work to do. If wait_work_queue is set to "True" and the work must be queued but the queue limit is reached, then the function will block until the work can be queued or a thread set is started. Returns zero if a thread set was successfully started, and returns non-zero if the work queue is at its limit and wait_work_queue is "False".

int panda_datapath_start_work(struct panda_datapath *datapath, struct panda_work_item_thread_set *work, bool wait_work_queue)

An example for waiting for all running thread sets in a datapath, indicated by datapath, to complete, may be:

void panda_datapath_wait_all_thread_sets(struct panda_datapath *datapath)

Figure 11:
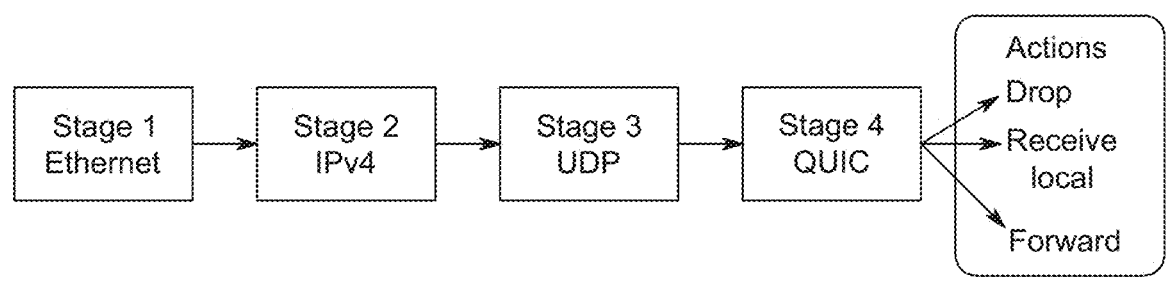
FIG. 11 illustrates a diagram of a four state serial processing pipeline that might correspond to the protocol layer processing of a QUIC/IPv4 over Ethernet packet.

Network protocol processing may be modeled as a serial processing pipeline, where different protocol layers of a packet are processed in different stages of a pipeline. An output result of protocol processing is an action that describes the disposition of the packet. Actions are a small set of simple primitives that includes dropping the packet, forwarding it, or receiving it locally. FIG. 11 provides an example diagram of a four state serial processing pipeline that might correspond to the protocol layer processing of a QUIC/IPv4 over Ethernet packet.

Figure 12:
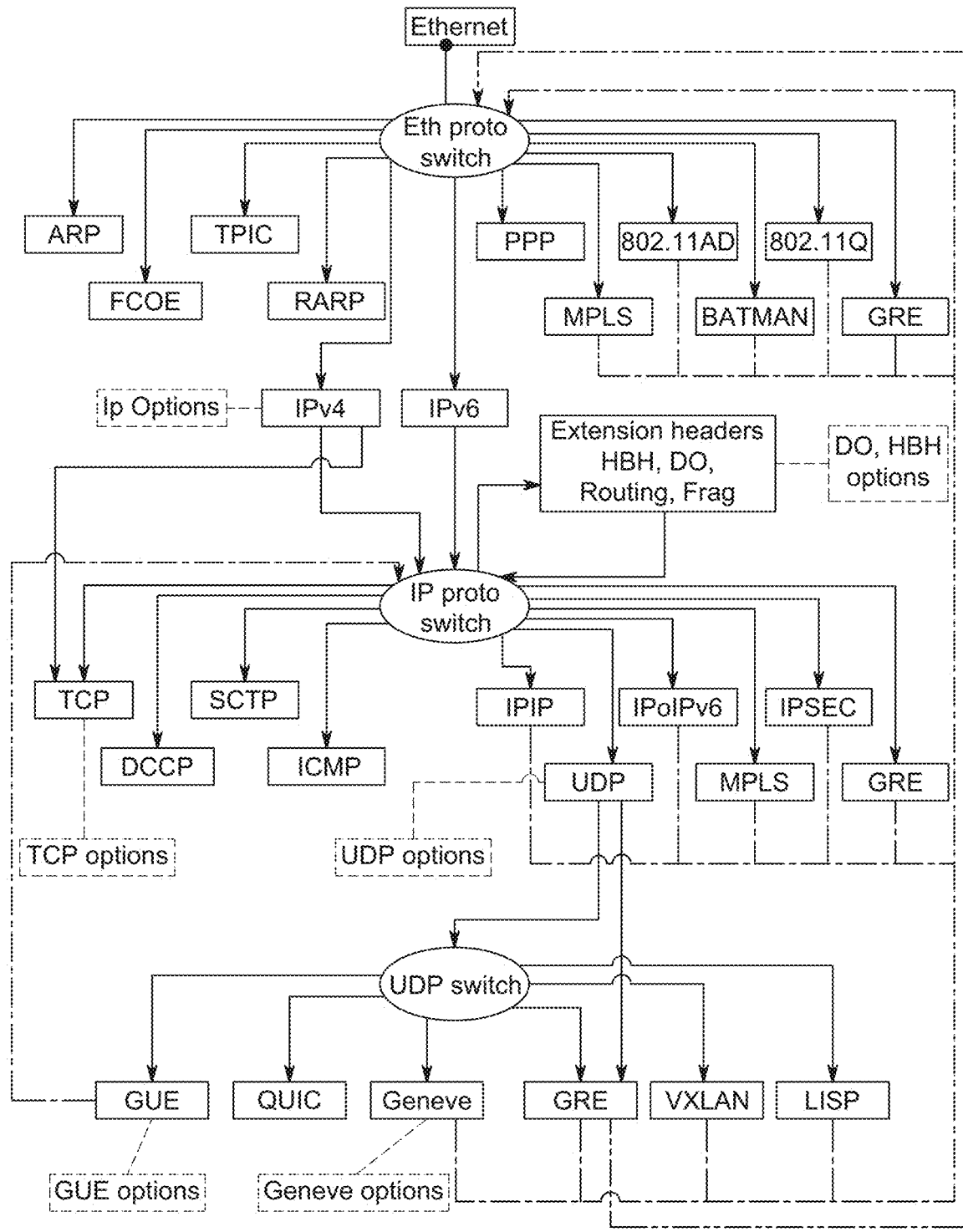
FIG. 12 illustrates a protocol parse graph containing a number of common networking protocols.

Protocol parsing is the operation of identifying the protocol layers, typically protocol headers, in a packet, and correspondingly a protocol parser is an entity that parses some set of protocols. A protocol parser can be represented as a parse graph that indicates the various protocol layers that may be parsed and the relationships between layers. FIG. 12 illustrates a protocol parse graph containing a number of common networking protocols. The protocols listed don't represent the complete set of parseable protocols, however they should be representative of the most common flavors of protocol structure. In FIG. 12, network protocols are indicated by solid rectangles in the graph. Protocols are logically divided into three layers: network layer protocols, transport layer protocols (e.g. TCP and UDP), and encapsulated protocols in transport layers (e.g. encapsulated protocols in UDP). Protocol switches determine transitions between protocol layers and are indicated by ovals in the graph. Solid arrows indicate the flow moving down the graph. Dashed arrows indicate protocol encapsulation and point to a higher layer protocol or switch. Dashed rectangles indicate sub-options of a protocol (IPv4 options for example). Options can be processed in a loop contained within the corresponding higher protocol layer, or as nested protocol layers themselves. Extension headers, such as IPv6 extension headers, are similar to options, however they are not directly sub-options contained within a protocol header. Extension headers are processed as multiple protocol headers at the same layer by invoking the corresponding protocol layer switch for each header. The backcall to the protocol switch for extension header is not considered encapsulation.

The protocol processing pipeline for a packet would constitute one particular path in the graph. The graph in FIG. 12 implies no limits on the number of headers in a packet, however for practicality limits may be imposed. For instance, Linux limits the number of embedded protocol encapsulations and extension headers that may be parsed in a packet.

The processing done for a protocol layer is designed to be done to maximize the amount of concurrent execution whereby a general strategy for processing a protocol layer is: determine the next protocol layer and start its thread, resolve dependencies as soon as possible, and wait on dependencies as late as possible. It should be obvious to one of ordinary skill in the art that the specifics may depend on the type of protocol being processed and the dependencies that protocol processing has on earlier layers. A rough template may be described by considering the canonical processing done for a non-parallelized implementation and adapting that for vertical parallelism.

In packet processing there are four types of data that may be accessed or modified: the packet, the packet metadata, the context state, and global state.

The packet is a data object in the serial processing pipeline for networking. A packet is assumed to be in a contiguous buffer, at least can be read that way. Information about previous header layers should be accessed via metadata so that a protocol layer does not directly access packet data for previous layers. A dependency is on an upstream stage modifying a packet that could conflict with an upper layer reading or modifying a packet. Examples of such mechanisms that might create dependencies are decryption, decompression, and Receive Checksum Offload.

Packet metadata is data that contains ancillary information about the packet. This can include items such as packet length, Ethernet addresses, IP addresses, transport layer ports, etc. As the packet is processed by different layers, each layer can set or read information in the metadata. Dependencies are used to synchronize read and write operations on metadata.

Context state is the external data in the serial processing pipeline. This could include connection or flow state returned from a lookup. As the packet is processed in a pipeline there may be several types of context state used by different layers. Dependencies synchronize readers and writers of context state. If an external agent writes state, a special object can be injected into the pipeline to handle that.

Global state may be atomic counters that are shared amongst different processing threads and so may need atomicity or dependencies.

To adapt protocol processing to vertical parallelism, dependencies between protocol layers need to be identified, and wait and resolve points for those dependencies need to be located in the code paths. In one or more non-limiting embodiments, dependencies may take the form of context information: a layer sets context information in the metadata needed by later layers; accepted: packet is accepted by a layer and will be processed accordingly; modified: any modifications to a packet by the protocol layer are complete; or done: protocol layer has completed processing.

Figure 13:
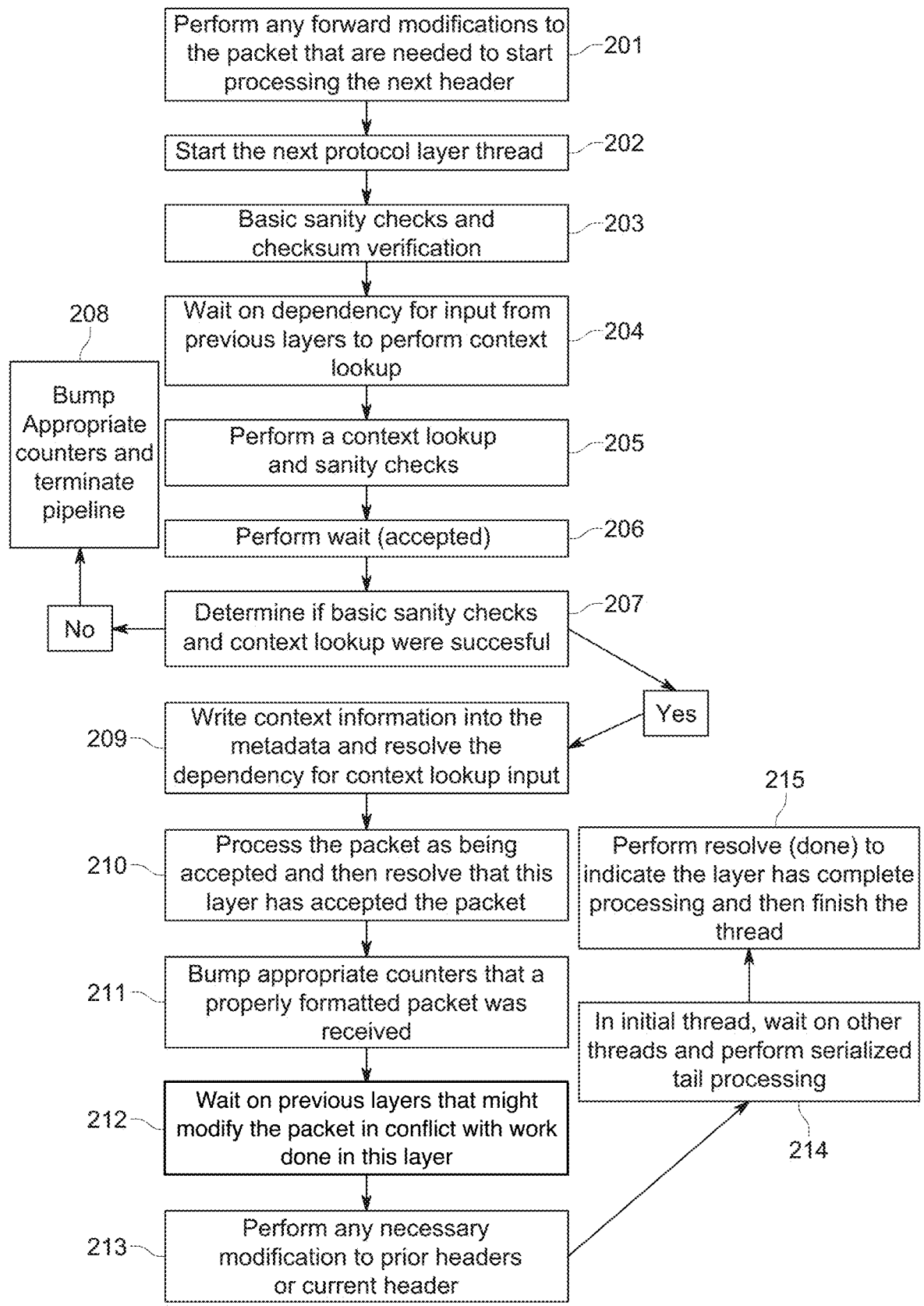
FIG. 13 illustrates an embodiment of a flowchart for a method for processing for a protocol layer with vertical parallelism.

Referring to FIG. 13, a method for processing for a protocol layer with vertical parallelism in some embodiments of the invention is described and shown.

At step 201, perform any forward modifications to the packet that are needed to start processing the next header. These are modifications of the packet beyond the current header such as payload decryption for confidential packets whereby a protocol header in a received packet contains an encrypted payload and a private or public key is used to generate a decrypted payload from the encrypted payload.

At step 202, start the next protocol layer thread which may execute concurrently. This entails minimal parsing of the current layer to determine the protocol, offset, and handler for the next layer. If a next protocol layer is present, then start a worker thread for the next layer.

At step 203, basic sanity checks and checksum verification (if necessary) are done on the packet. The results are then held.

At step 204, perform panda_thread_wait(context_information) to wait on the dependency for input from previous layers to perform context lookup. This is typically a dependency on a lower layer to write metadata information needed for the context lookup.

At step 205, if basic sanity checks are successful, perform a context lookup and sanity checks with respect to the returned context. The results are then held.

At step 206, perform panda_thread_wait(accepted) to wait on the previous layer accepting the packet.

At step 207, determine if basic sanity checks were successful, and determine if the context lookup was successful and any necessary sanity checks on the returned context were successful. If any of the sanity checks failed or no context was found and one is required then bump appropriate counters and terminate the pipeline by calling panda_thread_kill_threads at step 208. If the sanity checks are successful and a required context was found if needed then proceed to step 209.

At step 209, if necessary, write context information into the metadata and resolve the dependency for context lookup input by calling panda_thread_resolve(context_information).

At step 210, perform panda_thread_resolve_point(accepted) and process the packet as being accepted.

At step 211, bump appropriate counters that a properly formatted packet was received.

At step 212, perform panda_thread_wait_point(modified) to wait on previous layers that might modify the packet in conflict with work done in this layer.

At step 213, perform any necessary modifications to prior headers or to the current header. This includes possibly popping previous headers. If the packet was modified then perform panda_thread_resolve(modified).

At step 214, in the initial thread, wait for worker threads to complete and then perform any serialized tail processing based on the returned action such as dropping or forwarding packets.

At step 215, perform panda_thread_resolve(done) to indicate that the layer has completed processing.

Note that not all of these steps will be applicable for each protocol layer. For instance, if a protocol layer doesn't need external context information for a lookup, then it would not need to wait on the context information dependency. Similarly, if a protocol layer does not modify a packet then it will not need to resolve the modify dependency.

A watcher might run some scenario where a watched dependency is guaranteed to be resolved when the thread starts. For instance, the thread processing an IP header might have a metadata dependency on potential upstream threads processing outer IP headers in network encapsulation; for a thread processing the first IP header, or outermost one, the dependency will always be resolved from the start or processing. As an optimization, different variants of the function for a protocol layer could be maintained for different permutations of unresolved dependencies. A particular variant is optimized around the set of possibly unresolved dependencies so that a variant may eliminate wait operations for dependencies that are already known to be resolved in a certain context. In the example of IP header processing, this might entail having one function that processes the outermost IP header and another that processes IP headers when they are encapsulated, where the former may assume that some dependencies are automatically resolved.

As shown in FIG. 12 some protocols, such as IPv4 and TCP, contain suboptions that might be processed as protocol layers in a processing pipeline. To handle this, a stack for processing nested protocol layers is employed. When a protocol layer commences processing of nested options, a descriptor of the current protocol (the one containing options) is pushed onto a stack. Processing threads are started by cascade or top function scheduling to process the options. Options are processed in the context of the protocol layer in which they are contained (e.g. a TCP option is processed in the context of a TCP header). When the thread for processing the last option has been started, typically determined by reaching the end of the option space, the descriptor on the stack is popped and indicates the next protocol layer to process.

It is desirable to start threads to process protocol layers quickly and efficiently to maximize parallelism. Starting the next protocol layer requires two pieces of information: the type of the next protocol layer, and the length of the current protocol header. The length of the current header implies the offset of the start of the next header. In conjunction with parsing a protocol layer to start the next layer, the lengths of protocol headers can be validated to lie within the extent of the packet (or sub-layer in case of nested parsing). For many protocols, these operations are amenable to hardware acceleration.

For most protocols, a protocol header is either fixed length explicitly containing the length of the protocol header in a field of the header, or the length can be easily deduced from fields in the header. Examples of these may include: UDP, IPv6, Ethernet, and VXLAN are protocols with fixed length protocol headers; IPv4, TCP, QUIC, and GUE are protocols that have an explicit header length at some fixed offset in the respective headers; whereby for GRE, the header length may be determined by the particular GRE flags that are set.

Figure 14:
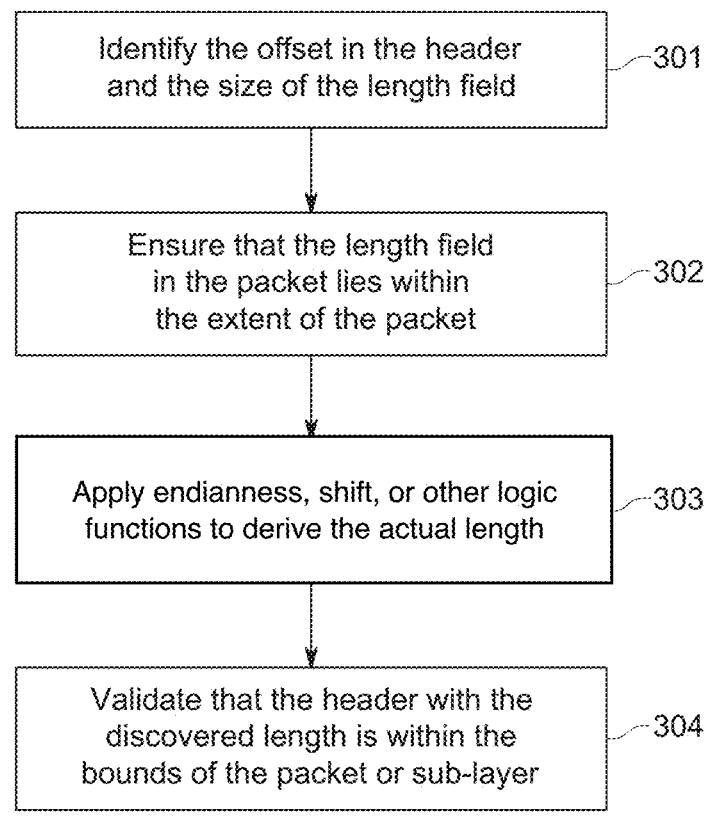
FIG. 14 illustrates an embodiment of a process for extracting the length of a protocol layer header that includes a header length.

Referring to FIG. 14, a process for extracting the length of protocols that include a header length in some embodiments of the invention is described and shown.

At step 301, identify the offset in the header and the size of the length field. The length field is typically a few bits or one to four bytes in size. These are normally defined in the protocol specification.

At step 302, ensure that the length field in the packet lies within the extent of the packet (or sub-layer in the case of nested protocol layers). This may be done using panda_object_check_length. If the length field is outside the bounds, then the packet is considered in error.

At step 303, given the length field, apply endianness, shifts, or other logic functions to derive the actual length. Multi-byte length fields may be in network (big endian) or little endian byte order, and some protocols express lengths in units of four or eight bytes so that a shift (multiply) function is needed to derive the real length.

At step 304, validate that the header with the discovered length is within the bounds of the packet or sub-layer. This may be done using panda_object_check_length. If the length is short, then the packet is considered in error.

For identifying the protocol of a header, it is common that either a protocol header contains a field explicitly indicating the next protocol, or for a protocol header itself to contain a type field that is interpreted in the context of the encapsulating protocol header. Ethernet, IPv4, IPv6, GUE, and GRE are examples of protocols that contain an explicit next header field; options in the form of TLVs, such as IPv4 options and TCP TLVs, are self-identifying and are processed in the context of TLV processing for an encapsulating protocol; the protocol version of IP (IPv4 and IPv6) is self-identifying via a version field in the IP header whereby IP versions are also commonly distinguished by the next header field in an encapsulating protocol (e.g. there are separate EtherTypes for IPv4 and IPv6).

Figure 15:
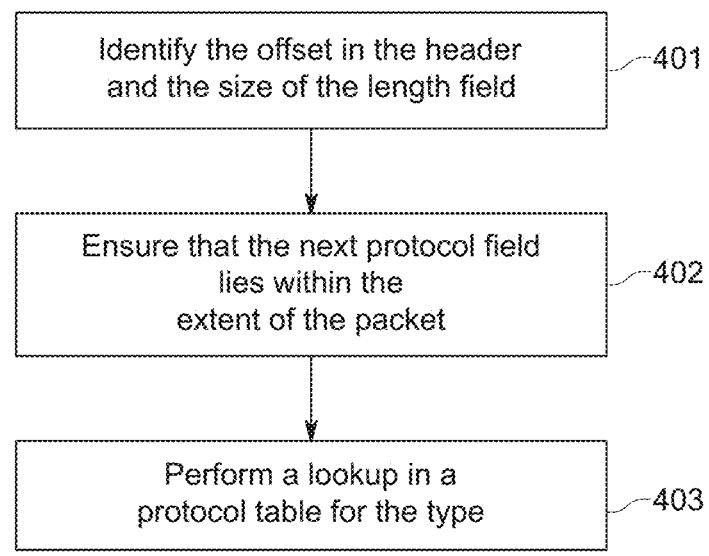
FIG. 15 illustrates an embodiment of a process for the determination of the next protocol layer type if a protocol header contains a next protocol field.

Referring to FIG. 15, a process for the determination of the next protocol layer type if a protocol layer contains a next protocol field is described and shown.

At step 401, identify the offset in the header and size of the next protocol type field. These are normally defined in the protocol specification. The next protocol field is typically a few bits, or one or two bytes.

At step 402, ensure that the next protocol field lies within the extent of the packet (or sub-layer in the case of nested parsing). This may be done using panda_object_check_length. If the header length has been previously validated, then this step is unnecessary.

At step 403, perform a lookup in a protocol table for the type. If no type is found, then the next header protocol is considered unsupported and default processing may be performed.

Figure 16:
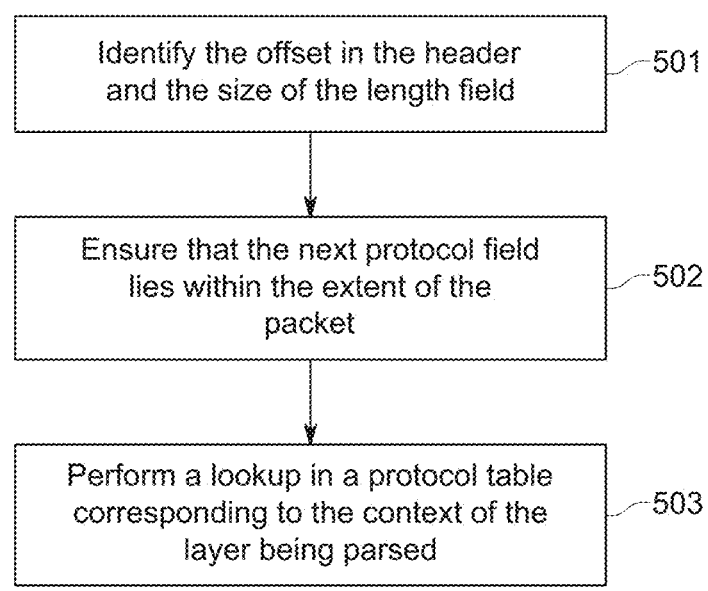
FIG. 16 illustrates an embodiment of a process for the determination of the protocol type if a protocol layer header is self-identifying.

Referring to FIG. 16, a process for the determination of the next header type if a protocol layer is self-identifying (contains its own type field) is described and shown.

At step 501, identify the offset in the header and size of the protocol type field in the current header. This is specified in the protocol specification. The protocol type field is typically a few bits, or one or two bytes.

At step 502, ensure that the protocol type field in the packet lies within the extent of the packet (or sub-layer in the case of nested parsing).

At step 503, perform a lookup in a protocol table corresponding the context of the layer being parsed. If no type is found, then the protocol type is considered unsupported and default processing may be performed.

Note in the presence of nested protocol layering, both methods may be used. For instance, an IPv6 Hop-by-Hop extension header has both a next protocol field and also contains a list of option TLVs that are self-identifying. As described earlier, the options are parsed first and then the next protocol field is processed.

A unified dispatch function may then be defined as panda_parse_dispatch_next that may perform three functions including: determining the length of the current protocol header and verifying it is within the extent of the packet or sub-layer, the length implying the offset of the next protocol layer; determining the type of the next protocol layer; and dispatching a thread to process the next layer according to the determined type. Input to this function may include a set of parameters specific to the current protocol layer being processed, such as the fixed length of the header or the offset, size, endianness, and shift of the length field in a protocol header; and the offset and size of the next protocol field in the protocol layer or the offset, size, and endianness of the protocol type field for self-identifying protocol headers.

The parameters allow systematic determination of the length of the current protocol layer and the type of the next layer. Note that not all protocol layers can be dispatched automatically using this facility. In some cases, more work will be needed to determine the next protocol and length as would be the case when a protocol layer is encrypted.

A unified dispatch may be called in a tight loop by a top function performing top function scheduling, FIG. 7 illustrates an example of this. Conceivably, such a function could be accelerated in a hardware parser/scheduler function. If dispatch processing for all the protocol layers in a packet is readily accelerated in this manner, then conceptually all the protocol layer threads for the pipeline could be dispatched by a hardware scheduler without software intervention. Accelerating this function would be a matter of implementing a thread scheduler and programmable parser in hardware. The two required operations for parsing, extracting the next protocol type and length of the current header, can, for most common networking protocols, be expressed as load operations for fields in packet headers and simple arithmetic operations on those fields (such as a byte shift to determine IP header length from the four bit length field of an IP header). These operations should be feasible to hardware implementation in a programmable fast path.

Figure 17:
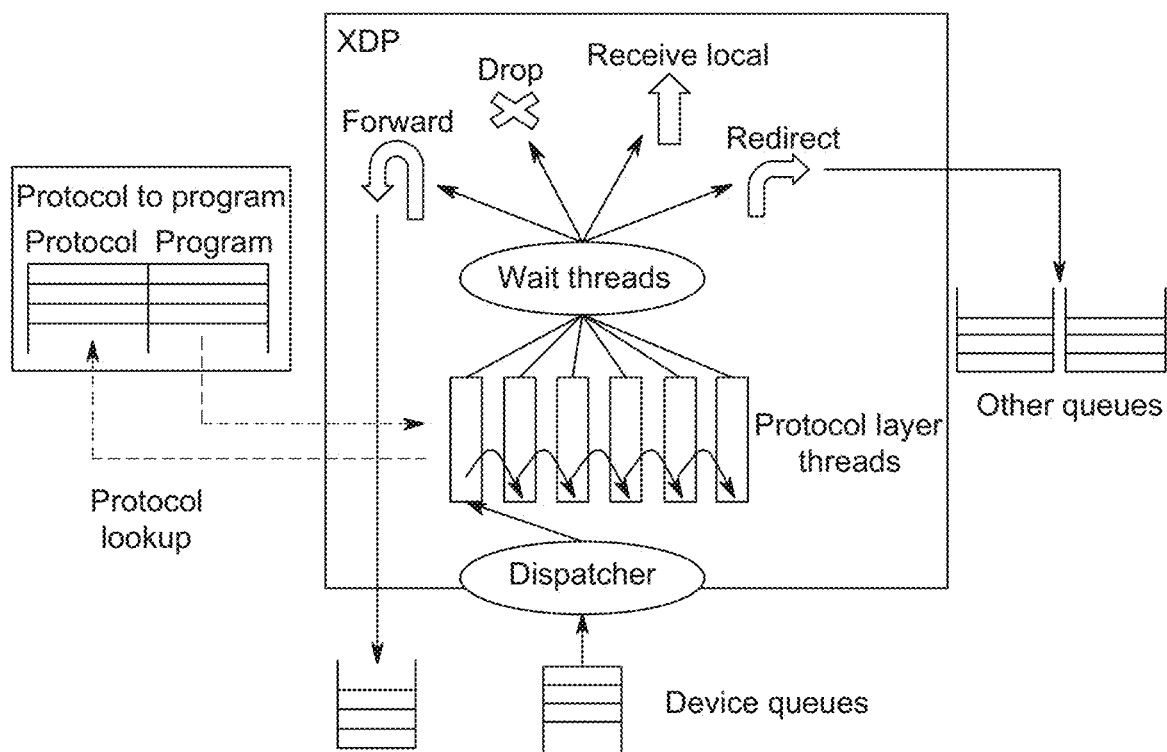
FIG. 17 illustrates XDP with vertical parallelism.

This section describes a design for parallelism in serial pipeline processing in eXpress Data Path (XDP). XDP is a fast and programmable datapath first introduced in Linux as a means to run generic packet processing code directly in NIC receive functions. XDP employs extended Berkeley Packet Filter (eBPF) as the byte code representation of programs. FIG. 17 demonstrates XDP with vertical parallelism. The PANDA API will be supported in XDP via helper functions. Each protocol layer can be processed by separate eBPF code functions, and lookup tables in the program structure map protocol layers to the functions to process them.

The PANDA API will be supported in XDP via helper functions. Each protocol layer can be processed by separate eBPF code functions, and lookup tables in the program structure map protocol layers to the functions to process them. When a packet arrives, the XDP input function is called. The input function serves as the dispatcher for the protocol processing of the packet and may be instantiated as the top function for a thread set. As described above, parallel threads for processing various layers of a packet are created by cascade or top function scheduling. An eBPF helper function would perform the unified protocol dispatch of parsing a packet and scheduling processing threads. The helper function could invoke the PANDA Parser (described below). The helper function parser would implement scheduling for worker threads which could invoke callbacks into XDP for the protocol node and parse node functions. In the case of top function scheduling, the helper function would schedule each of the threads for processing an object. In cascade scheduling, the helper would schedule the first worker thread, and then each worker thread could invoke another helper function to schedule the next worker thread in the pipeline. In either scheduling case, the number of threads could be limited as necessary to ensure that the kernel does not go into a long or even an infinite loop (following the design philosophy of XDP/eBPF to promote robustness).

The granularity of the protocol layers is arbitrary. For instance, an implementation may only consider top level protocol processing (TCP, IPv4, IPv6) so that protocol options of these are processed in the same thread as the higher protocol layer. Alternatively, the options themselves could be parsed to create a processing thread for each one. All threads have access to the packet data and metadata memory for the packet. Both of these are writeable, so if multiple threads might write to the same item so as to create the possibility of a conflict then a dependency is needed for synchronization. The metadata includes a returned XDP action (one of receive local, drop, abort, forward, or redirect). Once all of the threads have been started, the dispatcher waits for the threads to finish (by calling panda_thread_wait threads if the dispatcher thread is attached to the thread set, and calling panda_thread_set_wait_threads if it didn't attach). When the function returns, packet processing has been completed and the disposition of the packet is contained in the action field of the metadata. The action is processed like any other use case of XDP. Once the action has been handled, the dispatcher thread reinitializes and can proceed to process the next packet.

If a thread determines that a packet needs to be dropped, it sets the action field and kills all the following threads (panda_thread_kill_threads). Only one action can be returned by the threads in a pipeline. If multiple threads set the action it is expected the action set by the last thread is the one that is applicable to the pipeline. Note that if a thread kills the pipeline due to an error condition, that thread should set the action and hence that would be returned as the action from the pipeline (in this case, later threads are killed before they can set the action). If multiple threads can set the action then a dependency like "okay to set action" could be employed. A thread that blocks this dependency would resolve it at a resolve point in the code after which the thread will not set the action. A thread that needs to set the action would wait on this dependency before setting the action.

The PANDA Parser is a framework and API for programming protocol parser pipelines that utilizes the mechanisms and API of PANDA for parallelism and serial data processing as described in this architecture. Protocol parsing is a fundamental operation in serial data processing such as networking processing. A protocol parser can be represented as a parse graph that shows various protocol layers that may be parsed and the relationships between layers (for example FIG. 12 demonstrates this). The processing of one data object can be thought as one "walk in the parse graph". At each node in the graph, the corresponding protocol layer of a data object (protocol header in networking parlance) is parsed and processed. Processing may include validations, extracting of metadata from the protocol layer, and arbitrary protocol processing. Parsing is driven by a parser engine that performs the parse walk and calls processing functions for each layer. The parser engine parsers top level protocols, TLVs, and flag-fields.

The fundamental data structures of the PANDA parser are: protocol nodes, parse nodes, protocol tables, and parsers. A protocol node provides the properties and functions needed to parse one protocol in a parse graph to proceed to the next protocol in the parse graph for a packet. A protocol node contains common characteristics that reflect the standard protocol definition (for instance there is only one standard procedure to determine the length of an IP header). As mentioned above, the parse walk over a protocol node requires determining the protocol type of the next node and the length of the current node. A protocol node has two corresponding functions that are implemented per a specific protocol: len: returns the length of the current protocol layer (or protocol header), next_proto: returns the protocol type of the next layer.

A parse node is an instantiation of one node in the parse graph of a parser being defined. A parse node includes a reference to the protocol node for the specific protocol, as well as customizable processing functions. A parse node allows defining two optional functions: extract metadata which extracts metadata, e.g. protocol fields, from a protocol header and saves it in the metadata memory, and handle_proto which performs arbitrary protocol processing. This function may implement the full logic of protocol processing.

A protocol table is a lookup table that takes a protocol number as input as the protocol type of the next protocol layer, and returns the parse node for the next layer. The protocol numbers can be the canonical protocols numbers, for instance a protocol number might be an IP protocol number where the table contains parse nodes for various IP protocols (e.g. for TCP, UDP, etc.). Non-leaf parse nodes have a reference to a corresponding protocol table, for instance, a parse node for IPv6 would refer to a protocol table that takes an IP protocol number as input and returns the parse node for the corresponding IP protocol.

A parser defines a parser and includes a set of parse nodes, each having a reference to a protocol node. Non-leaf parse nodes have a reference to a protocol table.

Figure 18:
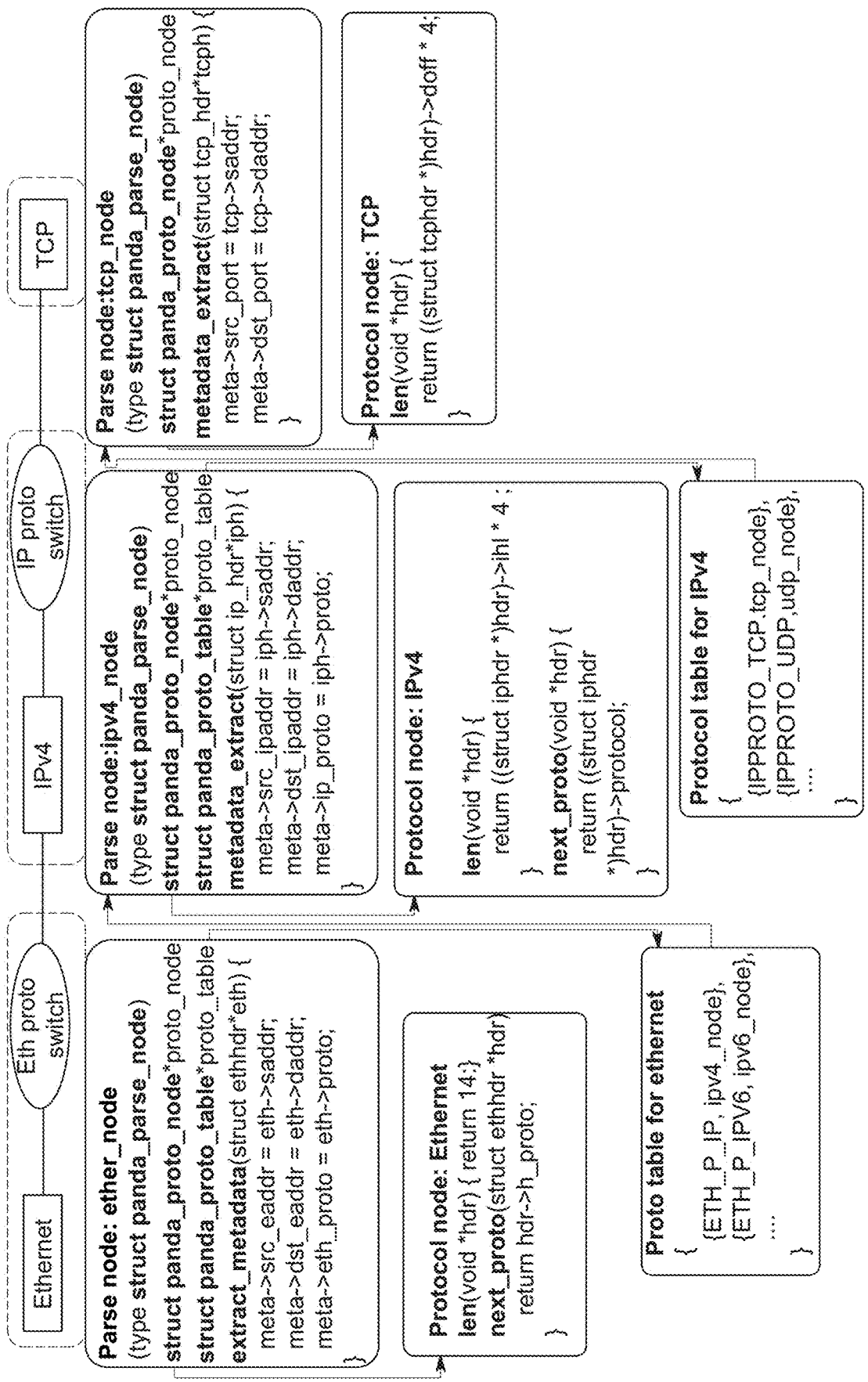
FIG. 18 illustrates an example of a PANDA parser and relationships between related structures.

The parse nodes are connected to be a graph via the relationships set in the protocol tables. The parser can be represented as a declarative data structure in C and can equivantently be viewed as a type of Finite State Machine (FSM) where each parse node is one state and transitions are defined by next protocol type and associated protocol tables. A parser defines a root node which is the start node for parsing an object (for networking the root is typically Ethernet). FIG. 18 illustrates a simple parser for canonical TCP/IP over Ethernet including example parse nodes and protocol nodes for Ethernet, IPv4, and TCP.

Type-Length-Value tuples (TLVs) are a common networking protocol construct that encodes variable length data in a list. Each datum contains a Type to discriminate the type of data, a Length that gives the byte length of the data, and a Value that is the bytes of data. TLVs are parsed in the context of a top level protocol, for instance TCP options and IPv4 options are represented by TLVs parsed in the context of a TCP header and IPv4 header respectively. A protocol node with TLVs is an extended protocol node that describes a protocol that includes TLVs. A protocol node with TLVs provides the properties and functions to parse TLVs in the context of a top level protocol and includes three operations: tlv_len, tlv_type, and tlv_data_offset. The tlv_len function returns the length of a TLV (and therefore the offset of the next TLV), tlv_type returns the type of a TLV, and tlv_data_offset returns the offset of the data within a TLV. Note that tlv_len returns the length of the whole TLV including any TLV header, so the length of just the data in a TLV is the total length of the TLV, as given by tlv_len, minus the offset of the data as given by tlv_data_offset.

A parse node with TLVs is an extended parse node that has reference to a protocol node with TLVs and a TLV table. A TLV table is a lookup table that takes a TLV type as input and returns a TLV parse node for the TLV. A TLV parse node describes the processing of one type of TLV. This includes two optional operations: extract_tlv_metadata and handle_tlv. These have the same function prototypes as the similarly named functions defined for a parse node (see above) where extract_tlv_metadata extracts metadata from a TLV and places it into the metadata structure, and handle_tlv allows arbitrary processing of the TLV.

Figure 19:
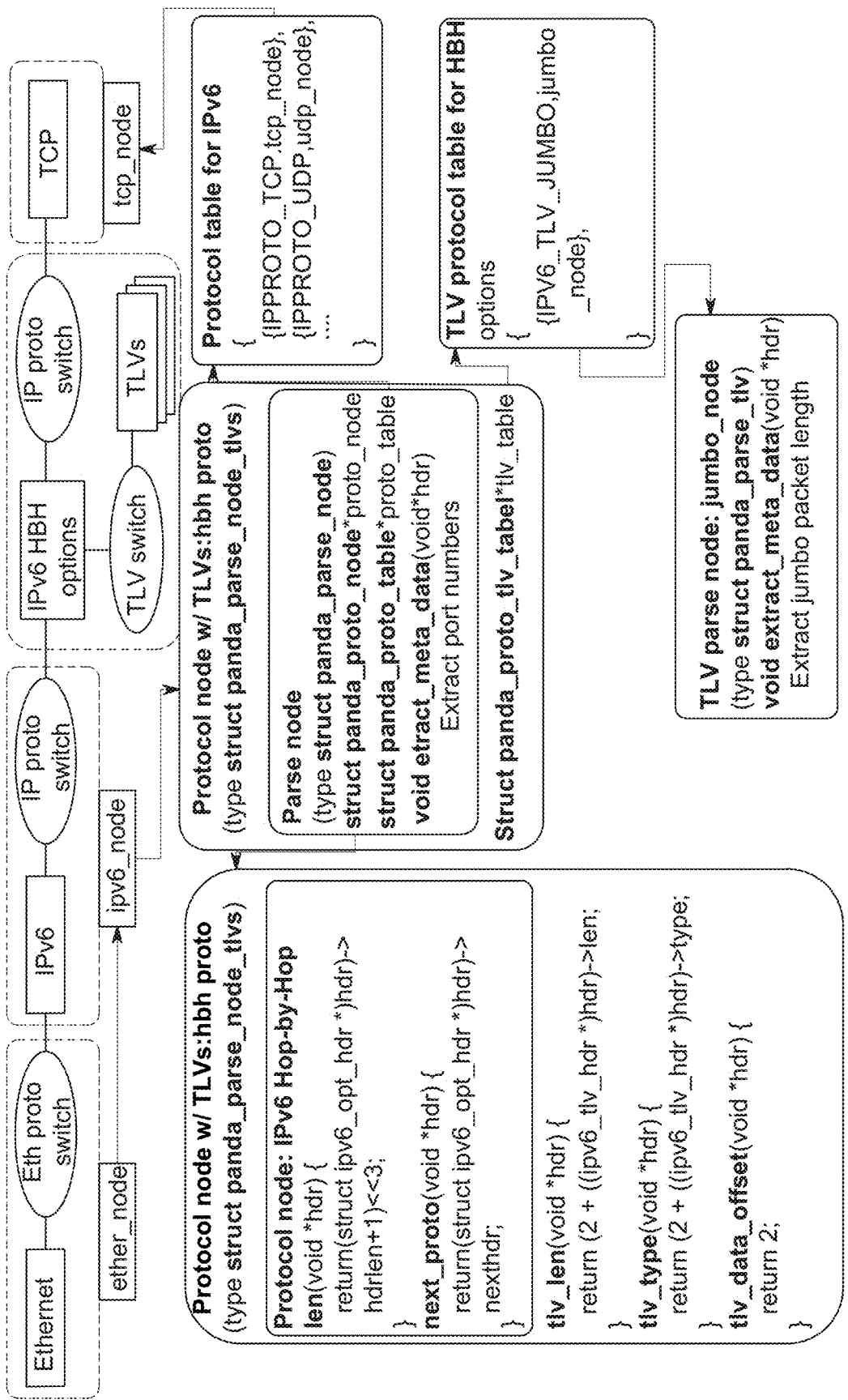
FIG. 19 illustrates an example of a PANDA parser with a TLV parse node for IPv6 Hop-by-Hop Options.

FIG. 19 illustrates a simple PANDA parser that includes a TLV parse node for IPv6 Hop-by-Hop Options. The TLV parse node contains both a parse node for the Hop-by-Hop extension header and fields for parsing the options within the extension header. The associated TLV table contains one entry for extracting data from the Jumbo payload option.

Flag-fields is a common networking protocol construct that encodes optional data in a set of flags and data fields. The flags indicate whether or not a corresponding data field is present. The data fields are fixed length and ordered by the ordering of the flags indicating the presence of the fields. Examples of protocols employing flag fields are GRE and GUE.

A flag-field structure defines one flag/field combination. This structure includes: flag, mask, and size fields. The flag value indicates the flag value to match, the mask is applied to the flags before considering the flag value (i.e. a flag is matched if flags & mask==flag), and size indicates size of the field.

A protocol node with flag-fields is an extended protocol node that describes a protocol that includes flag-fields. A protocol node with flag-fields has two flag-fields related operations: flags returns the flags in a header and fields_offset returns the offset of the fields.

A parse node with flag-fields is an extended parse node that has a reference to a protocol node with flag-fields and a flag-fields table. A flag-fields table is an array of flag-field structures that defines the parseable flag-fields for a protocol. A flag-fields table may be defined in conjunction with a protocol node definition and is used by functions of the protocol node or parse nodes for the protocol.

Figure 20:
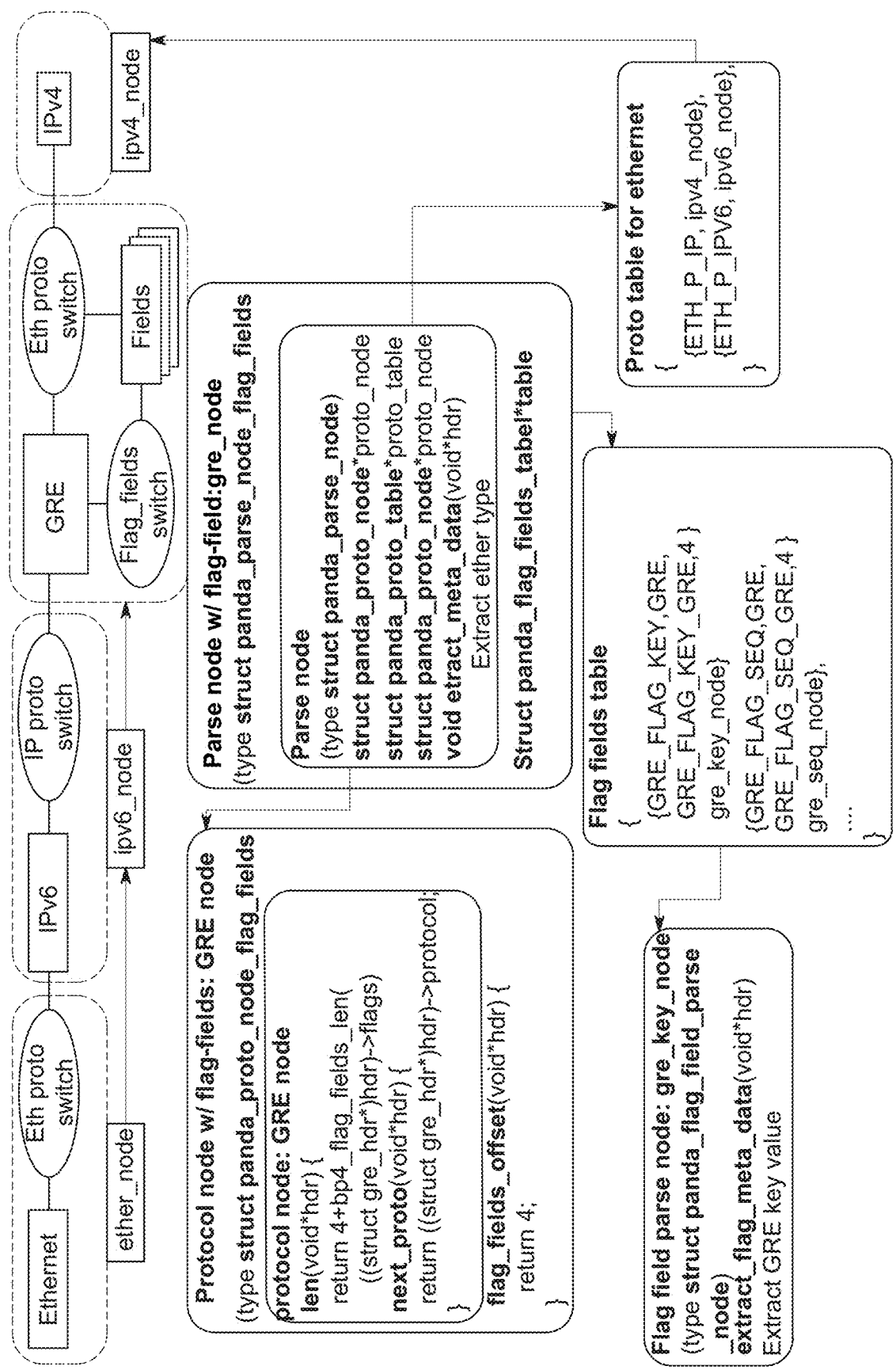
FIG. 20 illustrates an example of a PANDA parser with flags-field nodes for GRE flags.

FIG. 20 illustrates a simple PANDA parser that includes a parse node for GRE and handling for GRE flag-fields. The associated flags-field table contains an entry and flag field parse node for extracting data from the GRE KeyID field.

The PANDA Parser API defines data structures, functions, helper functions, for instantiating and invoking a PANDA parser instance.

A structure that describes parsing of one protocol may be the following. The structure includes two operations that may be set: len returns the length of the protocol layer, and next_proto returns the type of the next protocol layer. The structure includes flags for an encapsulation protocol and overlay protocol, and minimum length of header.
 struct panda_proto_node The prototypes for len and next_proto are: int (*len)(void *hdr) and int (*next_proto)(void *hdr) where hdr is the pointer to the data of the current protocol header being processed. If the return value is negative this indicates an error.

A structure that represents one instantiated node in a parser's parse graph may be the following. The structure refers to a panda_proto_node for the protocol to be parsed. The structure includes two operations that may be set for custom processing: extract_meta_data extracts metadata from a data object and sets it in metadata, and handle_proto performs arbitrary processing for the protocol layer.
 struct panda_parse_node
 The prototypes for these are:
 void (*extract_metadata)(void *hdr, void *common, void *frame)
 void (*handle_proto)(void *hdr, void *common, void *frame)
 where hdr is the pointer to the first byte of the current protocol header being processed, common is a pointer to the common metadata and frame is a pointer to the current metadata frame (based on the internal frame index for the layer).

A structure for a protocol table may be the following. This contains an array of panda_proto_table_entry structures each of which contains a value field and a pointer to a parse node.
 struct panda_proto_table A structure containing the metadata for a parser may be the following. The structure is composed of a number of common fields followed by a variable array of metadata frame structures.
 struct panda_meta_data A metadata frame contains the custom metadata fields set by parse nodes of a parser. Each frame refers to the metadata collected for one level of encapsulation. The panda_meta_data structure contains the number of frames in the array and the number of encapsulations encountered in a walk; the number of encapsulations is used as the frame index into the metadata frames table to return the current frame in which metadata is to be written. Encapsulation is a property as a flag in protocol nodes; when a marked protocol node is encountered the number of encapsulations is incremented. If the number of encapsulations is greater than or equal to the number of frames in the array, then the last frame is selected.

A structure that defines a PANDA parser may be the following. This primarily contains a pointer to the root parse node, that is the parse node at which the parse walk commences (in the case of networking the root node might typically be a parse node for Ethernet).
 struct panda_parser A helper macro to create a parse node may be the following. parse_node is the name of the parse node being defined, proto node is the associated protocol node, extract metadata is the function to call to extract metadata, handler is the function for custom protocol logic processing, and table is the associated protocol table.
 PANDA_MAKE_PARSE_NODE(parse_node, proto_node, extract_metadata, handler, table)

A Helper macro to create a protocol table may be the following. name is the name of the protocol table. The entries for the table are a variable argument list composed of {value, node} pairs where value is the protocol number to match and node is the name of a parse node.
 PANDA_MAKE_PROTO_TABLE(name, entry, . . . )

A helper macro to create a PANDA parser may be the following whereby name is the name of the parser, text is the text name for logging purposes, root is the parse_node that is the root.
 PANDA_MAKE_PARSER(name, text, root)

A function to invoke a PANDA parser to parse a data object may be the following whereby parser contains the root node, data is a pointer to the data object to parse, len is the length of the data object, metadata is a pointer where extracted metadata is written, flags provides parameterizations, and max_encaps is the maximum number of encapsulations that may be parsed.
 int panda_parse(struct panda_parser *parser, void *data, unsigned int len, struct panda_meta_data metadata, unsigned int flags, unsigned int max_encaps)

The function returns a code indicated by PANDA_STOP_reason. Reasons include OKAY, LENGTH, UNKNOWN_ PROTO, ENCAP_DEPTH, etc.

An extended panda_proto_node structure that provides the methods for parsing TLVs associated with the protocol of the protocol node may be the following. The structure includes three TLV related operations: tlv_len returns the length of the TLV, tlv_type returns the type number for the TLV, and tlv_data_offset gives the offset of the data.
 struct panda_proto_node_tlvs
 Prototypes for these are:
 int (*tlv_len) (void *hdr)
 int (*tlv_type) (void *hdr)
 unsigned int (*tlv_data_offset)(void *hdr)
 where hdr is the pointer to the first byte of the current protocol header being processed. If the return value is negative this indicates an error.

A structure that describes the customizable processing of one TLV type may be the following. The structure includes two operations: tlv_extract_metadata to extract metadata from the TLV, and handle_tlv to perform TLV processing.
   struct panda_parse_tlv
   Prototypes for these are:
   void (*extract_tlv_metadata)(void *tlv, void *common, void *frame)
   void (*handle_tlv) (void *tlv, void *common, void *frame)
   where tlv is the pointer to the TLV being processed, common is a pointer to the common metadata and frame is a pointer to the current metadata frame A structure for a TLV table may be the following. The table is composed of an array of structures each of which contains a TLV type field and a pointer to a panda_parse_tlv structure.
   struct panda_proto_tlv_table
   An extended panda_parser node structure that provides the handling of TLVs for the protocol associated with the parse node may be the following. The structure primarily includes a reference to a panda_proto_tlv_table.
   struct panda_parse_node_tlvs
   An extended panda_proto_node structure that provides the methods for parsing flag fields associated with the protocol of the protocol node may be the following. The structure includes two flag-field related operations: flags returns the flags in a header and fields offset returns the fields in the protocol header.
   struct panda_proto_node_flag_fields
   The prototypes are:
   int (*flag_fields_offset)(void *hdr)
   unsigned int (*flag_fields_offset)(void *hdr)
   where hdr is the pointer to the first byte of the current protocol header being processed. If the return value is negative this indicates an error.

A structure that describes a single flag field may be the following. It is composed of: flag, mask, and size. flag is the value of the flag, mask is and'ed with the protocol flags before comparing to flag, and size is the size in bytes of the associated data field.
   struct panda_flag_field
   A structure that describes the customizable processing of one flag-field may be the following. The structure includes two operations: flag_field_extract_metadata to extract metadata from the flag field, and handle_flag_field to perform flag field processing.
   struct panda_flag_parse_node
   Prototypes for these are:
   void (*flag, field_extract_metadata)(void *field, struct panda_flag_field *flag_field, void *common, void *frame)
   void (*handle_flag_field)(void *field, struct panda_flag_field *flag_field, void *common, void *frame)
   where field is the pointer to the field being processed, flag_field is a pointer to the descriptor structure for the field, common is a pointer to the common metadata, and frame is a pointer to the current metadata frame.

A structure that contains an array of structures each containing a panda_flag_field structure and a pointer to a panda_flag_field_proto_node structure may be the following.
   struct panda_flag_fields_table
   An extended panda_parser_node structure that provides the handling of flag fields for the protocol associated with the parse node may be the following. The structure primarily includes a reference to a panda_flag_fields table.
   struct panda_parse_node_flag_fields An example for returning the sum of data field lengths corresponding to the flags in flags may be the following, whereby flag_fields is pointer to a panda_flag_field_table structure that describes parsing the flags-field for a protocol.
   int panda_flag_fields_length(unsigned int flags, struct panda_flag_fields *flag_fields)
   An example for returning data field offset for a flag as determined by the flags set in flags may be the following, whereby idx identifies the flag being tested as an index into the table in flag_fields
   int panda_flag_fields_offset(unsigned int idx, flags, struct panda_flag_fields *flag_fields)
   An example for a helper function to get the value of the data field for some flag may be the following. * indicates the return type in a number of bits and can be 8, 16, 32, or 64 whereby fields is a pointer to the fields data in the object, idx refers to the flag being queried and is an index in the flag_fields table, and flags are the flags from the object being parsed.
   panda get_flag_field *(fields, idx, flags, flag_fields)
   Logically, this function returns
   (cast type_*)fields[panda_flag_fields_offset(idx, flags, flag_fields)]

The extent of benefits of parallelism for a serial processing pipeline are dependent on several characteristics of an implementation: the underlying hardware architecture and the efficiency of interactions between hardware and software, the API and programming model, the system overhead associated with parallelism, how much concurrency can be achieved in processing a workload, memory organization and efficiency of data structures, and related optimizations facilitated by vertical parallelism.

The hardware architecture can be a described Domain Specific Architecture (DSA) for programmable network processing. The goal of the architecture is a programmable and high performance networking dataplane that is extensible, modular, and scalable to meet the requirements of different deployment targets. The architecture can be generalized to accommodate other use cases for serial pipeline processing.

The major elements of the hardware architecture are: CPUs and programmable processors, Memory and address formats, Hardware scheduler and dependencies, and accelerators.

FIG. 21 provides a block diagram of a possible hardware architecture. In the diagram, arrows indicate input PDU paths into the processing including input from network, modifying transforms, and reassembled PDUs. Arrows indicate output paths.

The general flow of processing in a network dataplane is: 1) Receive a packet from the network. Bits are deserialized to packets, or more specifically frames. Commonly, Ethernet is the link layer protocol for this. 2) Process the packet (or PDU in more general terms). This entails validations, match/action table lookup, packet filtering, encapsulation/decapsulation, and transforms like encryption and decryption. Transform processing may be performed by accelerators. 3) Optionally, queue packet. This would be a non-work conserving path for packet reassembly and segment reassembly for a transport protocol. Once a protocol data unit is reassembled, it can be submitted into the pipeline as an upper layer PDU. 4) Take appropriate actions as a result of packet processing. Actions include: drop, forward, queue for reassembly, and local packet receive. Note that after processing the resulting packet may be substantially different than the one that was input.

PANDA is most naturally defined as a library for serial datapath processing. For C this would be the PANDA-C library. The library is adaptable to various environments including DPDK, as a library with integrated DPDK functions, and eBPF, where PANDA can be instantiated via eBPF helpers. The structure of the PANDA parser facilitates vertical parallelism where the processing and operation of different parse nodes execute concurrently. The PANDA parser engine can manage and schedule threads for concurrent execution. Dependencies can either be explicit by the programmer, or a PANDA Parser aware compiler can create the appropriate dependency graph and populate wait and resolve points accordingly. Protocol processing is implemented in software that must be compiled to run on a particular piece of hardware. An optimizing compiler that is aware of parallelism for serial pipeline processing (specifically the PANDA API and structure of the PANDA Parser) and hardware accelerations may be instrumental to structuring the pipelines, identifying dependencies, and populating wait and resolve points. It is conceivable that a compiler could start with serialized code for packet processing and produce a set of programs that implement a parallelized processing pipeline A compiler that optimizes parallelism in a serial processing pipeline might do the following:

Identify stages and build a flow graph for pipeline execution (the PANDA Parser structure makes this feasible)

Build the dependency graph from activities of protocol layers in the flow graph to identify dependencies.

For each dependency identify wait points and resolve points.

Insert wait and resolve primitives at wait points and resolve points respectively.

Arrange code path to maximize the amount of parallelism.

Integrate hardware accelerations into the processing path.

Enforce semantics for safe execution. For instance, dependencies are always unidirectional and pipeline threads always run to completion.

Produce a set of executables that process various protocol layers.

A compiler can be extended to understand the structure of a PANDA parser and to optimize compilation of the parser. The various functions of a parse node, for instance the protocol node function to get length and next protocol or the parse node functions to extract metadata, may be unrolled to execute directly in a linear sequence in lieu of procedure calls. Similarly, adjacent parse nodes in the graph may be unrolled in a linear executable without the overhead of procedure calls. One potential strategy is to unroll the whole parse graph except for back links to early nodes that are present for protocol encapsulation CPUs, or more generally programmable processing units, are inline with the high performance datapath in this architecture. This is made feasible by use of vertical parallelism, accelerators, fast memory and fast data movement operations. Note these are not "general purpose CPUs", but CPUs that have been specifically enhanced to support this architecture. Such enhancements include modifications to CPU Instruction Set Architecture (ISA), and it is expected that domain specific instructions may be added to the CPU for specific PANDA API operations, memory access, and accelerations. RISC-V is an example of an open ISA that provides an opportunity for such enhancements. Processing is primarily driven by a program that runs on the CPU. Programs are written using the PANDA programming model and invoke integrated accelerations specific to a particular instantiation in hardware of the architecture. Programs are compiled to specific hardware target backends. The parser is expressed in declarative form as described above, and a "parsing engine" drives the flow of packet processing.

CPUs can be arranged in different configurations to support both vertical and horizontal pipelines. The program orchestrates the creation and running of the pipelines. Processing CPUs do not need to run an Operating System such as Linux, instead they can run in "bare metal" with event loops that are deterministic real-time processing in "polling mode". Asynchronous events, such as interrupts, are not needed by the CPUs in this architecture. When a CPU is blocking on a dependency it may go to sleep to conserve power as long the wakeup time is tolerable for meeting latency requirements. When protocol layer processing is invoked a number of parameters are passed to the CPU handling a layer (for instance, these could be pushed into registers of the target CPU). Parameters may include: program to run (could be jump address pushed into the CPU PC), pointer to metadata, current metadata frame, pointer to first byte of layer to process in parsing buffer, reference pointer for PDU (including backend payload, and IP checksum of packet starting from the layer being processed).

In this architecture there are three types of memory: CPU local memory, CPU set shared memory, and external memory. The data needed for thread processing is contained in high speed memory that is directly accessed by CPUs. The memory is expected to have low access latencies similar to L1 caches, however for performance this memory is not considered to be a normal L1 cache. This memory is explicitly managed to never incur cache misses, consistency and access synchronization are managed by software primitives, and no TLB is required. The local memory for a data object might be limited to include only the data for the data object that will be processed in the CPU, in particular the data object memory might be a fixed sized parsing buffer that contains the first N bytes of an object (in networking the parsing buffer would contain a number of bytes of headers that need to be processed).

CPU local memory is very fast memory that contains the local memory data described in the memory model section. This memory may be an SRAM that is co-located with a CPU similar to an L1 cache. Unlike a traditional cache, CPU local memory is not part of the memory hierarchy; there are no cache misses and no need for a Translation Lookaside Buffer (TLB). CPU local memory can be divided into dedicated regions that are allocated to CPU threads, and each thread may assume mutual exclusion for accessing its region.

CPU set shared memory is also very fast memory that is shared amongst a cooperative set of CPUs. Similar to local memory, this memory is not a cache; there are no cache misses and no TLB is necessary. This memory contains data object memory and object metadata. The memory is readable and writable. Synchronization and consistency are provided by dependencies as described above. In a normal memory hierarchy, CPU set shared memory would be at the level of an L2 cache; in particular the memory may be shared amongst the cores of a CPU. In an expected design manifestation, the threads within a thread set would map to the hardware threads on one CPU, thus the metadata and data object structures would be located in the corresponding CPU set shared memory for the CPU.

External memory is other system memory that might contain packet data (beyond the headers in a parsing buffer which would be in CPU set shared memory), lookup tables, object queues, etc. External memory would typically be RAM. PANDA threads do not access external memory directly, but instead rely on accelerators and external memory managers to move data from external memory to local CPU memory or CPU set shared memory and to provide access synchronization as needed.

Before a thread (or thread set) is scheduled to run, all the data that will be needed for processing is populated in the CPU local memory and CPU set shared memory. This includes loading the parsing buffer for a packet into CPU set shared memory, initializing metadata in CPU set shared memory, and moving return results from an acceleration function into local memory (for instance, placing the resulting data structure that is returned from a TCAM lookup).

To minimize overheads of parallelism, hardware or CPUs, and the operating system should support very lightweight hardware threads. These threads are ephemeral, non-preemptible, and non-yielding. Each thread runs a simple event loop such that there is no need for context switches. Threads are created in groups of threads (thread sets) and run small programs identified by thread functions. A vertical processing pipeline can be instantiated by a thread set where the constituent threads process various stages of the pipeline. The time to start a thread should be minimized. Each thread should have its own register window where a few registers are initialized with arguments to the thread. Starting threads is serialized by virtue of the thread cascade or top function models, so only one thread is eligible to create a thread at any given time for the thread set. Threads do not indefinitely block or require scheduling, all the threads in a thread set run to completion in the context in which they were created (schedulable thread, interrupt, NAPI thread, etc.).

In this architecture, threads are grouped together into thread sets. Multiple thread sets may be created to run in parallel as multiple pipelines in horizontal parallelism. Threads within a thread set are tightly coupled in that they operate on the same packet in vertical parallelism, and metadata and processing is driven by fine grained dependencies. A hardware implementation may correspondingly partition threads. One conceivable architecture is to run on CPUs that support a number of hardware threads corresponding to the threads in a vertical pipeline to provide unconstrained parallelism.

Thread pools may be used to allow flexible scheduling. When selecting a thread for processing a stage, the thread pool is queried to allocate a thread. Threads are not necessarily committed to always run the same protocol layer, however an optimization for locality might be to try to use the same thread that previously processed the same type layer. For common protocol layers, such as IPv4 and IPv6, reusing the same hardware thread is potentially beneficial if an instruction cache or data cache is already populated (is "hot") with data used by the protocol layer processing.

A hardware implementation may provide native support for the wait and resolve primitives conforming to behavior described earlier in the specification. A wait primitive may be similar in spirit to the common mwait instruction that suspends execution of a thread until a memory location is written. Wait must be implemented as "conditional wait" to avoid race conditions. The semantics of the resolve primitive are to signal the resolved dependencies to downstream pipeline threads waiting on the dependency.

When designing a high performance networking stack both the software architecture as well as capabilities and limitations of the targeted hardware must be considered. Inevitably, there are tradeoffs to be made to elicit a practical and cost effective design. For instance, it is often the case that techniques offering better resource utilization incur higher latencies. Similarly, improving the average case of a system may degrade the worst case and vice versa. Also, there are always trade-offs between cost, performance, flexibility, and power.

A pertinent question in designing vertical parallelism is how resources should be dedicated to pipeline processing. In particular, how many threads (or cores) should be allocated for vertical parallelism. Generally, providing more resources improves performance (up to a point), but also increases cost.

As an example, consider the core count of CPUs. At the low end, CPUs, such as an ARM Cortex-A57MPCore, have low core counts which implies constrained vertical parallelism is needed. At the high end, CPUs are trending towards higher core counts—for instance an AMD Threadripper 2 CPU has up to thirty-two cores and sixty-four threads. Ostensibly, a high core count means that unconstrained parallelism could be used, however it might be impractical or costly to dedicate all the cores to a single vertical pipeline. To be cost effective, it may be prudent to have multiple horizontal pipelines execute in the same CPU. This works if the average pipeline depth in a workload is much less than the maximum possible depth. However, if the system is under provisioned and encounters a workload needing deep pipelines, it is possible that it could not keep up with a maximum packet rate. Such considerations are relevant to mitigations for Denial of Service (DOS) attacks.

The canonical model of processing for an Ethernet device is to deserialize the bits in frame, perform a running CRC32 computation over received bytes, verify the Frame Check Sequence (FCS) at the end of the frame, DMA received data into host memory, and if the frame is valid then signal the host that a packet has been received. Host processing does not commence until the hardware has completely received the packet and the host has been signaled that there is a received packet in its memory. Cut-through is a technique implemented in Ethernet switches that makes forwarding decisions based on the headers of a packet and can commence serializing the packet for transmission on a forwarding interface even before the full packet has been received.

The concept of cut-through can be generalized and adapted for use with vertical parallelism in packet processing. In this case, one stage in a pipeline produces, or streams, data that is consumed by a later stage in the pipeline. The later stage may begin processing the data before its whole length has been streamed.

The Ethernet deserialization function of a SerDes could be considered the zero'th stage in a networking processing pipeline. Protocol processing stages are specifically dependent on the portion of the packet that contains the corresponding protocol headers, so a dependency can be defined between a protocol processing stage and the zeroth stage that N bytes have been received and are available for processing. N would be the minimum length of the received packet that includes the protocol headers that a stage processes.

This introduces a specialized dependency value "length received" and a dependency "frame received". Stage 0 is the blocker for these dependencies. The length received is dynamic depending on the state of deserialization:

While the frame is being deserialized, the length received of the packet is monotonically increasing.

Once the deserialization is complete and the whole frame has been received, the received length indicates the final length of the frame and the "frame received" dependency is resolved.

In both protocol parsing as well as protocol layer processing, the data object length is commonly checked if a protocol layer header lies within the extent of the packet. A dynamic "length received" value implies resolve and wait points for these dependencies. The panda_object_check_length API function is used to check the dynamic length and is the wait primitive for the "length received" and "frame received" dependency. Consider the following check if there is enough received bytes for an IPv6 header:

```
if (panda_object_check_length(sizeof(ipv6hdr)) {
        /* Process IPv6 header */
} else {
        goto drop_packet
}
```

The function panda_object_check_length returns "True" if enough bytes have been received so that the condition is satisfied and the IPv6 header may be processed. The function panda_object_check_length returns "False" if the packet has been fully received ("frame received" is resolved), but not enough bytes were received to cover the IPv6 header. The packet may then be dropped.

If the packet is still in the process of being received ("frame received" is not resolved), and an insufficient number of bytes have been received to satisfy the condition, then panda_object_check_length performs a conditional wait that the length received becomes greater than or equal to the input value or "frame received" is resolved. On return from the conditional wait, if the condition has been satisfied (enough bytes have been received) then "True" is returned. Otherwise an insufficient number of bytes have been received (and "frame received" is resolved) so "False" is returned.

Accelerators provide hardware acceleration for common operations. There are several categories: table lookup, integrity checks, modifying transforms, flow state managers, TCAMs lookups, queuing, etc. In this architecture, accelerators are invoked by instructions executed by the CPU. Accelerators can be integrated into the CPU, or may be external functions supported in FPGAs for instance.

A consequence of combining programmability, flexibility, and a high performance datapath based on accelerations is that not all implementations will support the same set of features. When compiling a program to a backend target, the requirements of features used in the program need to be rectified with the capabilities of the target. There are three possible dispositions for some feature or set of features in a program: The target environment fully supports all requested features and the program will run. The target environment supports some features but in a sub-optimal way, for instance a transform might not be accelerated in hardware but could be computed in software as a fallback, in this case the program can run but with degraded performance. The target environment does not support the features, and the program will not run in the target environment.

Transforms are processing functions that take a range of bytes in a packet as input and perform a computational algorithm over those bytes. Most commonly transforms in networking operate on the payload of some protocol. Some examples of transforms are Ethernet CRC, TCP and UDP checksum, Hash-based Message Authentication Codes (HMAC), and encryption protocols such as IPsec or TLS.

Transform functions are typically considered expensive and hardware acceleration of such functions is common. Some CPUs include support for some simple transforms in the form of vector instructions. Some transforms, such as encryption and decryption, modify the contents of the packet payload per a well-defined algorithm. If the transform produces output bytes or sub-blocks of data sequentially, then it is a streaming transform. A possible optimization is to perform transform processing in-line with deserialization as a form of cut-through. To achieve this a direct path between deserialization, or another producer, and the transform engine is needed so that data is transformed as it is received.

A general flow for transform processing may be:

```
last_length = 0
while (panda_object_check_length (last_length + block_size)) {
        /* data_block is data from offset last_length for block_size */
        perform_transform (&start[last_length], block_size)
        last_length += block_size
}
/* Residual from offset last_length for object->length-last_length */
perform_transformation(&start[last_length], object->length-last_length)
```

Figure 22:
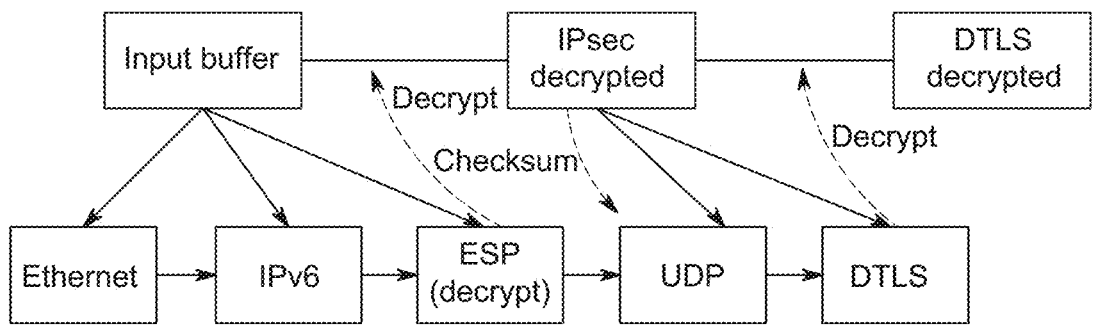
FIG. 22 illustrates transform chaining.

In this pseudo code, panda_object_check_length is called in a loop and returns "True" as blocks of data become available. block size would be the preferred size of a data block that the transform handles. The loop progresses as bytes are received, and the transform operates on blocks of data. When the end of the packet is reached, panda_object_check_length returns "False" and the loop terminates. There may be residual data that is less than block size so that data is processed after the loop. Streaming transforms can be chained together using cut-through techniques described above. As bytes are output from one transform they can be input to another. If the accelerator implements the cut-through algorithm by implementing the equivalent of panda_object_check_length then chaining may be done across several layers without the need for software intervention. FIG. 22 demonstrates this; in this diagram a packet has both IPsec and DTLS encryption and validates a UDP checksum.

The standard one's complement Internet checksum is used by a number of Internet protocols such as TCP, UDP, and GRE. The arithmetic properties of the Internet checksum, it is associative and commutative, make computation amenable to optimization. A common hardware acceleration is checksum offload which performs checksum calculation in NICs on behalf of a host stack either in the transmit path or receive path. The most general method of receive checksum offload is checksum-complete. The basic idea is that a networking device provides the calculated checksum value across a whole packet, and the network stack uses the value to validate any number of packet checksums in a packet (there may be multiple checksums to verify in a packet due to encapsulation).

Checksum-complete may be used and potentially optimized by hardware in vertical parallelism. The procedure would be:

The zeroth stage (SerDes function) in the pipeline can perform a running checksum calculation as packets are received, this is already a common feature of NICs. The checksum covers the beginning of the packet (i.e. the first byte of Ethernet payload) through the end of the packet (excluding Ethernet framing and FCS). If the checksum computation is coincident with packet deserialization then the "frame received" dependency may be used to indicate the complete checksum has been calculated.

At each protocol layer in the pipeline, the checksum starting from the first byte of the protocol layer header through the end of the packet is computed. This is mathematically equal to the complete packet checksum minus the checksum over the bytes preceding the protocol layer which we call the checksum delta of the previous layer. The checksum for the i'th protocol layer may be expressed as:

$$\text{csum}_i = \text{packet\_csum} - \text{delta}_{i-1}$$

The checksum delta for a layer is the checksum calculated over the bytes constituting the current protocol layer plus the delta for the previous layer may be expressed as:

$$delta_i = delta_{i-1} + checksum\_calc\_bytes(layer_i)$$

Determining the checksum for a layer has two dependencies. First the base packet checksum must have been computed; as described above, this could be covered by the frame received dependency if the packet checksum is computed by hardware. Secondly, the delta checksum must be established for the previous layer. This could be synchronized via a "delta checksum" dependency.

In some embodiments, an error checking code such as an Ethernet Cyclic Redundancy Check (CRC) may be provided as a Frame Check Sequence (FCS) at the trailer of Ethernet frames that is verified in hardware. The Ethernet CRC checking may include receiving frame data, performing CRC calculation over the received data, recording the calculated CRC, and verifying that the calculated CRC value matches the one indicated in the frame (on a mismatch, the frame is considered to be in error).

To adapt this to vertical parallelism, the zeroth stage (SerDes) performs a running CRC calculation. The zeroth stage can be a dependency blocker for the "accepted" dependency. If the CRC is correct and the frame is otherwise acceptable, the "accepted" dependency is resolved. If the CRC is not correct, then appropriate action is taken such as killing the pipeline. If processing of a frame commences before the frame has been received and hence before the Ethernet CRC has been verified, then later protocol layers cannot commit to accepting the packet before the dependency is resolved. If the CRC verification fails, the packet is dropped by the Ethernet layer and any work by later stages of the pipeline is discarded by invoking panda_thread_kill_threads.

As previously discussed, in one or more non-limiting embodiments, system 100 may achieve a higher level of computational performance through using one or more hardware accelerators 147 to perform task processing. Processing may also be offloaded to a hardware accelerator 147, wherein the processing task is not only offloaded from the host CPU, but is also performed at a higher rate than a general-purpose processor. System 100 may include a Ternary Content Addressable Memory or TCAM subsystem 151 or more generally any high performance lookup or match/action table. TCAMs 151 allow for the masked matching of entries to a search key or a select field. Masked matching facilitates search operations common in packet networking. A TCAM 151 may evaluate several matching rules in parallel so it is very efficient.

A common use case of a TCAM in network packet processing is to create entries in a single level, "flat TCAM" that matches fields spanning multiple protocol layers. For instance, TCAM entries may match fields in the TCP header and IPv6 header for simple TCP/IPv6 packets when there are no protocol headers between IPv6 and TCP headers. Use of TCAMs for network packet processing in this manner has a number of drawbacks. First, flat TCAMs work best when the input is composed of fixed length, well ordered protocol layers. Variable length headers, like IPv6 extension headers or TCP options, are difficult to represent in a flat TCAM. In particular, fields following a variable length header are no longer in a fixed position relative to the start of the packet. The second major drawback of using a flat TCAM is that the number of match rules needed becomes combinatorial as the number of protocol layers increases. If there are N match rules in each protocol layer, M protocol layers, and the match rules in different protocol layers are independent, then the maximum total number of match rules is given by the equation:

$$\text{\#match rules} = N^M$$

Additionally, as the number of protocol layers increases, the width of the TCAM also increases which is another challenge introduced by a flat TCAM.

An alternative to using a flat TCAM is to create a TCAM table for different protocol layers. When a protocol layer is processed, the protocol layer specific TCAM table is consulted, which is limited to only matching fields or metadata for the current protocol layer. This eliminates the problem of variable length headers preceding protocol headers, and it reduces the number maximum total number of match rules to:

$$\text{\#match rules} = N*M$$

A method to leverage TCAMs 151 in vertical parallelism for networking may be to invoke per protocol layer TCAM tables for match/action processing. This may be accomplished by an API function that is called to evaluate the TCAM rules. The output then provides the action to take (for instance, the next layer protocol processing to invoke). An optimization is to incorporate a match/action TCAM 151 into the protocol dispatch function. The TCAM 151 may be used to preprocess protocol layer headers. The returned action is to execute a program specific to the matched rules and protocol layer. Preprocessing may include simple verifications on the packets where if verification fails then the action is to drop a packet, or actions might indicate variants of protocol processing to eschew the need for conditional branches in a program. If the dispatcher function is entirely in hardware, protocol layer TCAMs may execute without software intervention.

Figure 23:
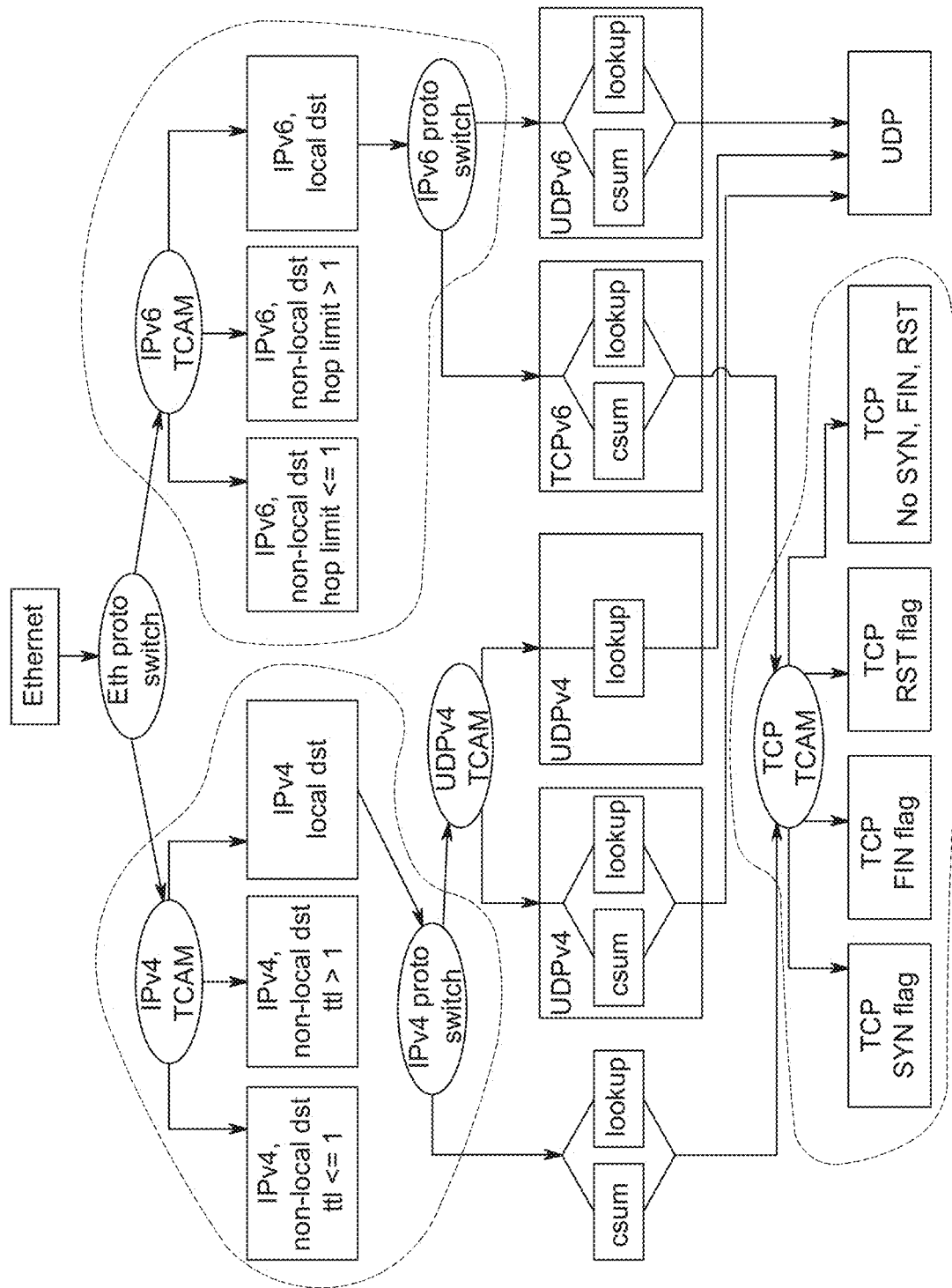
FIG. 23 illustrates an embodiment of a parse graph that contains sub-variants of IPv4, IPv6, UDP, and TCP that would be matched by a TCAM in a protocol dispatch function.

FIG. 23 illustrates an example parse graph that contains sub-variants of IPv4, IPv6, UDP, and TCP that would be matched by a TCAM 151 in a protocol dispatch function. The per protocol match/action rules in FIG. 23 may include: matching the destination IP address in a packet as being local or non-local whereby if it is local, then a program is run to deliver the packet to the local host, else the packet is forwarded when it is non-local; matching Hop Limit whereby the packet is subject to forwarding as determined by matching non-local addresses, the hop limit may also be matched, and if the hop limit is found to be one or zero (not forwardable), then the program to drop the packet is run; matching TCP flags (for instance, if a SYN is received, then processing for the received SYN is done, or processing for a non-SYN packet is done); and matching the UDPv4 checksum to be zero and verify UDPv4 checksum if it is non-zero.

As suggested in FIG. 21, an implementation of this architecture might be manifested in a NIC or SmartNIC. This entails the presence of two external interfaces which are relevant to the architecture: the network interface and the host interface. The network interface connects to the external network for both receive and transmit. On output a network packet scheduler may be programmed to provide QoS and other characteristics. Autonomous functions include functions like CRC computation and checksum that are automatically performed on every packet. Cut-through, including switching received packets to transmit, may be done if the data to be transmitted is produced at a faster rate than that of actually transmitting the data.

The host interface connects the system to an external processing stack typically running on the host CPU (e.g a Linux stack or DPDK). This interface provides the data path to a server from a NIC, storage, or other I/O devices. It could also be used as the interface for slow path processing for a switch. Packet and PDU queues are essential for performance and load balancing. They provide multi-queue and virtualization like SRIO-V. Header/data split, where protocol headers are received by one processing element (like a host CPU with a network stack) and payload data for an Upper Layer Protocol (ULP) is directed to another (such as a GPUs), is a significant performance feature (note that these headers don't necessarily correspond to the concept of headers and the parsing buffer). In the transmit path, the host stack may offload functions, such as checksum or TCP Segment Offload (TSO), and may indicate other characteristics for transmission such as Quality of Service (QoS) or time to send packets.

The flow state manager accelerator provides a framework to maintain states about flows going through the device. Such functionality is common in the use of stateful firewalls, load balancers, and Network Address Translation (NAT). The flow state manager implements the infrastructure to track state. States are identified by a key, usually a protocol tuple, and state lookup is performed with a key as input. The keys are generic and programmable so that different types of flow states corresponding to different protocols can be used. There are three operations that can be invoked for processing on the flow state manager: lookup, create, destroy. These respectively lookup and return a flowstate, create a new flowstate, and destroy an existing flowstate. The lookup operation can be extended to optionally create a flowstate if one does not already exist.

Flowstates may have an associated packet queue or more generally PDU queue. Queued PDUs are associated with a flowstate that has non-work conserving semantics such as IP reassembly, TCP segmentation reassembly, etc. PDUs are queued for a flowstate until some necessary condition is met, such as all the packets to complete reassembly of a datagram have been received or a reassembly timer expires. Memory is a finite resource so stateful mechanisms for flowstates and packet queues need an eviction policy when memory is low. The flowstate manager must manage its memory and can use timers, LRU (least recently used), and other known techniques.

Flowstate and queue management is expected to be highly configurable in terms of keys, conditions for releasing queued PDUs, state eviction timers, etc. Different flowstate tables may have different configuration properties, for instance UDP flow states may be considered more expendable for eviction than TCP ones and thus have a more aggressive eviction policy. Denial of Service should be considered whenever using dynamic stateful mechanisms in a datapath.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

The invention claimed is:

1. A system comprising one or more computers and one or more storage devices on which are stored instructions that are operable, the system comprising one or more memory and address formats, one or more hardware schedulers, external memory, CPU set shared memory shared amongst a cooperative set of CPUs, and CPU local memory, and one or more accelerators, when executed by the one or more computers, to cause the one or more computers to perform operations comprising:
   utilizing a software programming model and API to program serial data processing including primitives for parallelism and synchronization for serial processing pipelines wherein the software programming model and the API employ lightweight micro threading and synchronization mechanisms to construct horizontal pipelines and vertical pipelines with concurrent processing wherein the API is targeted to a domain specific space of serial pipeline processing and the serial data processing for hardware acceleration;
   executing an operation for horizontal parallelization, vertical parallelization, or hybrid parallelization of a serial processing pipeline to produce data objects, the operation including:
   executing the operation as a vertical parallel operation wherein stages of a same serial processing pipeline processing a single data object execute concurrently;
   executing the operation as a hybrid parallel operation, the hybrid parallel operation utilizing vertical and horizontal parallelism which work in concert wherein within each horizontal pipeline, vertical parallelism is applied to processing of the data objects;
   analyzing programming language instructions associated with the serial processing pipeline to determine a type or types of parallel operations to be applied, wherein the data objects are accessed during execution of a program corresponding to the programming language instructions associated with the serial processing pipeline; and
   augmenting compilers to analyze the program being compiled to optimize and instantiate a compiled executable based on the serial processing pipeline defined in program source code.

2. A system comprising one or more computers and one or more storage devices on which are stored instructions that are operable, the system comprising one or more memory and address formats, one or more hardware schedulers, external memory, CPU set shared memory shared amongst a cooperative set of CPUs, and CPU local memory, and one or more accelerators, when executed by the one or more computers, to cause the one or more computers to perform operations comprising:
   utilizing a software programming model and API to program serial data processing including primitives for parallelism and synchronization for serial processing pipelines wherein the software programming model and the API employ lightweight micro threading and synchronization mechanisms to construct horizontal pipelines and vertical pipelines with concurrent processing wherein the API is targeted to a domain specific space of serial pipeline processing and the serial data processing for hardware acceleration;

executing an operation for horizontal parallelization, vertical parallelization, or hybrid parallelization of a serial processing pipeline to produce data objects, the operation including:

executing the operation as a vertical parallel operation wherein stages of a same serial processing pipeline processing a single data object execute concurrently;

executing the operation as a hybrid parallel operation, the hybrid parallel operation utilizing vertical and horizontal parallelism which work in concert wherein within each horizontal pipeline, vertical parallelism is applied to processing of the data objects;

utilizing a threading model comprising processing elements and procedures of the vertical pipelines and the horizontal pipelines:

utilizing threads as a unit of execution that implements one stage in a processing pipeline;

utilizing a programming language and model to program the threads;

utilizing thread sets that are groups of threads that define instances of the vertical pipelines;

utilizing datapaths, each of which comprises a group of thread sets, wherein each thread set defines an instance of a horizontal pipeline in a datapath and processes one data object at a time; and utilizing the datapaths and the thread sets to provide the hybrid parallelization wherein the horizontal parallelization is provided by different thread sets of the datapath, and the vertical parallelism is provided by the threads within a thread set.

3. The system of claim 2, the system causing the one or more computers to perform further operations comprising:

utilizing dependencies that are processing dependencies manifested between threads; and utilizing dependency synchronization:

the dependency synchronization including:

providing a resolve point and a wait point wherein the resolve point is a point in a code path of a processing stage at which processing has been done to satisfy a dependency of a later stage, and the wait point is a point in the code path of a processing stage at which execution cannot proceed until a dependency in an earlier stage has been resolved; wherein wait and resolve primitives are implemented in the API to synchronize between wait and resolve points.

4. The system of claim 2 further comprising dependency synchronization among threads within a thread set, the system causing the one or more computers to perform further operations comprising:

utilizing intra thread set dependency resolution operations for dependencies that are of interest within a single thread set processing pipeline;

maintaining running state for a thread set to track dependencies between dependency watcher, waiter, and blocker threads; wherein watcher threads are threads that is configured to wait on a dependency, waiter threads are watcher threads that are actively waiting on a dependency, and blocker threads are threads that block a dependency and must resolve the dependency before downstream waiter threads can proceed; wherein a ordered list of the thread set determines downstream and upstream relationships between the watcher, blocker, and waiter threads which are needed for the dependency resolution operations;

utilizing a dependency resolution signaling procedure, wherein when a thread resolves a dependency or has a dependency resolved for which it does not block, the dependency is resolved for a next thread in the ordered list of the thread set, wherein when the next thread is not a blocker of the dependency then the dependency is resolved for its next thread in the thread list;

adding a thread to the ordered list wherein an initial set of resolved dependencies for the thread is determined as the set of resolved dependencies for a previous thread in the thread set and for which the previous thread is not a blocker; and removing a thread when completed wherein the thread is removed from the ordered list, wherein when a thread is terminated, any unresolved dependencies that the thread blocks are implicitly resolved and the thread is reset to its initial state.

5. The system of claim 2 further comprising dependency synchronization between thread sets, the system causing the one or more computers to perform further operations comprising:

utilizing inter thread set dependency resolution operations for dependencies that are propagated between the threads of different thread sets to synchronize processing between horizontal processing pipelines;

utilizing configuration of propagated dependencies, non-propagated dependencies, early propagated dependencies, and non-blocked early propagated dependencies for a datapath; wherein the propagated dependencies indicate dependencies for which their resolution is propagated between thread sets, non-propagated dependencies indicate dependencies for which their resolution is not propagated between thread sets, early propagated dependencies indicate dependencies for which their resolutions are propagated between thread sets before an origin thread set is closed but after at least one thread has resolved the dependency, and non-blocked early propagated dependencies indicate dependencies for which their resolution is propagated between threads sets when the dependency is resolved for a first thread in a thread set;

utilizing methods to propagate a dependency resolution for a propagated dependency between thread sets wherein when a terminating thread of a thread set that has been closed resolves a dependency or has a dependency resolved and is not a blocker for the dependency, the dependency is then resolved for the first thread in a next thread set in an ordered list of the thread sets for a datapath;

utilizing methods to propagate a dependency resolution for an early propagated dependency between thread sets wherein when at least one thread of a thread set resolves a dependency, the dependency is then resolved for the first thread in the next thread set in the ordered list of thread sets for a datapath; and utilizing methods to propagate a dependency resolution for a non-blocked early propagated dependency between thread sets wherein when a dependency is resolved for the first thread in a thread set, the dependency is then resolved for the first thread in the next thread set in the ordered list of thread sets for a datapath.

6. The system of claim 2, the system causing the one or more computers to perform further operations comprising:

utilizing dependency channels that is a method to group together data objects that belong to a same logical flow and in order processing of objects is maintained within the group;

maintaining an order list of thread sets for each dependency channel;

maintaining ordered processing semantics and synchronization among the thread sets of a channel by one or more channel dependencies wherein the channel dependencies are declared in datapath configuration and are propagated dependencies; wherein the datapath is comprised of multiple sets of dependency channels where each has its own logically independent instance of the channel dependencies; and joining, by a thread set to a dependency channel by an operation, wherein an argument specifies which channel to join, wherein when a thread set is joined to a dependency channel it is inserted at a tail of the ordered list of thread sets for the dependency channel and is joined for a remaining lifetime of the thread set for processing a data object; wherein a thread set is joinable to more than one dependency channel when multiple dependency channel sets are supported by the datapath.

7. The system of claim 6 further comprising: a thread scheduler for a thread set that performs top function scheduling comprising:

utilizing the top function scheduling wherein an input thread, a top function thread, for a thread set runs in an event loop for processing a work queue that contains work items describing objects for the thread set to process, the top function thread dequeuing a first item in the work queue when there is a work item in the work queue;

in response to the dequeuing, scheduling one or more worker threads to perform processing of various layers of the data object indicated in the dequeued work item;

determining a thread is not available for scheduling; and in response to determining that no threads are available for scheduling the thread scheduler blocking until a thread is available.

8. A system comprising one or more computers and one or more storage devices on which are stored instructions that are operable, the system comprising one or more memory and address formats, one or more hardware schedulers, external memory, CPU set shared memory shared amongst a cooperative set of CPUs, and CPU local memory, and one or more accelerators, when executed by the one or more computers, to cause the one or more computers to perform operations comprising:

utilizing a software programming model and API to program serial data processing including primitives for parallelism and synchronization for serial processing pipelines wherein the software programming model and the API employ lightweight micro threading and synchronization mechanisms to construct horizontal pipelines and vertical pipelines with concurrent processing wherein the API is targeted to a domain specific space of serial pipeline processing and the serial data processing for hardware acceleration;

executing an operation for horizontal parallelization, vertical parallelization, or hybrid parallelization of a serial processing pipeline to produce data objects, the operation including:

executing the operation as a vertical parallel operation wherein stages of a same serial processing pipeline processing a single data object execute concurrently;

executing the operation as a hybrid parallel operation, the hybrid parallel operation utilizing vertical and horizontal parallelism which work in concert wherein within each horizontal pipeline, vertical parallelism is applied to processing of the data objects, the system having procedures for thread scheduling that schedules running of threads in a pipeline, wherein each thread includes a work queue, wherein a work item is configured to be placed on the work queue that indicates a function to be performed by a thread and a reference to a data object and a reference to the data of a specific layer to be processed; an available thread dequeuing a first item in the work queue when there is a work item in the work queue, and in response to the dequeuing, performing requested processing by calling an appropriate function;

waiting on upstream threads to complete wherein a thread invokes a primitive to wait for all of the upstream threads in the pipeline to complete and will block until all the upstream threads are complete; and killing all downstream threads in a pipeline wherein a thread invokes a primitive to force all threads of the downstream in the pipeline to terminate and reset to their initial state and become available.

9. The system of claim 8 further comprising: cascade scheduling, the system causing the one or more computers to perform further operations comprising:

processing, by a last thread in an ordered list of a thread set, the data object to determine a next layer that is to be processed and starting a next worker thread in the thread set to process the next layer.

10. A system comprising one or more computers and one or more storage devices on which are stored instructions that are operable, the system comprising one or more memory and address formats, one or more hardware schedulers, external memory, CPU set shared memory shared amongst a cooperative set of CPUs, and CPU local memory, and one or more accelerators, when executed by the one or more computers, to cause the one or more computers to perform operations comprising:

utilizing a software programming model and API to program serial data processing including primitives for parallelism and synchronization for serial processing pipelines wherein the software programming model and the API employ lightweight micro threading and synchronization mechanisms to construct horizontal pipelines and vertical pipelines with concurrent processing wherein the API is targeted to a domain specific space of serial pipeline processing and the serial data processing for hardware acceleration;

executing an operation for horizontal parallelization, vertical parallelization, or hybrid parallelization of a serial processing pipeline to produce data objects, the operation including:

executing the operation as a vertical parallel operation wherein stages of a same serial processing pipeline processing a single data object execute concurrently;

executing the operation as a hybrid parallel operation, the hybrid parallel operation utilizing vertical and horizontal parallelism which work in concert wherein within each horizontal pipeline, vertical parallelism is applied to processing of the data objects, the system having procedures for thread set scheduling that schedules thread sets in a datapath to process the data objects, the system causing the one or more computers to perform further operations comprising:

utilizing one or more input scheduler functions that serve as the schedulers of the thread sets of the datapath, wherein an input scheduler function maintains a queue of the data objects to process; and inputting a data object into the datapath, wherein an input scheduler function of the one or more input scheduler functions attempts to select a thread set among a set of available thread sets, wherein when the thread set is available it is reserved as busy and it is inserted at a tail of a ordered list of the busy thread sets for the datapath and a top function for the thread set is run; wherein when no thread sets are available, the input scheduler queues a work item for the data object in a datapath data object work queue; wherein when a thread set completes its processing and becomes available and there is an item on the work queue, the input scheduler dequeuing a work item from the datapath's work queue and proceeding to start the available thread set to process the object described in the work item.

11. A system comprising one or more computers and one or more storage devices on which are stored instructions that are operable, the system comprising one or more memory and address formats, one or more hardware schedulers, external memory, CPU set shared memory shared amongst a cooperative set of CPUs, and CPU local memory, and one or more accelerators, when executed by the one or more computers, to cause the one or more computers to perform operations comprising:

utilizing a software programming model and API to program serial data processing including primitives for parallelism and synchronization for serial processing pipelines wherein the software programming model and the API employ lightweight micro threading and synchronization mechanisms to construct horizontal pipelines and vertical pipelines with concurrent processing wherein the API is targeted to a domain specific space of serial pipeline processing and the serial data processing for hardware acceleration;

executing an operation for horizontal parallelization, vertical parallelization, or hybrid parallelization of a serial processing pipeline to produce data objects, the operation including:

executing the operation as a vertical parallel operation wherein stages of a same serial processing pipeline processing a single data object execute concurrently;

executing the operation as a hybrid parallel operation, the hybrid parallel operation utilizing vertical and horizontal parallelism which work in concert wherein within each horizontal pipeline, vertical parallelism is applied to processing of the data objects;

utilizing block level parallelism as a specialized form of the vertical parallelism for fine grained parallelization of independent blocks of code within a code path;

implementing a fork operation to create one or more ephemeral threads such that one parallel code block runs in an original thread, and other parallel code blocks run in the one or more ephemeral threads; and implementing a join operation wherein the one or more ephemeral threads execute their code blocks and then exit, and the original thread executes its code block and then performs the join operation to wait for the one or more ephemeral threads to exit.

12. A system comprising one or more computers and one or more storage devices on which are stored instructions that are operable, the system comprising one or more memory and address formats, one or more hardware schedulers, external memory, CPU set shared memory shared amongst a cooperative set of CPUs, and CPU local memory, and one or more accelerators, when executed by the one or more computers, to cause the one or more computers to perform operations comprising:

utilizing a software programming model and API to program serial data processing including primitives for parallelism and synchronization for serial processing pipelines wherein the software programming model and the API employ lightweight micro threading and synchronization mechanisms to construct horizontal pipelines and vertical pipelines with concurrent processing wherein the API is targeted to a domain specific space of serial pipeline processing and the serial data processing for hardware acceleration;

executing an operation for horizontal parallelization, vertical parallelization, or hybrid parallelization of a serial processing pipeline to produce data objects, the operation including:

executing the operation as a vertical parallel operation wherein stages of a same serial processing pipeline processing a single data object execute concurrently;

executing the operation as a hybrid parallel operation, the hybrid parallel operation utilizing vertical and horizontal parallelism which work in concert wherein within each horizontal pipeline, vertical parallelism is applied to processing of the data objects;

utilizing chained transform hardware accelerators wherein a chain of accelerators is dynamically programmed to operate in sequence on a data object, wherein the data object and output from transforms are comprised of blocks of data that are operated on such that the blocks of data from the output of one transform accelerator is an input data block of a next transform accelerator in the chain; wherein different blocks of the same data object are processed in parallel by the different transform accelerators in the sequence; wherein the transform accelerators are configured to concurrently process data blocks from different data objects as long as properly in order processing of the data in each data object is maintained; and transform processing in-line with streaming datapath input functions, or a deserialization function in networking, with one or more transforms being processed in a loop that is employed to perform incremental transform processing on blocks of bytes of a data object as they become available, wherein in each iteration of the loop, a function is called to check when a block of data of some size is available, the function returns true when a block is available and returns false when an end of the data object is reached, the function will block when a data block is not available and an end of the data object is not yet reached a loop proceeds and processes blocks of data as they become available, where for each block one or more transforms operate it; wherein when the end of the data object is reached, as indicated by the check function returning false, the loop terminates and any residual bytes of the data object are operated on by the transforms.

13. A system comprising one or more computers and one or more storage devices on which are stored instructions that are operable, the system comprising one or more memory and address formats, one or more hardware schedulers, external memory, CPU set shared memory shared amongst a cooperative set of CPUs, and CPU local memory, and one or more accelerators, when executed by the one or more computers, to cause the one or more computers to perform operations comprising:

utilizing a software programming model and API to program serial data processing including primitives for parallelism and synchronization for serial processing pipelines wherein the software programming model and the API employ lightweight micro threading and synchronization mechanisms to construct horizontal pipelines and vertical pipelines with concurrent processing wherein the API is targeted to a domain specific space of serial pipeline processing and the serial data processing for hardware acceleration;

executing an operation for horizontal parallelization, vertical parallelization, or hybrid parallelization of a serial processing pipeline to produce data objects, the operation including:

executing the operation as a vertical parallel operation wherein stages of a same serial processing pipeline processing a single data object execute concurrently;

executing the operation as a hybrid parallel operation, the hybrid parallel operation utilizing vertical and horizontal parallelism which work in concert wherein within each horizontal pipeline, vertical parallelism is applied to processing of the data objects, the system having a programmable parser having protocol nodes, parse nodes, and protocol tables; the protocol node providing properties and functions needed to parse one protocol in a parse graph to proceed to a next protocol in the parse graph, the protocol node having functions that are implemented per a specific protocol to return a length of a protocol layer or header of a current protocol layer and return a protocol type of the next layer, the protocol table returning the next parse node in the protocol graph based on input of the protocol type of the next layer, wherein the parse node is an instantiation of one node in the parse graph of a parser, the parse node allowing functions to extract metadata from a protocol header and save it in a metadata memory, and to perform protocol processing.

14. A system comprising one or more computers and one or more storage devices on which are stored instructions that are operable, the system comprising one or more memory and address formats, one or more hardware schedulers, external memory, CPU set shared memory shared amongst a cooperative set of CPUs, and CPU local memory, and one or more accelerators, when executed by the one or more computers, to cause the one or more computers to perform operations comprising:

utilizing a software programming model and API to program serial data processing including primitives for parallelism and synchronization for serial processing pipelines wherein the software programming model and the API employ lightweight micro threading and synchronization mechanisms to construct horizontal pipelines and vertical pipelines with concurrent processing wherein the API is targeted to a domain specific space of serial pipeline processing and the serial data processing for hardware acceleration;

executing an operation for horizontal parallelization, vertical parallelization, or hybrid parallelization of a serial processing pipeline to produce data objects, the operation including:

executing the operation as a vertical parallel operation wherein stages of a same serial processing pipeline processing a single data object execute concurrently;

executing the operation as a hybrid parallel operation, the hybrid parallel operation utilizing vertical and horizontal parallelism which work in concert wherein within each horizontal pipeline, vertical parallelism is applied to processing of the data objects, the system having a parser engine that drives parsing, and a parser compiler for creating a dependency graph and populating wait points and resolve points; and accelerating by implementing a programmable parser in hardware, the programmable parser identifying a protocol layer in a packet, and in response to an identification, parsing the protocol layer and scheduling threads to perform per layer processing.

15. A system comprising one or more computers and one or more storage devices on which are stored instructions that are operable, the system comprising one or more memory and address formats, one or more hardware schedulers, external memory, CPU set shared memory shared amongst a cooperative set of CPUs, and CPU local memory, and one or more accelerators, when executed by the one or more computers, to cause the one or more computers to perform operations comprising:

utilizing a software programming model and API to program serial data processing including primitives for parallelism and synchronization for serial processing pipelines wherein the software programming model and the API employ lightweight micro threading and synchronization mechanisms to construct horizontal pipelines and vertical pipelines with concurrent processing wherein the API is targeted to a domain specific space of serial pipeline processing and the serial data processing for hardware acceleration;

executing an operation for horizontal parallelization, vertical parallelization, or hybrid parallelization of a serial processing pipeline to produce data objects, the operation including:

executing the operation as a vertical parallel operation wherein stages of a same serial processing pipeline processing a single data object execute concurrently;

executing the operation as a hybrid parallel operation, the hybrid parallel operation utilizing vertical and horizontal parallelism which work in concert wherein within each horizontal pipeline, vertical parallelism is applied to processing of the data objects, the system having a computation of an Internet checksum, or one's complement checksum with respect to a serial processing pipeline;

utilizing a method to provide to a thread the one's complement checksum of all words of the data corresponding to a protocol layer;

utilizing a method to provide to a thread the one's complement checksum of all words of data corresponding to all words preceding a protocol layer; and utilizing a method in a thread processing of a protocol layer to set or validate a protocol checksum, without additional checksum computation, using one's complement sum of all words in the data object, the one's complement sum of all words of the data corresponding to a protocol layer, and the one's complement sum of all words corresponding to all words preceding a layer.

16. A system comprising one or more computers and one or more storage devices on which are stored instructions that are operable, the system comprising one or more memory and address formats, one or more hardware schedulers, external memory, CPU set shared memory shared amongst a cooperative set of CPUs, and CPU local memory, and one or more accelerators, when executed by the one or more computers, to cause the one or more computers to perform operations comprising:

utilizing a software programming model and Application Programming Interface to program serial data processing including primitives for parallelism and synchronization for serial processing pipelines;

utilizing serial thread schedulers to manifest horizontal parallelism wherein a sequential thread ordering amongst threads is established such that for any two threads, one thread of the any two threads is downstream of a second thread of the any two threads;

utilizing serial thread set schedulers to manifest vertical parallelism wherein a set of threads are scheduled for a task of processing a data object or work item and thread set schedulers maintain sequential thread set ordering such that for any two thread sets, one thread set of the any two thread sets is downstream of a second thread set of the any two thread sets;

utilizing the serial thread schedulers and the serial thread set schedulers to manifest a hybrid of horizontal and vertical parallelism;

utilizing thread dependencies that are unidirectional processing dependencies between the threads wherein downstream threads are configured to have processing dependencies on upstream threads, but upstream stream threads are configured to not have processing dependencies on the downstream threads;

utilizing thread set dependencies that are the unidirectional processing dependencies between thread sets wherein downstream thread sets are configured to have processing dependencies on upstream thread sets, but upstream stream thread sets are configured to not have processing dependencies on the downstream thread sets;

utilizing the dependencies to synchronize processing amongst serial threads, and utilizing dependency synchronization primitives and the Application Programming Interface for the dependencies to synchronize the processing of critical regions amongst the serial threads;

utilizing the dependencies to synchronize the processing amongst serial thread sets, and utilizing the dependency synchronization primitives and the Application Programming Interface for the dependencies to synchronize the processing of the critical regions amongst the serial thread sets; and utilizing data flow and program analysis to determine optimal use optimal use of the dependency synchronization primitives.

17. A system comprising one or more computers and one or more storage devices on which are stored instructions that are operable, the system comprising one or more memory and address formats, one or more hardware schedulers, external memory, CPU set shared memory shared amongst a cooperative set of CPUs, and CPU local memory, and one or more accelerators, when executed by the one or more computers, to cause the one or more computers to perform operations comprising:

utilizing a software programming model and API to program serial data processing including primitives for parallelism and synchronization for serial processing pipelines wherein the software programming model and the API employ lightweight micro threading and synchronization mechanisms to construct horizontal pipelines and vertical pipelines with concurrent processing wherein the API is targeted to a domain specific space of serial pipeline processing and the serial data processing for hardware acceleration;

executing an operation for horizontal parallelization, vertical parallelization, or hybrid parallelization of a serial processing pipeline to produce data objects, the operation including:

executing the operation as a vertical parallel operation wherein stages of a same serial processing pipeline processing a single data object execute concurrently;

executing the operation as a hybrid parallel operation, the hybrid parallel operation utilizing vertical and horizontal parallelism which work in concert wherein within each horizontal pipeline, vertical parallelism is applied to processing of the data objects; and utilizing dependencies that are processing dependencies manifested between threads; and utilizing dependency synchronization, the dependency synchronization including:

providing a resolve point and a wait point wherein the resolve point is a point in a code path of a processing stage at which the processing has been done to satisfy a dependency of a later stage, and the wait point is a point in the code path of the processing stage at which execution cannot proceed until the dependency in an earlier stage has been resolved; wherein wait and resolve primitives are implemented in the API to synchronize between wait and resolve points.

* * * * *